Dec. 11, 1956 R. B. TROUSDALE 2,773,935

ELECTRONIC TELEPHONE SYSTEM

Filed Jan. 12, 1951 18 Sheets-Sheet 1

INVENTOR.
Robert B. Trousdale
BY T. L. Bowes
Att'y

Dec. 11, 1956 R. B. TROUSDALE 2,773,935

ELECTRONIC TELEPHONE SYSTEM

Filed Jan. 12, 1951 18 Sheets-Sheet 2

INVENTORS:
BY Robert B. Trousdale
T. L. Bowes
Att'y

INVENTOR.
Robert B. Trousdale
BY T. L. Bowes
Att'y

INVENTORS:
BY Robert B. Trousdale
T. L. Bowes
Att'y

Dec. 11, 1956 R. B. TROUSDALE 2,773,935

ELECTRONIC TELEPHONE SYSTEM

Filed Jan. 12, 1951 18 Sheets-Sheet 5

INVENTOR.
Robert B. Trousdale
BY T. L. Bowes
Att'y

INVENTORS:
BY Robert B. Trousdale
T. L. Bowes
Att'y

Dec. 11, 1956 R. B. TROUSDALE 2,773,935

ELECTRONIC TELEPHONE SYSTEM

Filed Jan. 12, 1951 18 Sheets-Sheet 7

INVENTORS:

BY Robert B. Trousdale

T. L. Bowes

Att'y

Dec. 11, 1956 R. B. TROUSDALE 2,773,935

ELECTRONIC TELEPHONE SYSTEM

Filed Jan. 12, 1951 18 Sheets-Sheet 8

INVENTORS:

BY Robert B. Trousdale

T. L. Bowes

Att'y

Dec. 11, 1956 R. B. TROUSDALE 2,773,935

ELECTRONIC TELEPHONE SYSTEM

Filed Jan. 12, 1951 18 Sheets-Sheet 9

INVENTORS:

BY Robert B. Trousdale

T. L. Bowes

Att'y

New Line Circuit 10

INVENTOR.
Robert B. Trousdale
BY T. L. Bowes
Att'y

INVENTOR.
Robert B. Trousdale
BY T. L. Bowes
Att'y

INVENTOR.
Robert B. Trousdale
BY T. L. Bowes
Att'y

INVENTOR.
Robert B. Trousdale
BY T. L. Bowes
Att'y

INVENTOR.
Robert B. Trousdale
BY T. L. Bowes
Att'y

Dec. 11, 1956 R. B. TROUSDALE 2,773,935

ELECTRONIC TELEPHONE SYSTEM

Filed Jan. 12, 1951 18 Sheets-Sheet 15

INVENTOR.
Robert B. Trousdale
BY T. L. Bowes
Att'y

Dec. 11, 1956 R. B. TROUSDALE 2,773,935

ELECTRONIC TELEPHONE SYSTEM

Filed Jan. 12, 1951 18 Sheets-Sheet 16

INVENTOR.
Robert B. Trousdale
BY T. L. Bowes
Att'y

INVENTOR.
Robert B. Trousdale
BY T. L. Bowes
Att'y

INVENTOR.
Robert B. Trousdale
BY T. L. Bowes
Att'y

United States Patent Office 2,773,935

Patented Dec. 11, 1956

2,773,935

ELECTRONIC TELEPHONE SYSTEM

Robert B. Trousdale, Rochester, N. Y., assignor, by mesne assignments, to General Dynamics Corporation, a corporation of Delaware Application January 12, 1951, Serial No. 205,641

31 Claims. (Cl. 179—15)

Figure 1:
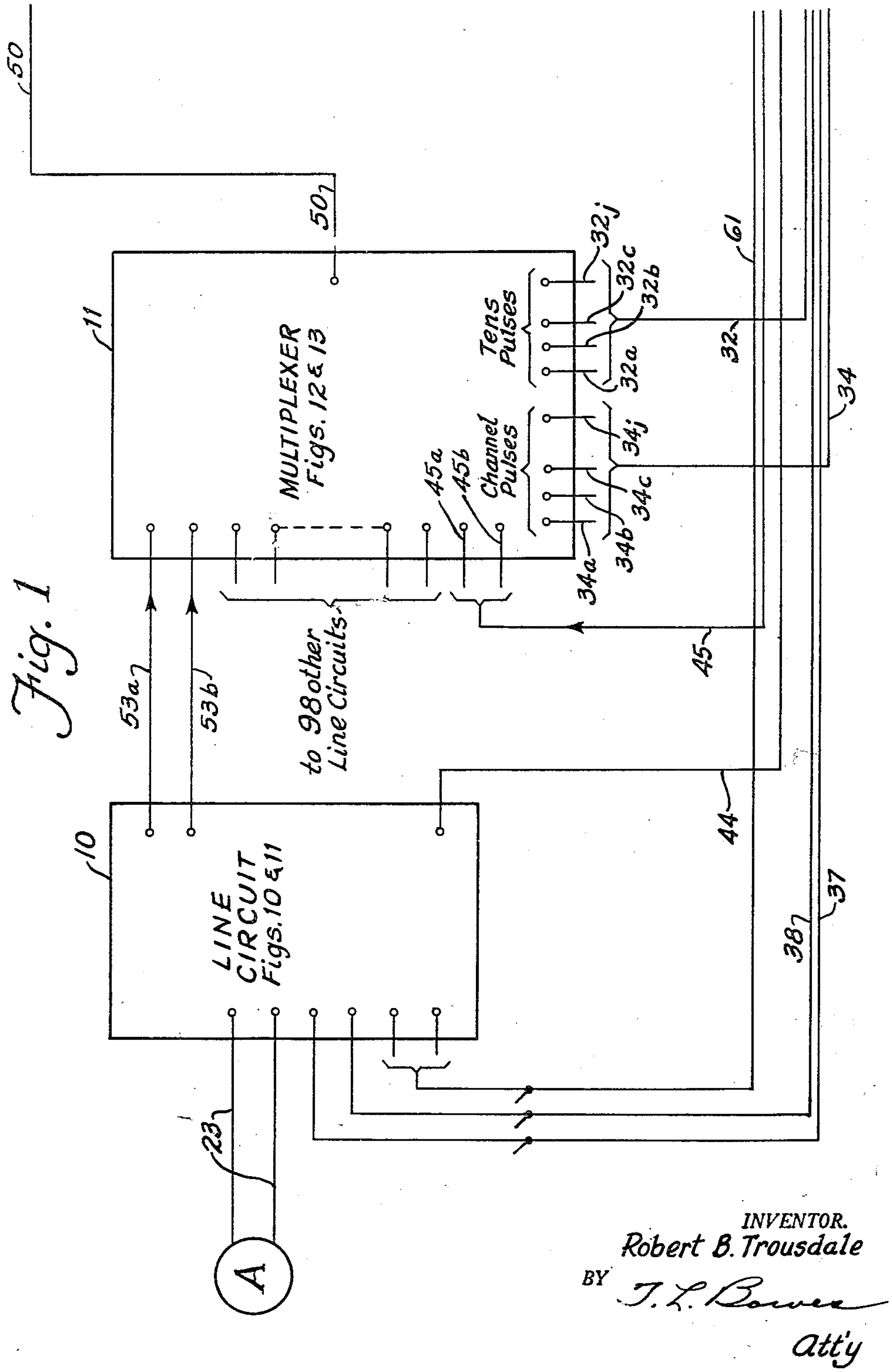

The present invention relates to an automatic telephone system, and, more particularly, to an electronic telephone system for selectively setting up private two-way communication connections between the lines of an automatic telephone system. In particular, the present invention is directed to certain improvements in a fully automatic telephone system of the improved form disclosed and claimed in a co-pending application of Robert B. Trousdale and Frank A. Morris, Serial No. 134,974, filed on December 24, 1949, and assigned to the same assignee as the present invention.

Basically, the electronic telephone system disclosed and claimed in the above-identified application utilizes a system of multiplexing; namely, pulsed sampling effectively at an ultrasonic rate of the control and intelligence signals produced at each substation of the system, to provide signal channel separation. Specifically, each line or substation of the system is assigned a particular pulse time position in each of repetitive pulse frames each comprising one hundred pulse time positions. Intelligence and control signals developed at any one substation of the system are sampled only at the particular pulse time position assigned to the particular substation and the samples are carried through the signal transmitting components of the system as far as the connector stage on multiplexer signal pulses occurring in this particular time position. In the connector stage the control or intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation.

In order to minimize the amount of equipment used in certain components of the system, a decimal system of multiplexing is employed which entails arbitrary division of the lines of the system into subgroups. More specifically, the one hundred lines of the system are divided into ten subgroups of ten lines each, and tens multiplexing or gating pulses are developed at the rate of ten pulses for each pulse frame. Each tens pulse individually corresponds to a particular subgroup of tens lines and occurs during the time interval of each pulse frame which exactly spans the ten pulse time positions individually assigned to the lines of the particular subgroup. With this system of multiplexing, transmission of multiplexer signal pulses through certain of the signal transmission components of the system is dependent upon time coincidence of these signal pulses with particular tens pulses of successive pulse frames as well as coincidence of these pulses with particular pulse time positions within successive pulse frames.

One of the problems encountered in an electronic telephone system of the type described above is that of maintaining uniform operation with subscriber lines of varying lengths. Inasmuch as the length of the connecting lines to the individual subscribers' stations may vary over relatively wide limits with a corresponding variation in the loop resistance of these line circuits, it is very desirable to provide a line circuit associated with each of the subscriber substations which will operate independently of the length of the subscriber line associated therewith.

Accordingly, it is an object of the present invention to provide a fully automatic electronic telephone system in which improved electronic facilities are provided for selectively setting up two-way connections between any pair of lines of a signal system.

It is another object of the present invention to provide an improved fully automatic electronic telephone system of the character described in which novel line circuit facilities are employed to provide uniform system operation with line circuits of widely different line lengths and loop circuit resistances.

It is a further object of the present invention to provide an improved fully automatic electronic telephone system of the character described in which improved and novel line circuit facilities are employed to provide uniform operation with line circuits of widely varying loop resistance and wherein control bias and voice signals are supplied over separate channels to a signal multiplexer to obtain further uniformity of operation of the system with line circuits having different lengths.

It is a still further object of the present invention to provide an improved fully automatic electronic telephone system characterized in that novel line circuit facilities and signal multiplexing facilities are provided which cooperate to provide uniform system operation with line circuits of widely different line lengths and loop resistances.

It is another object of the present invention to provide in a fully automatic electronic telephone system of the character described novel line circuit facilities in which drift and temperature effects are substantially eliminated.

A further problem encountered in an electronic telephone system of the type described heretofore involves the relation of intelligence and control signals developed at any one substation of the system to a particular pulse time position assigned to the particular substation. Assignment of time positions to the intelligence and control signals developed at particular substations is carried out by means of signal multiplexing facilities, and in the decimal system of multiplexing described above, entails arbitrary division of the lines of the system into sub-groups. It is particularly desirable, both from the standpoint of economy and efficiency of operation, to accomplish the tens and units gating functions of the multiplexing facilities with a minimum number of circuit elements inasmuch as these gating functions must be performed for each individual line circuit of the system.

It is, therefore, a further object of the present invention to provide a new and improved electronic telephone system of the character described in which novel multiplexing facilities are employed to provide signal channel assignment on a decimal basis and wherein the tens and units gating operations are performed in a single tube for each signal channel.

Another object of the present invention resides in the provision in an electronic telephone system of simplified signal multiplexing facilities in which the tube complement and power consumption is substantially reduced.

A further object of the present invention resides in the provision of a new and improved electronic telephone system of the character described in which novel multiplexing facilities are employed to provide signal channel separation on a decimal basis and wherein the tens and units gating operations are performed in a single tube assigned to each signal channel while maintaining adequate signal channel separation and preventing objectionable cross talk between channels.

Additionally, in an electronic telephone system of the above-described type, it is necessary to preserve the D. C. component of signal modulated pulses which are utilized to set up two-way communication between the individual lines of the system in order to transmit supervisory signals as well as voice signals. Such a requirement is particularly noticeable in the pulse distributing facilities wherein it is necessary, in the system described in the above-identified application, to provide at least two clamping rectifiers for each of the one hundred gate circuits connected to the one hundred lines of the system. It would be desirable, both from the standpoint of economy and reliability of circuit operation, to provide signal modulated pulse distributing facilities wherein the D. C. component is preserved without the use of auxiliary rectifiers associated with each of the individual gate circuits of the distributor.

Accordingly, it is an additional object of the present invention to provide a new and improved electronic telephone system of the character described in which simplified and economical pulse distributing facilities are employed wherein the tube complement is substantially reduced without impairing the operation thereof.

It is another object of the present invention to provide a new and improved electronic telephone system of the character described in which simplified pulse distributing facilities are employed which are so arranged that cross talk between individual lines of the system connected thereto is substantially prevented.

It is still another object of the present invention to provide a new and improved electronic telephone system of the character described in which simplified and economical signal pulse distributing facilities are employed and wherein the distributed signal modulated pulse may be demodulated without the use of additional rectifiers for each signal channel.

It is a further object of the present invention to provide a new and improved electronic telephone system of the character described in which simplified distributing facilities are employed and wherein the tube complement is substantially reduced while preserving the D. C. component of signal modulated pulses transmitted therethrough.

Figure 2:
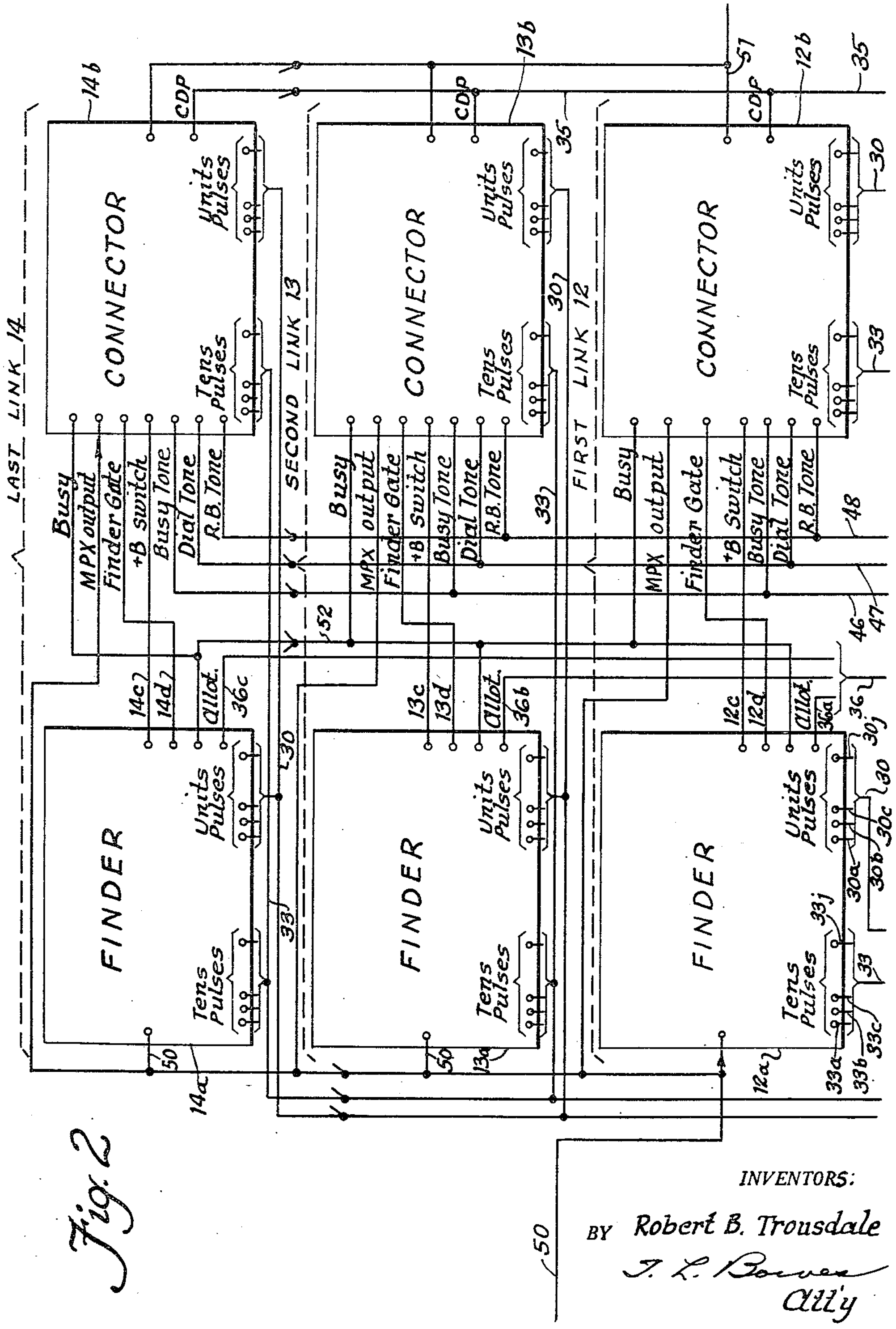
Figure 3:
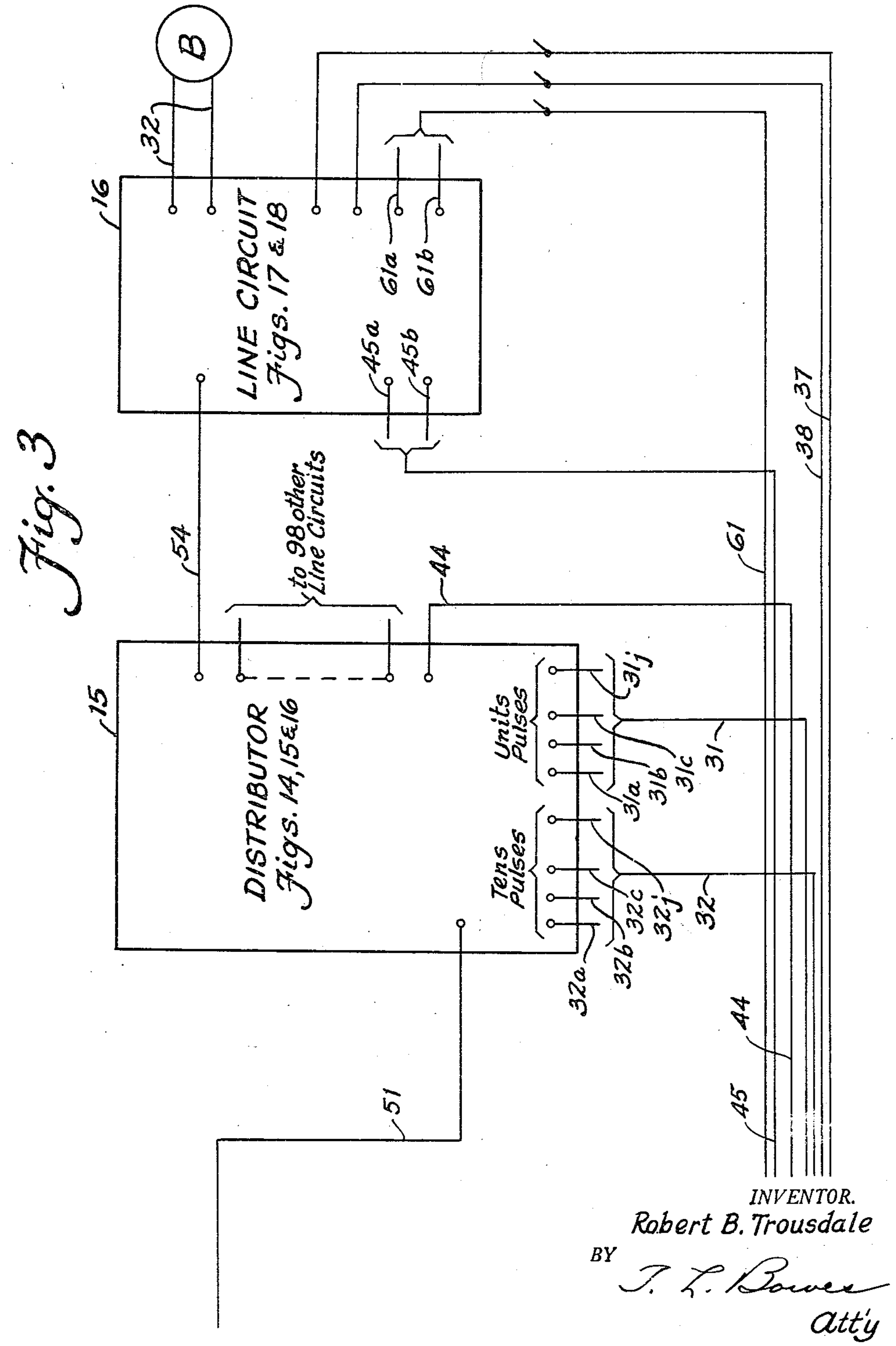
Figure 4:
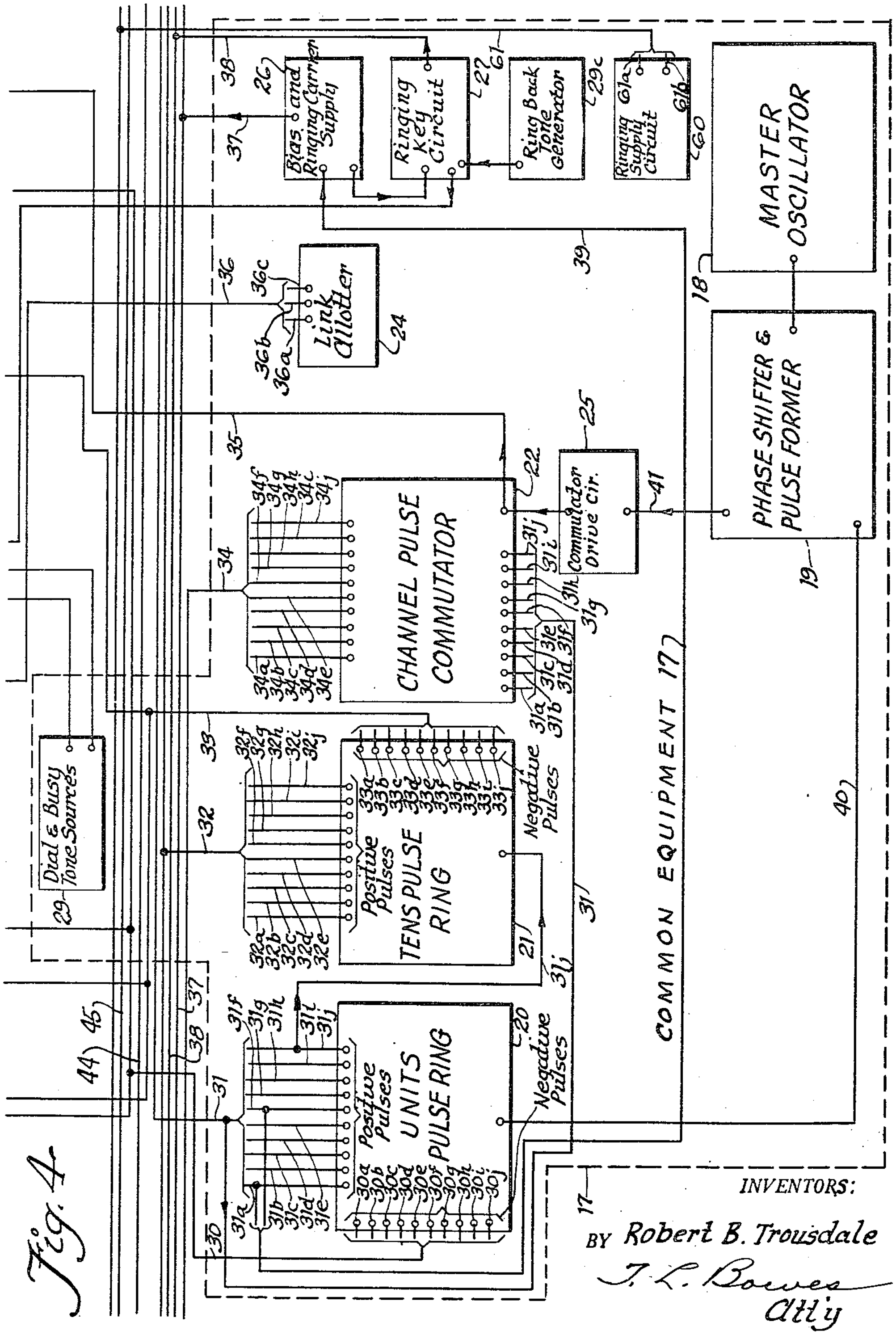
Figure 5:
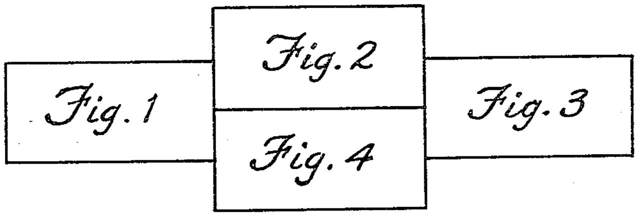
Figure 19:
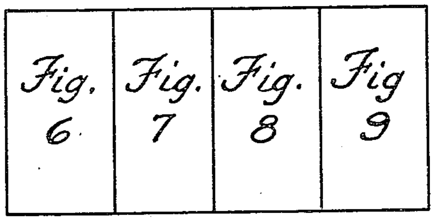
Figure 20:
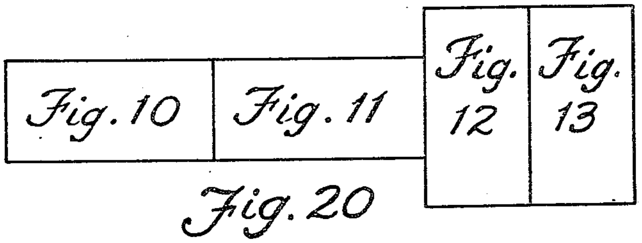
Figure 21:
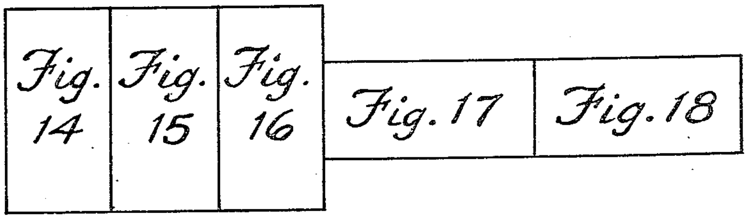
Figure 6:
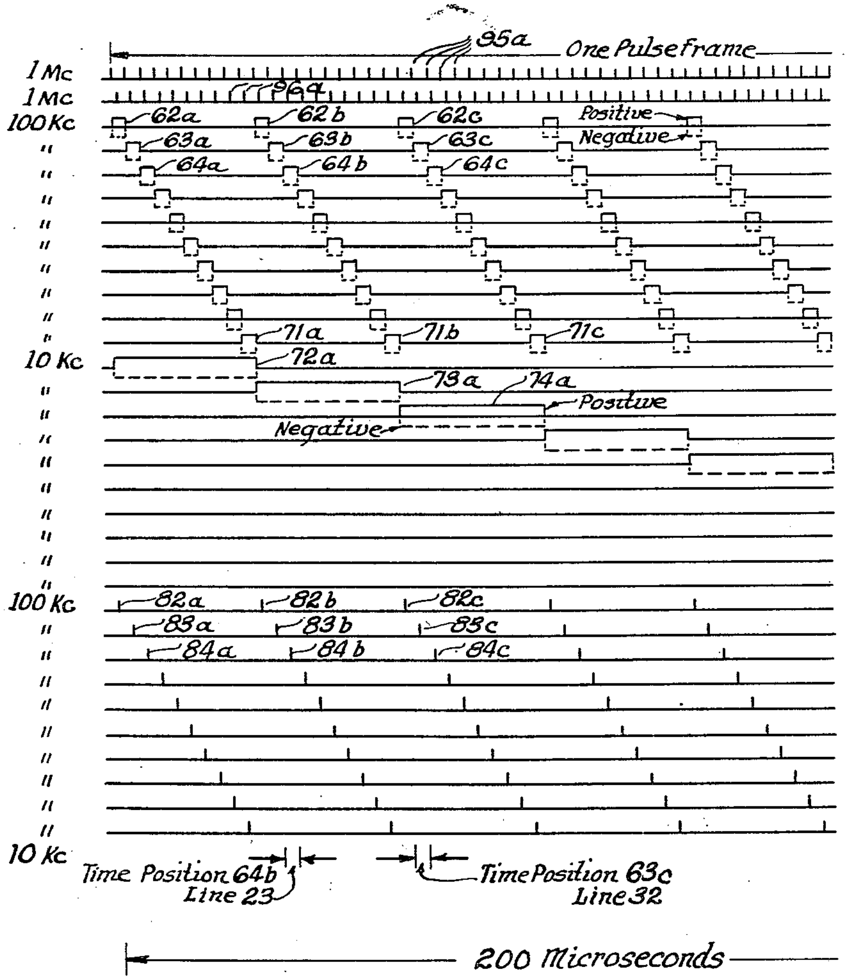
Figure 7:
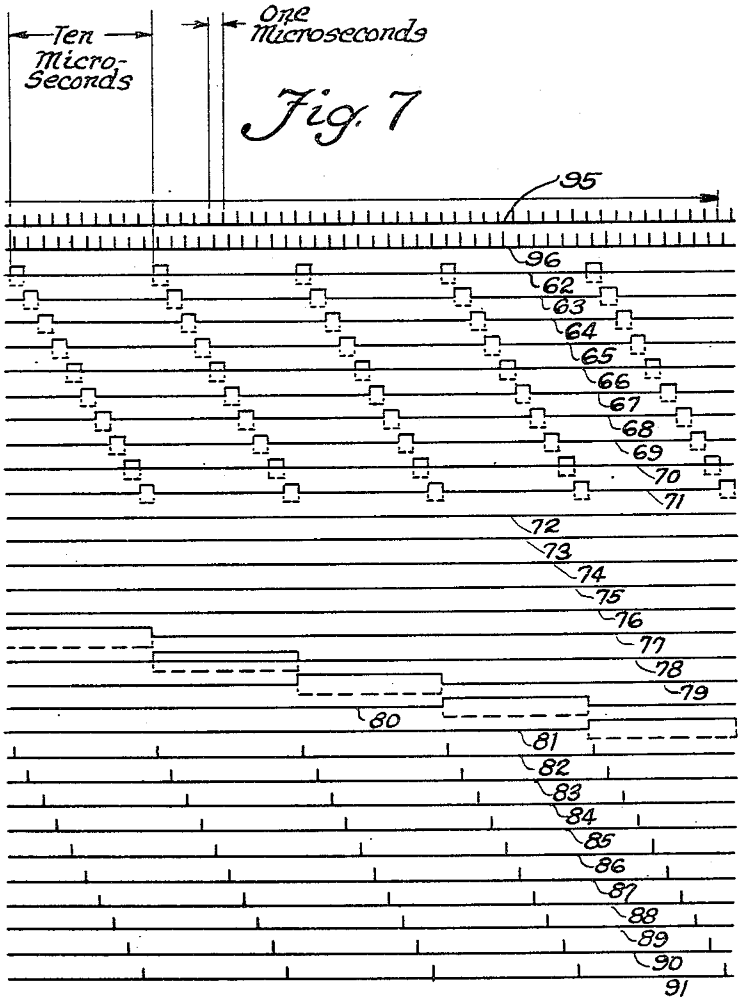
Figure 8:
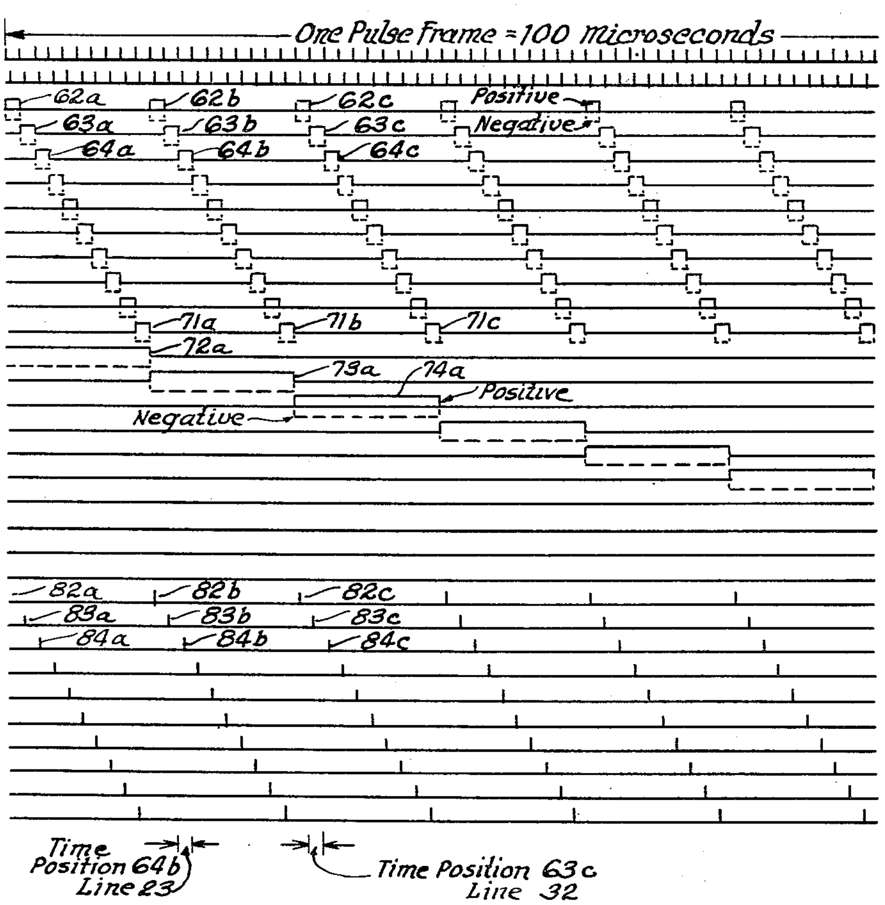
Figure 9:
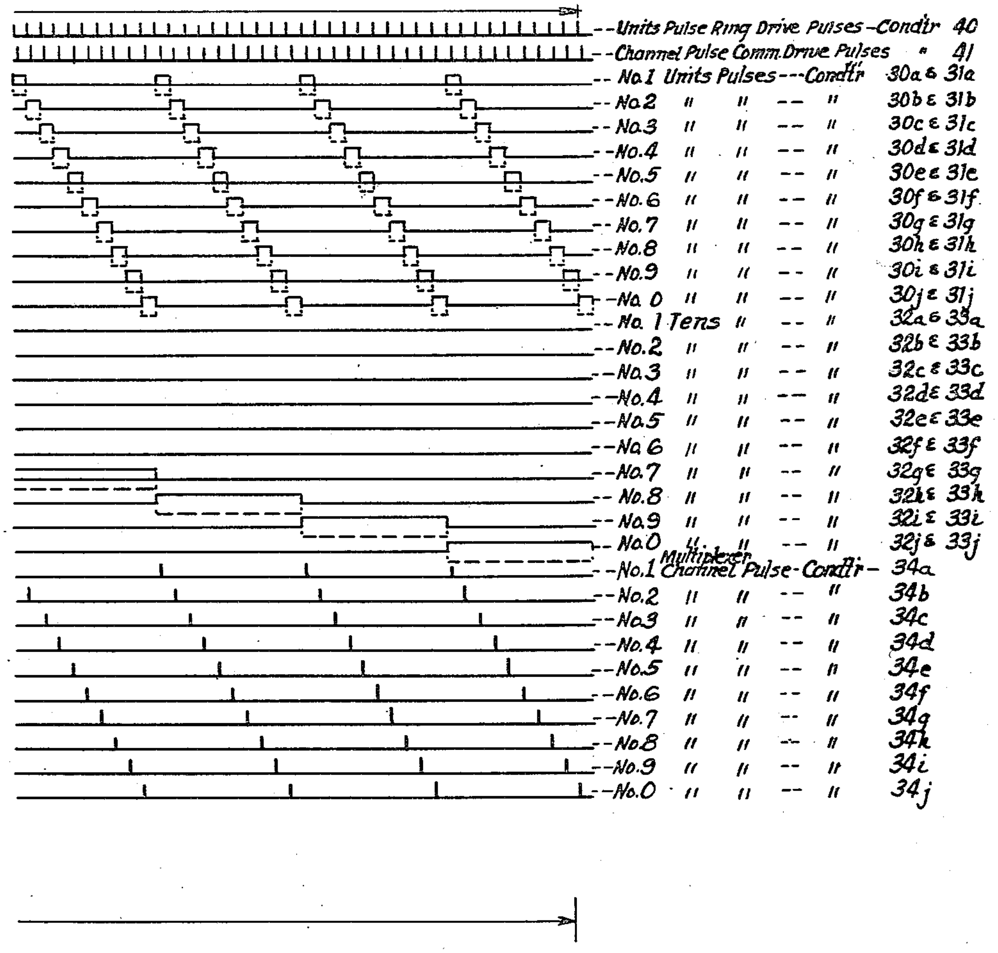

The invention, both as to its organization and method of operation, together with further objects and advantages thereof, will best be understood by reference to the following specification taken in connection with the accompanying drawings, in which:

Figs. 1, 2, 3 and 4, when arranged in the manner shown in Fig. 5, diagrammatically illustrate an electronic telephone system embodying the principles of the present invention;

Figs. 2A and B when laid end to end in the order named diagrammatically illustrate the components of one of the finder connector links embodied in the system shown in Figs. 1 to 4, inclusive;

Figs. 6 through 9, when laid side by side in the order named, graphically illustrate the time relationships between certain of the pulses developed by and utilized in the various components of the system;

Figs. 10, 11, 12, and 13, when arranged in the manner shown in Fig. 19, illustrate the details of the improved line circuit and multiplexer embodied in the system shown in Figs. 1 to 4, inclusive;

Figs. 14 through 18, inclusive, when arranged in the manner shown in Fig. 20, illustrate the details of the distributor and another line circuit embodied in the system shown in Figs. 1 to 4, inclusive.

Referring now to the drawings and more particularly to Figs. 1, 2, 3 and 4 thereof, the present fully automatic electronic telephone system is there illustrated as comprising line circuits 10, 16, etc., individual to the one hundred lines of the system, a multiplexer 11 of which only one is required in the system, a plurality of identical finder-connector links 12, 13 and 14, a distributor 15 of which only one is required in the system, and the common equipment indicated generally at 17 in Fig. 4 of the drawings. Each of the finder-connector links is comprised of a finder and a connector, the illustrated links respectively comprising finders **12*a*, 13*a* and 14*a* and connectors 12*b*, 13*b* and 14*b*. It will be understood that the number of finder-connector links employed in the system may be chosen as required to handle the traffic. Although only three links 12, 13 and 14** have been illustrated, from seven to ten links will normally be required in actual practice to handle the traffic of a one hundred line exchange. Inclusion of the additional links in the system may be easily accomplished by connecting appropriate terminals of additional links to the indicated multiple points. Actually, only twenty-seven multiple connections and one individual connection are required in order to add one finder-connector link to the system. This is in contrast with conventional step-by-step and all-relay type systems wherein more than six hundred multiple connections are normally required to put a single added link into service.

As shown, the line circuits 10 and 16 respectively terminate two two-conductor lines which are respectively identified by their directory number designations 23 and 32 and extend to the substations A and B, respectively. Each line circuit performs the functions of repeating intelligence or control signals from its associated substation to a corresponding one of the gate circuits in the multiplexer 11, repeating intelligence signals derived from a particular gate circuit of the distributor 15 to its associated substation, and of responding to ring start signals derived from one of the connectors **12*b*, 13*b* or 14*b* by way of the distributor 15 to transmit ringing current to the associated substation on a call incoming thereto. To perform these functions, the line circuit 10 is connected by way of conductors 53*a* and 53*b* to one of the gate circuits provided in the multiplexer 11, and is connected by way of the conductor 44 to one of the gate circuits provided in the distributor 16. The line circuit 10 is also connected to certain components of the common equipment 17 in the manner described below. Similarly, the line circuit 16 is connected by way of the conductor 54 to one of the gate circuits in the distributor 15 and by way of the conductors 45*a* and 45*b* forming the illustrated cable 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11 and distributor 15 and on a common basis to certain components of the common equipment 17**.

Generally speaking, the multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the finders and connectors of the plurality of links 12, 13 and 14. To this end, the output terminals of the multiplexer 11 are connected by way of the common conductor 50 to the multiplexer input terminals of each of the finders **12*a*, 13*a* and 14*a* and also to the multiplexer input terminals of each of the connectors 12*b*, 13*b* and 14*b*. In reverse manner, the distributor 15 performs the function of repeating intelligence and control signals derived from the connectors 12*b*, 13*b* and 14*b* in pulse time positions corresponding to particular calling and called lines to the line circuits respectively terminating the lines. To this end, the input terminals of the distributor are connected by way of the common conductor 51 to the output terminals of each of the connectors 12b, 13b and 14b. In performing the described functions, the multiplexer 11 and the distributor 15 are controlled by certain components of the common equipment 17** in the manner hereinafter explained.

The finders of the various links, such, for example, as the finder 12a, do not perform any intelligence transmission functions. On the contrary, they function strictly as control units. Specifically, the finder 12a is provided to perform the function of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder and in the associated connector 12b. To advise the connector of the pulse time position assigned to the calling line, the finder 12a transmits finder gate pulses to the connector in this pulse time position over the conductor 12d. The finder 12a also performs the function of conditioning its associated connector 12b for operation when the link 12 is definitely associated with a calling line to handle the call initiated on the line. This is accomplished through operation of the finder 12a to impress operating anode potentials upon a plurality of the tubes in the connector 12b over the +B switch conductor 12c. When operatively associated with a particular calling line, the finder 12a also performs the function of guarding the calling line against intrusion on an incoming call to the line. This is accomplished through operation of the finder 12a to feed busy pulses occurring in the particular pulse time position assigned to the calling line with which the finder is operatively associated to a common busy conductor 52 which is multiplied to each of the finders and connectors of the system. To perform the above functions in the manner fully explained below, the finder 12a comprises (see Fig. 2A) a pulse input circuit 200, a +B switching circuit 201, a pulse combining circuit 202, tens and units coincidence tube circuits 203 and 204, and a finder pulse forming circuit 205. It will be noted that the finder 12a and connector 12b are connected on an individual link basis by only two conductors, namely the +B switch conductor 12c and the finder gate pulse conductor 12d. The finder 13a and connector 13b of the link 13 are similarly connected on an individual link basis by means of the finder gate and +B switch conductors 13d and 13c which respectively correspond to the conductors 12d and 12c of the link 12. Similarly, the finder gate and +B switch conductors 14d and 14c are provided to connect the finder 14a and connector 14b of the link 14.

Each of the connectors 12b, 13b and 14b performs a plurality of different functions. Thus, the connector 12b, for example, is controlled by finder gate pulses delivered thereto over the conductor 12d to accept and respond to signal bearing multiplexer pulses occurring in the pulse time position corresponding to the calling line with which the link is associated. It also responds to the application of operating anode potential to the conductor 12c and to the finder gate pulses appearing on the conductor 12d to feed a dial tone signal to the distributor 15 on connector signal pulses occurring in the pulse time position assigned to the calling line with which it is operatively associated, thereby to return the usual dial tone signal to the calling subscriber. This connector 12b also responds to dial pulses (two digits) originating at the calling line with which the link 12 is operatively associated to select the particular pulse time position assigned to the called line. Incident to the selection of this time position, the connector 12b conditions itself to accept signal carrying pulses from the multiplexer 11 which occur in the pulse time position corresponding to the selected called line, to store the intelligence carried by these pulses, and to retransmit the intelligence to the distributor 15 on connector signal pulses occurring in the pulse time position corresponding to the calling line with which the link 12 is operatively associated. In effect, therefore, the connector functions to shift signal carrying pulses from the pulse time position assigned to the calling line to the pulse time position assigned to the called line, and also to shift return signal pulses carrying intelligence derived from the called line from the particular pulse time position assigned to the called line to the particular pulse time position corresponding to the calling line. In addition, the connector 12b performs the auxiliary functions of terminating dial tone transmission to the calling substation when the first line selecting impulse is dialed into the connector; feeding busy pulses to the busy conductor 52 in the pulse time position assigned to the called line, thereby to guard the called line against seizure through another link; testing the pulse time position assigned to the called line to determine the idle or busy condition of that line; transmitting busy tone carrying pulses to the distributor 15 in the pulse time position assigned to the calling line in the event the called line tests busy; transmitting a ring start signal by way of the distributor 15 to the line circuit terminating the called line in the event the called line tests idle, concurrently transmitting ring-back tone modulated pulses to the distributor 15 in the pulse time position assigned to the calling line, thereby to signal the calling subscriber that the called substation is being rung; and terminating the ring start signal and concurrently terminating ring-back tone signal transmission to the calling substation in response to answering of the call at the called substation. The connector 12b is also arranged to release in response to the release of a connection involving the link 12 at the calling substation.

To perform the above-mentioned functions in the manner fully explained below, the connector 12b, as diagrammatically illustrated in Fig. 2B, is provided with a calling line in gate circuit 207 which responds to finder gate pulses transmitted to the connector over the conductor 12d to repeat signal bearing pulses delivered thereto from the multiplexer 11 in the pulse time position assigned to the calling line, and a calling line reconstructor circuit 208 having the function of detecting or reconstructing and storing the intelligence carried by the signal bearing pulses transmitted to the connector from the multiplexer 11 in the pulse time position assigned to the calling line. The connector 12b further comprises a called line out gate circuit 224 for gating to the distributor 15 connector signal pulses carrying the intelligence reconstructed by the circuit 208 in the time position assigned to a particular called line. In addition, the connector 12b includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12d to gate the distributor 15 signal bearing connector pulses which occur in the pulse time position assigned to the calling line. More generally, the three circuits 207, 208 and 224 function to repeat intelligence from the calling line to the called line, whereas the three corresponding circuits 223, 222 and 226 function to repeat to the calling line intelligence derived from the called line.

The connector 12b additionally comprises a plurality of components for responding to two digits of dial pulses repeated to the connector on multiplexer pulses occurring in the pulse time position assigned to the calling line. In general, the dial pulse responsive equipment of the connector 12b comprises a dial impulse integrator circuit 209 which receives dial impulses from the reconstructor circuit 208, a tens changeover gate circuit 210, a units start gate circuit 213 to which pulses are repeated by the dial pulse integrator circuit 209, tens and units digit registers 211 and 215 which are respectively controlled in accordance with the numerical values of the tens and units digits repeated to the circuits 210 and 213 from the integrator circuit 209, a units changeover gate circuit 214 interposed between the start gate circuit 213 and the units digit register 215, and tens and units sequence timing circuits 212 and 216 which in effect function as the digit counting components of the connector, i. e., initiate certain operations at the ends of the first and second digits dialed into the connector. The connector further comprises a connector pulse forming circuit 217 which is controlled in accordance with the settings imparted to the tens and units digit registers 211 and 215 at the end of a dialing operation to produce the connector pulses which are employed to control the circuits 222, 223 and 224 in the transmission of intelligence and control signal information from the connector to the distributor 15 in the pulse time position assigned to the called line. The busy test facilities of the connector comprise a busy test circuit 218 jointly controlled by the connector pulse forming circuit 217 and busy pulses transmitted to the connector over the common busy lead 52, a busy lock circuit 219 and a busy gate circuit 220. In addition, the connector comprises supervisory tone gate circuits 225 having the function of gating dial, busy and ring-back tones to the calling line. Finally, the connector comprises a ring trip circuit 221 which is assigned the function of terminating ringing current transmission to a called substation when a call answering operation is performed at the substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 functions continuously to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network in the manner more fully explained below. As controlled by the phase shifter and pulse former network 19, the units pulse ring circuit 20 functions sequentially to develop the units pulses which define the pulse time positions of the pulse frames, appear on the conductors within the cables 31 and 30, respectively, and are fed by way of these conductors to the various intelligence transmitting and control components of the system. More specifically, the cable 30 comprises ten units pulse conductors 30*a*, 30*b*–30*j* over which negative units pulses are sequentially transmitted in the order named to the units coincidence tube circuits 204, of the finders 12*a*, 13*a* and 14*a* and the units digits registers 215 of the connectors 12*b*, 13*b* and 14*b*. In time coincidence with the described negative units pulses, the ring circuit 20 produces positive units pulses on the ten units pulse conductors 31*a*, 31*b*–31*j* forming the cable 31, which are transmitted to the units gate circuits of the distributor 15 and also to the pulse gate circuits of a channel pulse commutator 22. The positive units pulses developed upon the two conductors 31*a* and 31*f* are also employed to control a bias and ringing carrier supply circuit 26. The positive and negative units pulses are sequentially developed on the units leads 31 and 30, respectively, at a frequency rate of 100 kilocycles and each tenth positive units pulse, i. e., each pulse appearing on the units pulse conductor 31*j*, is used to step or trigger a tens pulse ring circuit 21 having the function of developing the positive and negative tens pulses, each of which spans the time interval of ten units pulses. The positive tens pulses as sequentially produced by the ring circuit 21 on the tens pulse conductors 32*a*, 32*b*–32*j* forming the cable 32 are impressed upon the tens pulse gate circuits of the multiplexer 11 and the tens pulse gate circuits of the distributor 15 in the manner more fully explained below. The negative tens pulses as produced by the ring circuit 21 in time coincidence with the positive tens pulses and as sequentially impressed on the tens pulse conductors 33*a*, 33*b*–33*j* forming the cable 33 are impressed on the tens coincidence tube circuits 203 of the finders 12*a*, 12*b* and 12*c* and the tens digit registers 211 embodied in the connectors 12*b*, 13*b* and 14*b*, all in the manner more fully explained below. As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34*a*, 34*b*–34*j* forming the cable 34, which are fed to the units pulse gate circuits of the multiplexer 11. These channel pulses occur at the same frequency as the units pulses, but are much narrower in width. For example, the channel pulses appearing on the conductor 34*a* are much narrower than the units pulses appearing on the positive units pulse lead 31*a* and are preferably so phased relative to the units pulses that each channel pulse occurs well within the limits of the coincident positive units pulse. Commutator drive pulses as derived from the commutator drive circuit 25 are also transmitted directly over a commutator drive pulse conductor 35 to the out gate circuits 224 and 226 of each of the connectors 12*b*, 13*b* and 14*b*.

The common equipment 17 further comprises a link allotter 24 having the function of developing link allotting pulses of relatively long duration (preferably each pulse persists for at least one millisecond) successively on the link allotting conductors 36*a*, 36*b* and 36*c*. These conductors individually extend to the pulse combining circuits 202 of the finders 12*a*, 13*a*, and 14*a* and the pulses impressed thereon perform the function of rendering the respective corresponding links available for use providing the links are not already occupied with calls.

As indicated above, the line circuits 10, 16, etc., individually terminating the lines of the system, perform the function of transmitting ringing current to their respective associated substations. Keyed ringing current transmission from any line circuit terminating a called idle line is effected at a predetermined slow rate of the order of one second on and four seconds off, under the control of the bias and ringing carrier supply circuit 26 and a keying circuit 27 which are embodied in the common equipment 17 and are connected to each of the line circuits 10, 16, etc., over common multiple conductors 37 and 38. The common equipment also includes dial tone and busy tone sources which are collectively indicated at 29 in Fig. 4 of the drawings and are respectively connected by way of the multiple conductors 46 and 47 to the supervisory tone gate circuits 225 of each of the connectors 12*b*, 13*b* and 14*b*. The common equipment further comprises a ring-back tone generator 29*c*, the output signal of which is keyed by the ringing keying circuit 27 and supplied to the supervisory tone gate circuits 225 of each of the connectors 12*b*, 13*b* and 14*b* over a common multiple conductor 48. Finally, the common equipment includes a ringing supply circuit 60 which embodies a 20 cycle ringing current source and which is connected by way of two common multiple conductors 61a and 61b within the cable 61 to each of the line circuits of the system.

In order to render the mode of operation of the system more readily understandable, a pulse chart has been illustrated in Figs. 6–9, inclusive, to show the relative widths of the pulses developed by the common equipment components 19, 25, 20, 21 and 22 during two successive pulse frames, as well as the time or phase relationship between the pulses. As there shown, the units pulse ring drive pulses 95a, appearing on the conductor 40 are produced by the phase shifter and pulse former circuit 19 along the zero potential reference line 95 at a frequency rate of one megacycle and are of positive polarity. Similarly, the channel pulse commutator drive pulses 96a appearing on the conductors 41 and 35 are produced by the phase shifter and pulse former network 19 along the zero potential reference line 96 at the same frequency of one megacycle and are of positive polarity. It will be noted that both the units pulse ring drive pulses 95a and the commutator drive pulses 96a are very narrow, i. e., persist for very short time intervals, and that the pulses 96a are so displaced in time relative to the pulses 95a that each commutator drive pulse 96a occurs approximately at the middle of the period separating the preceding and succeeding units pulse ring drive pulses 95a. The positive units pulses appearing respectively on the units pulse conductors 31b, 31c–31j and the negative units pulses coincidentally appearing on the units pulse conductors 31a, 31b–31j are produced along the zero potential reference lines 62, 63–71. More specifically, the positive units pulses produced along these potential reference lines and appearing on the units pulse conductors 31 are shown in solid lines, whereas the coincident negative units pulses produced along the same reference lines and appearing on the units pulse conductors 30 are shown in dash lines. It will be noted that the units pulses are produced by the units pulse ring circuit 20 at the fundamental frequency rate of one megacycle. However, due to diversion of the pulses successively to different ones of the units pulse conductors a, b–j, the pulses along any particular zero potential reference line, such, for example, as the line 62, recur only at a frequency rate of one hundred kilocycles. It will also be noted that the units pulses, both positive and negative, are successively produced on the units pulse conductors 30 and 31 in the order of alphabetical designation of these conductors. Thus, successive positive and coincident negative units pulses produced along any particular zero potential reference line, as, for example, those occurring during the units pulse periods 62a, 62b, 62c, etc., along the potential reference line 62, are separated by a time interval equaling the sum of nine units pulse time positions and during which units pulses are produced successively along each of the nine other zero potential reference lines.

The negative tens pulses successively produced by the tens pulse ring circuit 21 on the tens pulse conductors 33a, 33b–33j and the positive tens pulses coincidentally produced on the tens pulse conductors 32a, 32b–32j are illustrated as appearing along the ten zero potential reference lines 72 to 81, inclusive. Here also, the positive tens pulses are shown in solid lines, whereas the coincidentally produced negative tens pulses are shown in dash lines. It will be noted that each tens pulse persists for a time interval exactly equaling the time required to produce ten units pulses. Thus, the positive and negative tens pulse 72a persists for the duration of the interval in which the ten units pulses 62a–71a are successively produced by the units pulse ring circuit 20. It will also be noted that the starting point of each tens pulse period 72a, 73e, 74a, etc., is exactly coincident with the starting points of the positive and negative units pulses 62a, 62b, 62c, etc., appearing along the zero potential reference line 62 and impressed upon the units pulse conductors 30a and 31a, respectively, by the units pulse ring circuit 20. Further, each tens pulse period terminates at the exact instant of termination of the positive and negative units pulses 71a, 71b, 71c, etc., appearing along the zero potential reference line 72 and produced by the units pulse ring circuit 20 on the conductors 30j and 31j, respectively. The described synchronism between the time positions of the tens pulses and the time positions of the units pulses successively produced on the units pulse conductors by the ring circuit 20 is obtained and maintained by employing the trailing edges of the positive units pulses appearing on the last positive units pulse conductor 31j to step or trigger the tens pulse ring 21 on a periodic basis.

The channel pulses which are successively produced on the ten channel pulse conductors 34a, 34b–34j by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96a appearing along the zero potential reference line 96. Like the positive and negative units pulses, the channel pulses are produced at the fundamental frequency rate of one megacycle, but due to the action of the commutator 22 in diverting these pulses successively to the conductors 34a, 34b–34j recur only on each of these conductors at a rate of one hundred kilocycles. Thus, the channel pulses 82a, 82b, 82c, etc., appearing along the reference line 82 and impressed on the conductor 34a are spaced apart timewise by like intervals each of which exactly equals the sum of ten units pulse time periods. During this spacing interval, nine additional channel pulses are succesively produced along the reference lines 83, 84–91 to appear on the conductors 34b, 34c-34j. It will also be noted that the channel pulses are very narrow in width, having a persistence interval of the order of one-fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95a, to open the gating circuits of the channel pulse commutator 22 in the manner more fully explained below. The purpose of thus positioning the signal bearing pulses in the units pulse time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 37 to 40, inclusive, in mind, it will readily be understood that each pulse frame is divided into one hundred readily identifiable pulse time positions. Thus, the first ten pulse time positions of each pulse frame, which are respectively assigned to the lines of the system having the directory number designations 11, 12—10, are defined by the first tens pulse period 72a of the frame within which the ten units pulse periods 62a, 63a, 64a–71a occur. Similarly, the second ten pulse time positions, which are respectively assigned to the lines of the system having the directory number designations 21, 22, 23—20, are defined by the second tens pulse period 73a during which the ten units pulse periods 62b, 63b, 64b–71b occur. Again, the third ten pulse time positions, which are respectively assigned to the lines of the system having the directory number designations 31, 32, 33—30, are marked out by the third tens pulse time period 7 during which the ten units pulse periods 62c, 63c, 64c–71c occur. Thus, it will be understood that the pulse time position of each pulse frame which is assigned to the illustrated line 23 occurs during the second tens pulse interval 73a of each pulse frame and is coincident with the units pulse period 64*b* of each pulse frame. It will also be apparent that the corresponding signal pulse 84*b* occurs well within the limits of this pulse time position. Similarly, the pulse time position 32 assigned to the illustrated line 32 occurs during the third tens pulse time interval 74*a* of each pulse frame and is coincident with the second units pulse period 63*c* of each pulse frame. Here again, each channel pulse 83*c* corresponding to the line 32 occurs well within the limits of the particular pulse time position assigned to the line 32 in each pulse frame.

Briefly to consider the general mode of operation of the system, it may be assumed that the substation B is called from the substation A during a period when the finder-connector link 12 is idle and is allotted for use under the control of the link allotter 24. When the receiver or hand set at the substation A is lifted from its supporting hook or cradle to initiate the call, a loop circuit including the conductors of the line 23 is closed to the line circuit 10, with the result that this line circuit immediately operates to change the magnitude of the bias potential which it delivers over the conductor 53*b* to the gating circuit of the multiplexer 11 which individually corresponds to the line 23. The multiplexer 11 responds to this change in magnitude of the controlling bias potential supplied thereto from the line circuit 10 by opening the gate corresponding to the line 23. Accordingly, only the signal pulses 84*b* occurring during the pulse time positions 64*b* of successive pulse frames, are permitted to pass over the common conductor 50 to the pulse input circuits 200 of the finders 12*a*, 13*a* and 14*a* and the in gate circuits 207 and 223 of the connectors 12*b*, 13*b* and 14*b* in parallel. At this point the pulses transmitted from the multiplexer 11 over the common conductor in the pulse time position 64*b* may be regarded as multiplexer pulses 84*b*. Since only the link 12 is conditioned by the allotter 24 and the combining circuit 202 of the finder 12*a* to handle the call, and the connector 12*b* of this link is as yet inoperative, only the finder 12*a* initially responds to the multiplexer pulses 84*b* delivered thereto from the multiplexer 11 over the conductor 50 in the described pulse time position 64*b*.

In the finder 12*a* the multiplexer pulses 84*b* are repeated by the pulse input circuit 200 to effect substantially immediate operation of the +B switching circuit 201 embodied in this finder, whereby operating anode potentials are delivered to the tubes of the circuits 209, 211, 212, 213, 214, 215, 216, 218, 219, 223, 224 and 225 of the connector 12*b* over the +B switch conductor 12*c* with the result that the connector 12*b* is conditioned for operation, i. e., conditioned to respond to signal carrying multiplexer pulses delivered thereto from the multiplexer 11 over the conductor 50. Operation of the +B switching circuit in the finder 12*a* also has the effect of conditioning the tens and units coincidence tube circuits 203 and 204 of this finder for operation under the joint control of the multiplexer pulses 84*b* repeated by the input circuit 200, the negative tens pulses developed by the tens pulse ring circuit 21 and the negative units pulses developed by the units pulse ring circuit 20. In responding to the tens and units pulses impressed thereon coincidentally with the multiplexer pulses 84*b*, the tens and units coincidence tube circuits 203 and 204 of the finder 12*a* cooperate with the finder pulse forming circuit 205 and the combining circuit 202 of this finder to produce finder gating pulses which are transmitted over the conductor 12*d* to the circuits 207, 208 and 226 of the connector 12*b* and have the effect of initially limiting the response of the connector only to multiplexer pulses 84*b* appearing in the pulse time position 64*b*. The combining circuit 202 of the finder 12*a* also gates busy pulses in the pulse time position 64*b* which are fed over the common busy load 52 to each of the other finders and connectors of the system to prevent these finders from responding to multiplexer pulses occurring in this time position. Thus, the line 23 is guarded against intrusion on an incoming call. In addition, the pulses gated by the circuit 202 to the conductor 12*d* are impressed upon the pulse input circuit 200, thereby to render the finder 12*a* responsive only to multiplexer pulses 84*b* appearing in the pulse time position 64*b*. Finally, the busy pulses developed in the time position 64*b* render the finder 12*a* non-responsive to link allotter pulses impressed upon the allotter conductor 36*a*, individual to the link 12, by the allotter 24. After the finder 12*a* has operated to perform the described functions, continued holding of the finder 12*a* is dependent upon continued acceptance and transmission of multiplexer pulses 84*b* by the pulse input circuit 200, which of course means that the finder will remain associated with the calling line 23 only so long as a calling condition persists on this line.

As indicated above, when the +B switching circuit 201 of the finder 12*a* operates to apply operating anode potential to the conductor 21*c*, the circuits 209, 211, 212, 213, 214, 215, 216, 218, 219, 223, 224 and 225 of the connector 12*b* are conditioned for operation. Immediately anode potential is applied to the dial tone gating tube of the network 225, this network functions to transmit a dial tone signal, derived from the dial tone generator 29*b* over the conductor 47, to the calling line out gate circuit 226 over the conductor 244. This circuit in responding to the dial tone signal and also to the finder gate pulses delivered thereto over the conductor 12*d* and the commutator drive pulses 96*a* delivered thereto over the conductor 35, functions to repeat over the channel conductor 51 to the distributor 15 connector signal pulses modulated in accordance with the dial tone signal in the pulse time position 64*b* assigned to the calling line. The distributor 15 responds to the connector signal pulses thus transmitted thereto by repeating the same through the tens and units gate circuits thereof, reconstructing the original signals from the signal samples and supplying the reconstructed signals over the conductor 44 to the line circuit 10. In the line circuit 10, the dial tone signal is transmitted over the line 23 to signal the calling subscriber that the dialing operation may be initiated.

Two digits of dial impulses must be dialed into the connector 12*b* in order to effect selection in the connector of the pulse time position 63*c* assigned to the called line 32. More specifically, the directory number digits 3 and 2 must be dialed successively into the connector 12*b* to effect selection of the pulse time position 63*c*. During the open circuit period of each dial impulse, the control bias supplied by the line circuit 10 to that units gate circuit of the multiplexer 11 which corresponds to the calling line 23 is returned to its on hook value to interrupt the transmission of multiplexer pulses 84*b* over the conductor 50 to the pulse input circuit 200 of the finder 12*a* and to the in gate circuits 223 and 207 of the connector 12*b*. At this point, it is noted that the +B switching circuit is provided with time delay facilities which prevent this circuit from removing operating anode potential from the conductor 12*c* during the open circuit periods of dial impulses, hook switch flashing and the like. Thus, premature release of the link 12 during dialing is positively prevented through the action of the +B switching circuit 201 to maintain operating anode potential upon the conductor 12*c* during the open circuit period of each dial impulse. With the +B switching circuit 201 operating to supply anode potentials to the tubes of the coincidence tube circuits 203 and 204 of the finder 12*a*, finder gating pulses continue to be transmitted over the conductor 12*d* to the circuits 207, 208, and 226 of the connector 12*b*. Thus, these circuits are held in condition to respond to intelligence and control signals delivered thereto from the multiplexer 11 on multiplexer pulses 84*b* impressed upon the conductor 50 in the pulse time position 64*b*.

During the make period of each impulse dialed at the calling substation multiplexer signal pulse transmission from the multiplexer 11 to the finder 12a and the connector 12b in the pulse time position 64b is resumed. As controlled by the finder gating pulses delivered to the circuits 207 and 208 from the circuit 202 over the conductor 12d, the circuits 207 and 208 function to repeat any intelligence or control signals derived from the calling line 23 to the dial impulse integrator circuit 209. This circuit differentiates between intelligence modulated multiplexer pulses and dial impulse modulated multiplexer pulses in such manner that only the latter appear at the output terminals of this circuit. More specifically, during each dial impulse generated at the calling substation A, the impulse integrator circuit 209 develops coincident impulses which are impressed upon the tens changeover gate circuit 210 and the units start gate circuit 213 over the conductors 227 and 228, respectively. Pending operation of the tens sequence timing circuit 212, the units start gate circuit 213 is held non-responsive to the three impulses transmitted thereto by the dial impulse integrator circuit 209 during dialing of the first digit 3 at the calling substation. However, the tens changeover gate circuit functions to repeat the three impulses over the conductors 230 and 231 respectively to the tens digit register circuit 211 and the tens sequence timing circuit 212. In responding to the three impulses thus transmitted thereto, the tens digit register 211 is driven to a setting wherein tens pulses appearing on the negative tens pulse conductor 33c in the third tens pulse time position 74a of each pulse frame may be transmitted through the third tens gate of this register and over conductor 232, to the connector pulse forming circuit 217. Transmission of the three impulses individually corresponding to the three break periods of the first digit dialed at the calling substation over the conductor 231 to the tens sequence timing circuit 212 has the effect of conditioning this circuit to block the tens changeover gate circuit from repeating impulses to the tens digit register 211 during dialing of the second digit and to render the units start gate circuit 213 operative to repeat the pulses delivered thereto by the dial impulse integrator circuit 209 during dialing of the sound digit at the calling substation. Immediately the first dial impulse is repeated to the tens digit register 211 to drive this register off normal, a control potential is developed on the conductor 233 which biases the dial tone gate tube of the network 225 beyond cut-off, such that dial tone transmission through this gate tube to the calling line out gate circuit 226 over the conductor 244 is terminated. Thus, transmission of the dial tone signal to the calling substation A is arrested.

During the interdigit pause which separates dialing of the first and second digits at the calling substation, the tens sequence timing circuit 212 assumes a stable operating condition wherein a controlling potential is impressed upon the conductor 234 to bias the tens changeover gate circuit 210 against repeating further impulses transmitted thereto from the dial impulse integrator circuit 209. In assuming this condition, the tens sequence timing circuit 212 also changes the potential level on the conductor 235 to render the units start gate circuit operative to repeat impulses delivered thereto from the dial impulse integrator circuit 209 to the units changeover gate circuit 214 over the conductor 238.

During dialing of the second digit 2 at the calling substation A, the dial impulse integrator circuit 209 responds by transmitting two impulses to each of the gate circuits 210 and 213. As noted above, however, the changeover gate circuit 210 is now blocked against repeating these impulses. The units start gate circuit 213 repeats the two impulses to the units changeover gate circuit 214 over the conductor 238 and the latter circuit repeats the impulses over the conductors 236 and 237, respectively, to the units digit register 215 and the units sequence timing circuit 216. As a consequence, the units digit register is operated or driven to open the second units gate circuit therein, thereby to establish a path for the transmission of units pulses appearing in the time positions 63a, 63b, 63c, etc., to the connector pulse former circuit 217. The two pulses repeated to the units sequence timing circuit 216 over the conductor 237 serve to condition this circuit for operation at the end of the second digit.

At the end of the second digit dialed into the connector 12b the units sequence timing circuit 216 operates to change the potential level on the conductor 241 to a value such that the units changeover gate circuit 214 is blocked against further pulse transmission therethrough. Concurrently, a potential is applied to the conductor 242 in the units sequence timing circuit 216 which has the effect of rendering the busy test circuit 218 operative to determine the idle or busy condition of the called line by testing the pulse time position 63c assigned to this line.

The potential applied to the conductor 242 also has the effect of rendering the connector pulse former circuit 217 operative to mix the tens and units pulses respectively transmitted thereto from the registers 211 and 215 over the conductors 232 and 245 to produce a resultant connector pulse which appears on the conductor 239. More specifically, the tens pulses 74a appearing on the negative tens pulse conductor 33c and gated by the tens digit register 211 are transmitted to the connector pulse former circuit 217 over the conductor 232 where they are mixed with the negative units pulses appearing in the time position 63c which are gated by the units register 215 and transmitted to the circuit 217 over the conductor 245. Mixing of these pulses in the circuit 217 results in the production of a resultant connector pulse which occurs during each pulse frame in the pulse time position 63c assigned to the called line. These pulses are transmitted over the conductor 239 to the connector components 218, 220, 222, 223 and 224.

Effectively, the busy test circuit 218 and the busy lock circuit 219 cooperate to perform the busy test operation in the connector 12b. More specifically, if the called line 32 is busy, i. e., occupied with a call, busy pulses are present on the common busy conductor 52 in the pulse time position 63c assigned to the called line. The manner in which such busy pulses are applied to the conductor 52 in another link occupied with the call involving the line 32 will be apparent from the foregoing explanation. These busy pulses are impressed upon the busy test circuit 218 coincidentally with the connector pulses developed by the connector pulse forming circuit 217 and impressed upon the busy test circuit 218 over the conductor 239. Coincidence between the connector pulses and the busy pulses has the effect of preventing the busy test circuit from operating. Thus, the busy condition of the called line is indicated.

In the event the called line is busy, the busy lock circuit 219 as controlled over the conductors 242 and 246 and through the resistor 247 from the units sequence timing circuit 216 measures a predetermined time interval, i. e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone source by way of the conductor 46, the busy gate circuit in the network 225, the calling line out gate circuit 226, the channel conductor 51, the distributor 15 and the line circuit 10 to the calling line. Thus, the calling subscriber is advised of the busy condition of the called line.

Assuming that the called line 32 is idle at the time the pulse time position 63c assigned thereto is selected in the connector in the manner explained above, such busy pulses as may be present on the common busy lead 52 do not occur coincidentally with the connector pulses generated by the connector pulse forming circuit 217 in the pulse time position 63c assigned to the called line. When coincidence between the connector pulses and the busy pulses is lacking, the busy test circuit operates immediately the first connector pulse is impressed thereon from the connector pulse forming circuit 217 over the conductor 239. In operating, the circuit 218 impresses a positive potential upon the cut-through conductor 251 which is applied to the busy lock circuit 219 to prevent the latter circuit from operating at the end of the busy test interval. The positive potential applied to the cut-through conductor 251 in the busy test circuit 218 when this circuit operates is also applied to the called line out gate circuit 224 to condition the latter circuit to repeat connector signal pulses in the time position 63c to the distributor 15, and is applied to the busy gate circuit 220 so that connector pulses are released to the busy conductor 52 and is also applied to the network 225 to act as an operating anode potential for the ring back tone gate tube of this network. The positive potential developed on the cut-through conductor 251 is also applied to the called line in-gate circuit 223 and the called line reconstructor circuit 222, thereby to condition these circuits to accept signals derived from the called line. This feature of making operation of the circuit 223 and 222 dependent upon operation of the busy test circuit to indicate that the called line is idle, is necessary in order to prevent the calling subscriber from listening in on a conversation being held over the called line when the called line is busy.

The positive potential applied to the cut-through conductor 251 is also impressed upon the ring trip circuit 221 and is applied through certain components of this circuit to the ring trip conductor 253 which extends to both the called line out gate circuit 224 and to the ring back tone gate circuit of the network 225. When this occurs, the ring back tone gate circuit of the network 225 is rendered operative to transmit the intermittent ring back tone signal derived from the keying circuit 27 over the conductor 48 to the calling line out gate circuit 226 over the conductor 244. The ring back tone signal is modulated on the signal pulses developed by the out gate circuit 226 and thus transmitted by way of the conductor 51 to the distributor 15 where the ring back tone signal is reconstructed and applied to the line circuit 10. In the line circuit 10, the ring back tone signal is transmitted over the calling line 23 to the calling substation. Thus, the calling subscriber is signaled that the called substation is being rung.

When the called line out gate circuit 224 is conditioned for operation through application of the described positive potential to the cut-through conductor 251, it responds to the connector pulses impressed upon the connector pulse conductor 239 by connector pulse forming circuit 217 by gating certain commutator drive pulses derived from the commutator drive circuit 25 over the conductor 35. More specifically, the commutator drive pulses transmitted over the conductor 35 by the commutator drive circuit 25 are gated by the connector pulses produced on the conductor 239 in the pulse time position 63c assigned to the called line, whereby very narrow connector signal pulses are released over the conductor 51 to the distributor 15 which are well within the limits of the pulse time position 63c assigned to the called line. So long as the positive potential applied to the cut-through conductor 251 in the busy test circuit 218 is fed through the ring trip circuit 221 to the ring trip conductor 253, the called line out gate circuit 224 is controlled to release connector signal pulses to the distributor 15 in the pulse time position 63c which are approximately fifty percent larger in amplitude than those used to convey intelligence signals to the distributor 15 after the call is answered at the called substation B. These large amplitude signal pulses are diverted by the distributor 15 to the line circuit 16 and serve to signal this line circuit that the ringing operation should start.

More specifically, the large amplitude connector signal pulses are detected by the distributor 15 and supplied to the line circuit 16 over the conductor 54. In this line circuit, the detected pulses have the effect of activating the ringing control facilities of the line circuit 16 with the result that ringing current keyed at a slow rate of approximately one second on and four seconds off is transmitted over the line 32 to energize the ringer provided at the called substation B. Ringing of the called substation persists until the call is answered or until the call is abandoned at the calling substation A. Assuming that the call is answered, the line circuit 16 functions to change the magnitude of the control potential supplied over the conductor 45a to the multiplexer 11 with the result that the gate assigned to the called line 32 in the multiplexer 11 is opened to permit multiplexer pulses 83c occurring in the pulse time position 63c of each pulse frame to be transmitted through the multiplexer 11 and over the conductor 50 to the multiplexer input terminals of each of the finders and connectors of the system.

The multiplexer pulses 83c are impressed upon the calling and called line in gate circuits 207 and 223 in the connector 12b. In the calling line in gate circuit 207, the repeated multiplexer pulses 83c are not in coincidence with the finder gate pulses impressed upon the circuit 207 over the conductor 12d and hence are not repeated to the reconstructor circuit 208. However, in the called line in gate circuit 223 the multiplexer pulses 83c occur in time coincidence with the connector pulses impressed upon the circuit 223 over the connector pulse conductor 239 from the connector pulse forming circuit 217. As a consequence, the call answering signal carried thereby is gated to the reconstructor circuit 222 where it is detected to produce a potential on the conductor 252 which has the effect of tripping the ring trip circuit 221. In operating, the ring trip circuit 221 functions substantially to decrease the positive potential on the ring trip conductor 253. The called line out gate circuit 224 responds to this reduction in potential on the conductor 253 by decreasing by approximately fifty percent the amplitude of the connector signal pulses transmitted over the conductor 51 to the distributor 15, and after detection, to the line circuit 16. The ringing control facilities of the line circuit 16 respond to this decrease in the amplitude of the connector signal pulses by terminating the transmission of ringing current to the called substation. Thus, the ringing operation is arrested. The decrease in the positive potential present on the ring trip conductor 253 which occurs when the ring trip circuit 221 operates also has the effect of closing the ring back tone signal transmission gate of the network 225, with the result that transmission of the ring back tone signal to the calling substation is arrested.

Following the described operations in the connector 12b, a two-way talking or communication circuit is fully established between the calling substation A and the called substation B. Thus, voice or other signals developed at the substation A and transmitted over the line 23 to the line circuit 10 are impressed upon the gate circuit of the multiplexer 11 over the conductors 53b and vary the potential of a control electrode of the gate tube directly in accordance with the instantaneous amplitude of such signals. As a consequence, the multiplexer pulses 84b released by the multiplexer 11 over the conductor 50 to the finders and connectors of the system in the pulse time position 64b are modulated in accordance with the voice or other signals developed at the calling substation A. These signal modulated multiplexer pulses cannot be accepted by any finder of the system other than the finder 12a or any connector of the system other than the connector 12b because of the busy pulses fed to the busy conductor 52 from the circuit 205. In the finder 12*a*, the multiplexer pulses 84*b* maintain the +B switching circuit 201 operated to hold the link 12 associated with the line 23. The signal modulated multiplexer pulses 84*b* are also transmitted through the calling line in gate circuit 207 and over the conductor 255 to the calling line reconstructor circuit 208 where they occur in time coincidence with the finder gating pulses impressed upon the reconstructor circuit over the conductor 12*d* in pulse time position 64*b*. As a consequence, the voice signal components thereof are detected or reconstructed and stored in the reconstructor circuit 208. This stored signal information is impressed upon the called line out gate circuit 224 over the conductor 256. In the called line out gate circuit, the signals derived from the calling line reconstructor circuit 208 are modulated upon the connector signal pulses developed by the out gate circuit 224 in the pulse time position 63*c* assigned to the called line. These modulated signal pulses are transmitted to the distributor 15 over the conductor 51 wherein the signals are reconstructed and released by the distributor 15 to the line circuit 16. In the line circuit 16, the signals are transmitted over the line 32 to the called substation B where they are audibly reproduced by the receiver of the telephone instrument provided at the called substation.

Voice signals developed at the called substation B and transmitted over the line 32 to the line circuit 16 cause the potential delivered over the conductor 45*b* to the gate circuit of the multiplexer 11 which corresponds to the called line 32 to vary in exact accordance therewith. As a consequence, the voice signals are modulated upon the multiplexer pulses 83*c* occurring within the pulse time position 63*c* and released through the gate circuit of the multiplexer and over the conductor 50 to the finders and connectors of the system. These signal modulated multiplexer pulses cannot be accepted by any finder of the system for the reason that the finder 12*a* is synchronized to accept only multiplexer pulses 84*b* occurring in the time position 64*b* and the busy pulses fed to the busy conductor 52 in the time position 64*b* assigned to the called line by the busy gate circuit 220 of the connector 12*b* prevent the other finders from accepting or responding to the described signal modulated multiplexer pulses 83*c*. In the connector 12*b*, the signal modulated multiplexer pulses 83*c* are impressed upon the calling and called line in gate circuits 207 and 223 and are repeated by the circuits 223 over the conductor 254 to the called line reconstructor circuit 222. Due to lack of coincidence between the signal bearing multiplexer pulses 83*c* and the finder gating pulses impressed upon the calling line in gate circuit 207 over the conductor 12*d*, the circuit 207 does not gate these pulses to the reconstructor circuit 208. By virtue of the coincidence between the signal bearing multiplexer pulses 83*c* and the connector pulses appearing coincidentally on the conductor 239, both of which are impressed upon the called line reconstructor circuit 222, this circuit detects or reconstructs and stores the voice signal components carried by the multiplexer pulses 83*c*. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12*d*. The voice signal modulated pulses developed in the calling line out gate circuit 226 are supplied to the distributor 15 where they are detected and released in the pulse time position 64*b* to the line circuit 10 through the gating circuit of the distributor which corresponds to the calling line. In the line circuit 10, the detected signals are transmitted over the line 23 to the calling substation A where they are audibly reproduced by the receiver of the telephone instrument provided at this substation.

As will be apparent from the foregoing explanation, a fully complete two-way talking circuit is established between the calling and called substations. Moreover, this circuit effectively comprises two mutually non-interfering channels between the calling line 23 and the called line 32 such that voice signals simultaneously produced at both substations will be transmitted without interference through the switching equipment of the system to the appropriate destination point or substation. This non-interfering feature of the system primarily results from the assignment of two discreet and non-interfering pulse time positions in each pulse frame for the transmission of voice or intelligence modulated signals simultaneously through the switching equipment of the system in both directions. Secondarily, it results from physical separation of the intelligence gating circuits in the connector 12*b* into six discreet components. Thus, the calling line in gate circuit 207, the calling line reconstructor circuit 208 and the called line out gate circuit 224 are used only to repeat intelligence or voice signals from the calling line to the called line, whereas the called line in gate circuit 223, the called line reconstructor circuit 222 and the calling line out gate circuit 226 are used only to repeat intelligence or voice signals from the called line to the calling line.

In describing the manner in which the system components 10, 11, 12*a*, 12*b*, 15 and 16 are partially or wholly released upon termination of the call, it may be assumed first that the called party at the substation B is the first to hang up. In such case, the bias potential delivered from the line circuit 16 over the conductor 45*a* to the gating circuit of the multiplexer 11 individually assigned to the called line 32 is restored to its normal value when the called line loop circuit is opened, with the result that multiplexer pulses 83*c* appearing in the pulse time position 63*c* are no longer transmitted over the conductor 50 to the finders and connectors of the system. Such termination of multiplexer pulse transmission in the time position 63*c* to the finders and connectors of the system has no effect other than inactivation of the connector components 223 and 222 and the removal of modulation components from the connector signal pulses transmitted by way of circuit 226 and the distributor 15 to the line circuit 10. In other words, busy pulses in the time position 63*c* assigned to the called line continue to be fed to the busy conductor 52 from the busy gate circuit 220 of the connector 12*b*, thereby to prevent the called line 32 from originating a call or accepting an incoming call. This, of course, means that if the called subscriber picks up his receiver or hand set before the connection is released at the calling substation A, conversation may be resumed between the calling and called subscribers.

When the calling subscriber disconnects by replacing the receiver or hand set at the substation A on its supporting hook or cradle, the loop circuit extending by way of the line 23 to the line circuit 10 is opened, with the result that the bias potential applied over the conductor 53*a* to that gate circuit of the multiplexer 11 which individually corresponds to the calling line 23 is restored to its normal value. As a consequence, this gate circuit is biased to terminate the transmission of multiplexer pulses 84*b* occurring in the pulse time position 64*b* over the conductor 50 to the various finders and connectors of the system. When the transmission of multiplexer pulses 84*b* to the pulse input circuit 200 of the finder 12*a* is thus terminated, this circuit is rendered inactive to repeat pulses to the finder circuits 201, 203 and 204. After a predetermined time interval, measured by the overall time constant of the +B switching circuit 201, this circuit responds to cessation of multiplexer pulse transmission thereto by removing the operating anode potential from the conductor 12*c*. As a consequence, the tens and units coincidence tube circuits 203 and 204 of the finder 12*a* are restored to normal to interrupt the production of finder gate and busy pulses in the pulse time position 64*b* by the finder pulse forming circuit 205. Thus, the application of pulses to the combining circuit 202 and hence to the busy conductor 52 in the pulse time position 64*b* assigned to the calling line 23 is arrested. Termination of pulse transmission to the combining circuit 202 in the time position 64*b* has the effect of rendering this circuit operative under the control of the link allotter 24 to reassociate the link 12 with another calling line to handle another call. Cessation of busy pulse transmission to the conductor 52 in the pulse time position 64*b* has the effect of marking the calling line 23 as idle to permit initiation of a second call on this line or seizure of the line on a call incoming thereto.

Removal of operating anode potential from the conductor 12*c* also has the effect of restoring the component circuits 209, 211, 212, 213, 214, 215, 216, 218, 219, 223, 224 and 225 of the connector 12*b* to normal, thereby to condition the connector 12*b* to handle another call. Incident to normalizing of the connector pulse forming circuit 217, connector pulse production on the conductor 239 in the pulse time position 63*c* assigned to the called line 32 is terminated to arrest the application of busy pulses to the common busy conductor 52 by the busy gate circuit 220 in this pulse time position. Thus, the called line is unguarded to free the same for use in initiating another call or accepting a call incoming thereto. It will be noted that normalizing of the identified circuits of the connector 12*b* has the effect of restoring all components of this connector to the condition which prevailed at the time the link 12 was taken into use to handle the call just described.

As will be evident from the immediately preceding explanation, the key component involved in effecting release of the link 12 is the +B switching circuit 201 embodied in the finder 12*a*. So long as multiplexer pulses are repeated to this circuit by the pulse input circuit 200 in the time position assigned to the calling line, the circuit positively prevents release of the link 12 and holds both the calling and called lines out of service, i. e., prevents use of the same in initiating outgoing calls of accepting incoming calls. However, when multiplexer pulse transmission by way of the pulse input circuit 200 to the +B switching circuit 201 is arrested for a period of time greater than approximately one-fourth of a second, this switching circuit immediately effects release of the link regardless of the extent of progress of the call and regardless of whether or not the connection has been released at the called substation. Thus, normalizing of the +B switching circuit 201 will effect release of the link 12 upon abandonment of the call which the link is assigned to handle at any point in the process of setting up the desired connection, as for example, call abandonment before dialing is started, call abandonment after dialing is partially completed or call abandonment after dialing is completed and before the call is answered at the called substation. It will also be apparent that if the calling subscriber is the first to release the connection, i. e., hang up, the link 12 is immediately released under the control of the +B switching circuit 201 embodied in the finder 12*a*. In such case, the line circuit 16 associated with the called line 32 immediately assumes a setting indicating that the line 32 is calling, with the result that a link is assigned to the called line under the control of the allotter 24 and the usual dial tone signal is returned to the called subscriber. This signal has the effect of indicating to the called subscriber that the connection has been released at the calling substation and that he should hang up.

*Line circuits 10 and 16*

Figure 10:
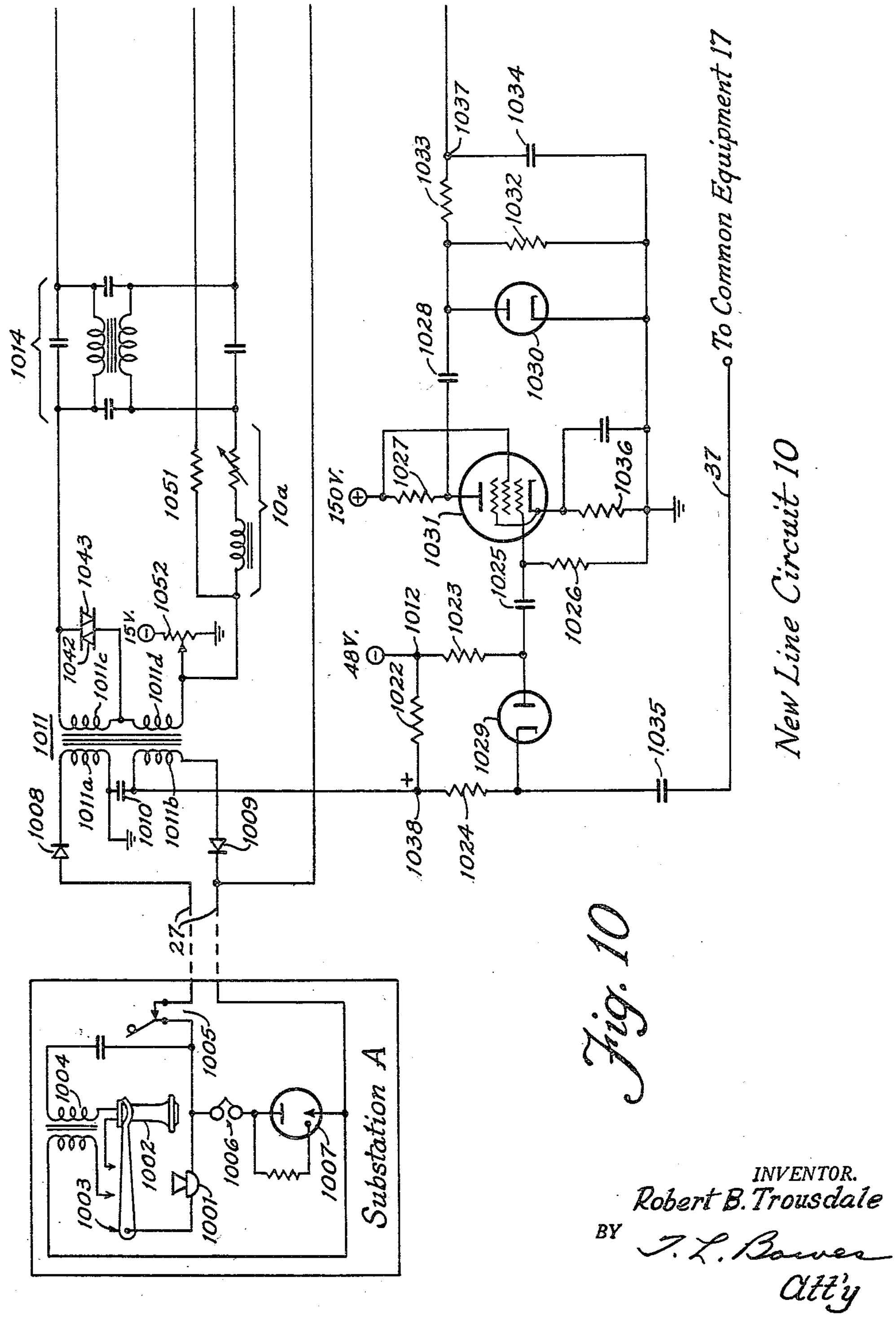
Figure 11:
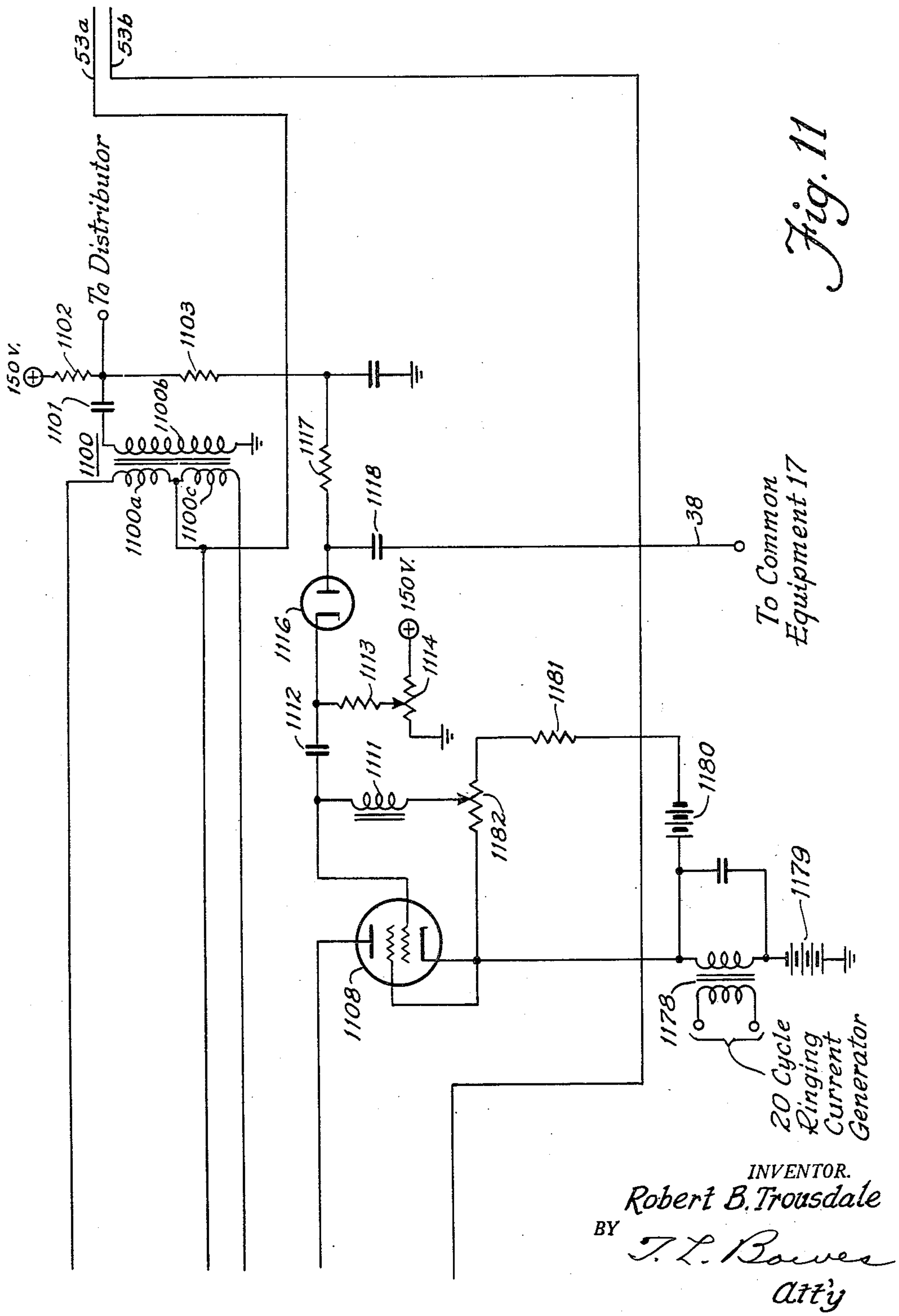

Referring now more particularly to the portions of the system of Figs. 1 to 4 inclusive, which embody the principles of the present invention, there is shown in Figs. 10 and 11 the details of the line circuits 10 and 16 indicated in block diagram form in Figs. 1 and 3.

Figure 17:
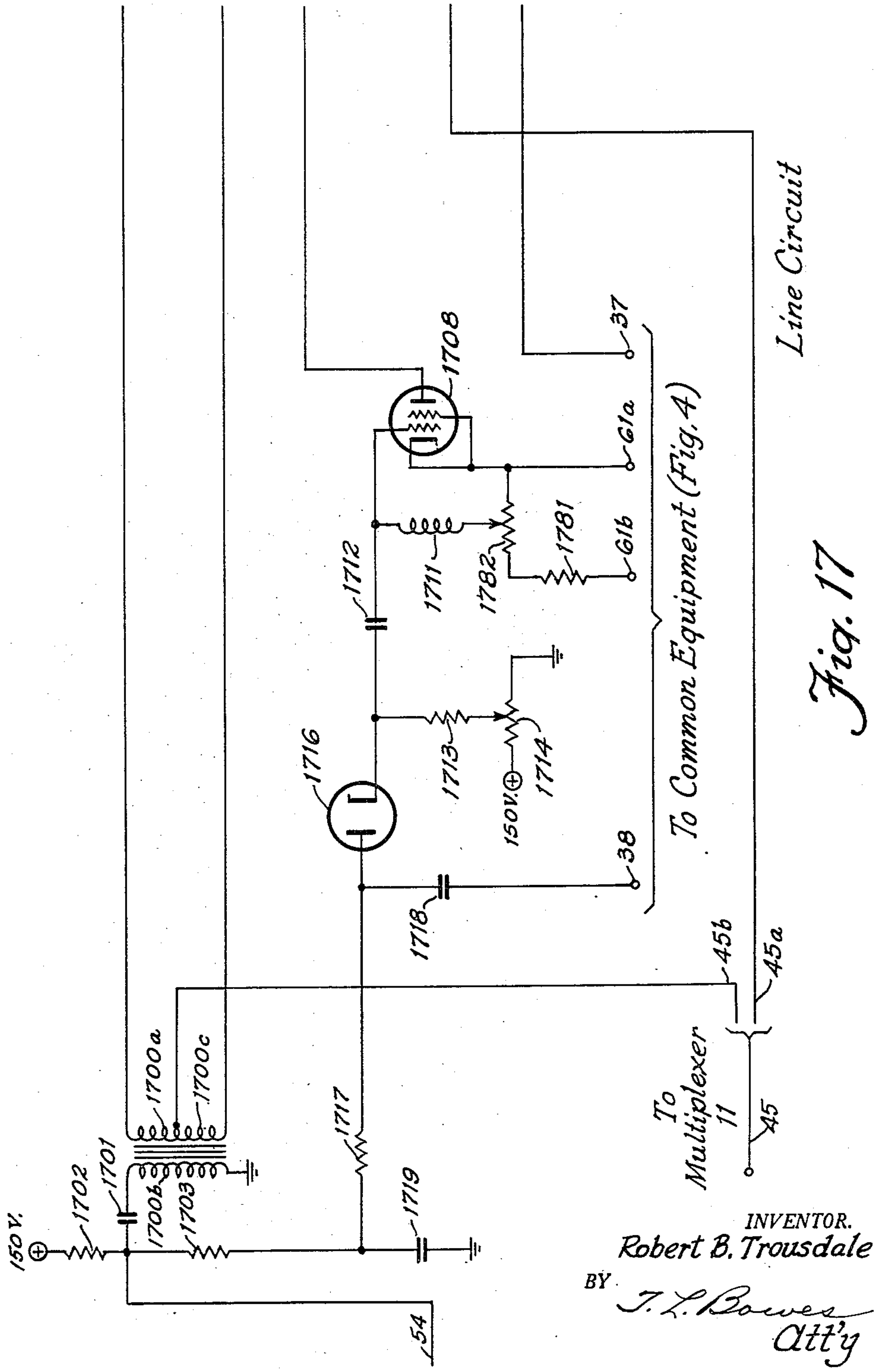
Figure 18:
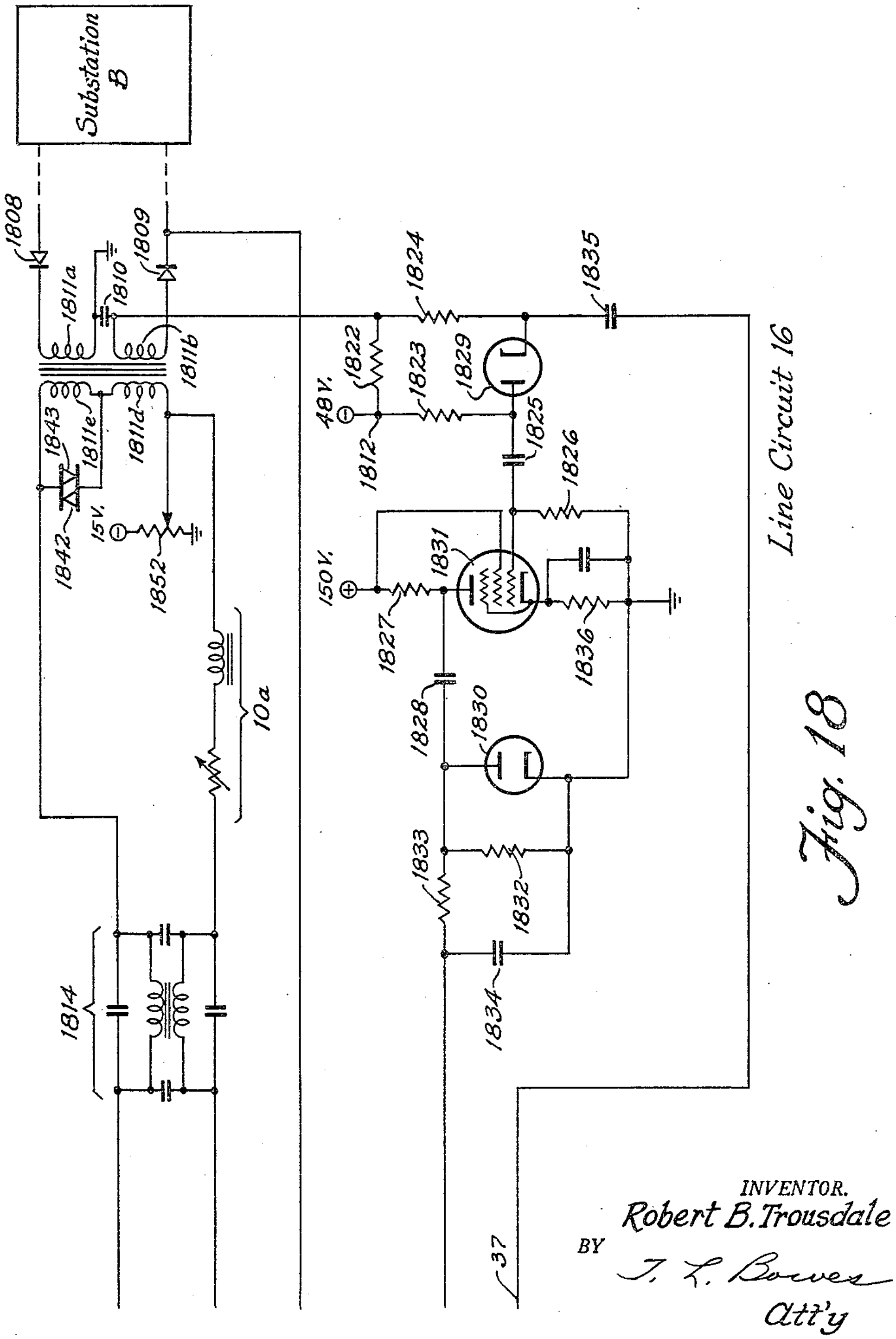

As previously indicated, the two line circuits 10 and 16 are respectively utilized to terminate the lines 23 and 32 at the exchange end of the system. These two line circuits as well as the line circuits terminating the other lines of the system are identical in circuitry and mode of operation. Accordingly, corresponding components of the two line circuits have been identified by reference numbers having the same tens and units digits, but differing in the hundreds and thousands digits to identify the figures of the drawings in which the individual components thereof are to be found. Since the two line circuits 10 and 16 are identical in every respect, the following description will be confined to the line circuit 10 illustrated in Figs. 10 and 11 of the drawings. It will be understood, however, that this description accurately applies to the line circuit 16 as shown in Figs. 17 and 18 of the drawings as well.

Briefly considered, the line circuit 10 comprises a coupling transformer 1011 which is connected directly to the conductors of the line 23 through two selenium crystal rectifiers 1003 and 1009, a hybrid transformer 1100, a low pass filter 1014 having an upper cut-off frequency of approximately three and one-half kilocycles, and a balancing network 10*a*. The identified components of the line circuit 10 are utilized in transmitting intelligence signals from the distributor 15 to the line 23 and over this line to the substation A in such manner that the signals are not revertively transmitted back to the multiplexer 11.

Control signals developed at the substation A and transmitted to the line circuit 10 over the line 23 are impressed upon a bias control potential network which comprises a pentode tube 1031 of the well known 6AK5 type. This tube in cooperation with the other illustrated circuit components of the bias network, functions to convert the 100 kilocycle control carrier developed by the carrier supply circuit 26 into a bias control potential which is utilized normally to bias the gate tube of the multiplexer 11 which individually corresponds to the directory number designation assigned to the line 23 to a nonconductive state. For the purpose of selectively energizing the ringer 1006 provided at the substation A on calls incoming to this substation, ringing control facilities are provided in the line circuit 10 which comprise a four electrode ringing control tube 1108 of the gas filled type. This tube is preferably of the commercial type 2D21 and in cooperation with its associated circuit elements responds to ringing control signals transmitted thereto from the distributor 15 to effect the transmission of the ringing current derived from the common equipment 17 over the line 23 to activate the ringer 1006 provided at the substation A. The individual circuit elements of the line circuit 10 not specifically referred to above will be described below in explaining the functions which they perform in handling calls involving the line 23.

Briefly, to consider the quiescent state of the line circuit 10, i. e., the condition thereof which prevails when the line 23 is not occupied with a call, it is pointed out that so long as positive signal bearing pulses do not appear across the anode load resistor 1102 of the distributor gate circuit which is associated with the line circuit 10, a relatively large voltage drop is developed across the resistor 1102 to correspondingly limit the voltage across the condenser 1119. These voltages remain fixed, under the conditions stated, at a constant level and the voltage across the condenser 1119 is held at a value insufficient to overcome the blocking bias voltage impressed upon the rectifier 1116 from the potentiometer 1114 through the resistor 1113. As a consequence, the rectifier 1116 is biased to prevent current conduction therethrough and hence the keyed 100 kilocycle ringing control signal signal developed by the circuits 26 and 27 is prevented from reaching the grid of the ringing control tube 1108 to fire this tube. Thus, the ringing control facilities of the line circuit 10 are normally held in an inactive condition.

Considering now the bias control potential network of the preesnt invention, it will be noted that when the substation A is in use, the contacts of the hook or cradle switch 1003 are open, so that a loop circuit including the conductors of the line 23 is not completed between the substation A and the line circuit 10.

As a consequence, no current is permitted to flow from the negative terminal 1012 of the 48-volt current source through the resistor 1022. With no voltage drop across the resistor 1022, the signal gate rectifier 1029 is fully conductive and passes the 100 kilocycle supervisory carrier voltage developed by the carrier supply circuit 26 (Fig. 4) to the control grid of the bias control amplifier 1031. Thus the 100 kilocycle supervisory carrier voltage is supplied from the carrier supply circuit 26, over the circuit conductors 37, and through the condenser 1035, the rectifier 1029, and the condenser 1025 to the control grid of the amplifier 1031. The amplifier 1031 is biased by means of the cathode resistor 1036 and the 100 kilocycle supervisory carrier voltage is repeated across the anode load resistor 1027 of this tube and coupled through the condenser 1028 to the rectifying network including the rectifier 1030, the resistors 1032 and 1033 and the condenser 1034. Thus, the 100 kilocycle supervisory carrier voltage is normally passed by the gating rectifier 1029, amplified in the tube 1031 and rectified to provide a control potential across the condenser 1034 of such polarity that the terminal 1037 thereof is negative with respect to ground potential. The negative bias control potential thus developed across the condenser 1034 is supplied over the conductor **53*b* to the particular gate tube of the multiplexer 11 associated with the line circuit 10. Thus, the above-described bias control potential is supplied over the conductor 53*b* and through the resistor 1223*d* to the first control grid 1223*a* of the multiplexer gate tube 1223. So long as the line 23 is not occupied with a call, the bias control amplifier 1031 is connected to the 100 kilocycle supervisory carrier voltage and a bias control potential is supplied to the multiplexer gate tube associated with the line circuit 10 to render this gate tube normally inoperative. Preferably, the amplitude of the 100 kilocycle signal voltage is maintained constant at all times at a value such that the bias control potential produced across the condenser 1034** is of sufficient amplitude to maintain the gate tube non-conductive. In practice an R. M. S. value of 4.25 volts for the 100 kilocycle signal voltage has been found satisfactory to provide an adequate bias control voltage.

Operation of the line circuit 10 to handle a call originating at the substation A may well be described in terms of the call from the substation A to the substation B considered above in the general description of the system. Specifically, when the receiver 1002 or hand set at the substation A is removed from its supporting hook or cradle, the contacts of the hook or cradle switch 1003 are closed to establish a calling loop circuit between this substation and the line circuit 10. This loop circuit extends from the grounded positive terminal of the 48-volt source, by way of the transformer winding **1011*a*, the selenium rectifier 1008, the upper side of the line 23, the impulsing contacts of the calling device 1005, the transmitter 1001, the contacts of the hook or cradle switch 1003, the left winding of the transformer 1004, the lower side of the line 23, the selenium rectifier 1009, the transformer winding 1011*b* and the resistor 1022 to the negative terminal 1012 of the 48-volt current source. Current flow over this loop circuit is in the correct direction to bias the two rectifiers 1008 and 1009 to the linear portions of the operating characteristics thereof. In other words, each of the rectifiers 1008 and 1009** is rendered effective to pass alternating signal voltages superimposed upon the unblocked bias voltages impressed thereacross so long as the signal voltages do not exceed in amplitude the magnitude of the unblocking bias voltage.

When the described loop circuit is completed to cause current flow through the resistor 1022 in a direction from the terminal 1038 to the terminal 1012, a voltage is developed across the resistor 1022 which raises the potential applied to the cathode of the gating rectifier 1029 through the resistor 1024 above the anode potential thereof. This voltage developed across the resistor 1022 substantially exceeds the peak value of the 100 kilocycle supervisory carrier voltage supplied to the cathode of the gating rectifier through the condenser 1035 so that the rectifier 1029 is blocked when the line circuit 10 is taken into use and is ineffective to pass 100 kilocycle signal voltage to the amplifier 1031. As a consequence, the bias control potential produced across the condenser 1034 in the manner described above is reduced as the charge across the plates of the condenser 1034 leaks off through the associated resistors 1032 and 1033. Accordingly, the bias control potential is reduced substantially to ground potential when the line circuit is taken into use and the signal gating rectifier 1029 is blocked in the manner described above. When the bias control potential supplied to the gate tube 1223 of the multiplexer 11 is thus reduced, this gate tube, under the control of the particular tens and units gating pulses supplied thereto, is operative to transmit channel pulses therethrough in the manner more fully explained below.

As indicated above, the purpose of the bias control potential network including the tube 1031 is that of producing a constant bias voltage across the condenser 1034 during on-hook periods at the substation A and of reducing this bias voltage when the line circuit 10 is taken into use by an amount sufficient to permit correct operation of the multiplexer gate tube 1223. In this connection, it will be understood that the line circuit 10 is designed for use with lines of various lengths having varying loop resistances. Depending upon the loop resistance of a particular line with which the line circuit 10 may be associated, the current flow through the resistor 1022 may vary within wide limits to produce correspondingly wide variations in the magnitude of the voltage drop produced across this resistor when the line circuit is taken into use. It has been found that the variations in the line loop resistance, as between long lines of high resistance and short lines of low resistance, may vary the voltage developed across the resistor 1022 over a range extending from 7.2 volts to 39 volts.

The bias control potential network described above operates to reduce the effect of variations in the line length and loop circuit resistance upon the produced bias control potential. This will be readily apparent when it is realized that the voltage produced across the resistor 1022, when the line circuit is taken into use, raises the potential of the cathode of the signal gate rectifier 1029 relative to the rectifier anode. If the amplitude of the voltage produced across the resistor 1022 is equal to or greater than the amplitude of the 100 kilocycle signal voltage applied to the cathode of the rectifier through the condenser 1035, the rectifier will remain non-conductive, no 100 kilocycle signal voltage will be transmitted through the amplifier 1031 and the rectified voltage across the condenser 1034 will be reduced substantially to zero. Accordingly, if the line associated with the line circuit 10 is sufficiently short to produce a voltage drop across the resistor 1022 which is equal to or greater than the amplitude of the 100 kilocycle signal voltage, the bias control potential is reduced to its minimum value. With lines of greater length the voltage drop across the resistor 1022 is less than the amplitude of the 100 kilocycle signal voltage so that the rectifier 1029 will conduct during the negative peaks of the 100 kilocycle signal voltage and that portion of the signal voltage will be amplified in the tube 1031 and rectified to appear as a somewhat smaller negative voltage across the condenser 1034. Accordingly, with lines of great length, the voltage across the condenser 1034 is reduced only to an intermediate value. However, the multiplexer facilities of the present invention are arranged substantially to eliminate the effect of incomplete reduction of the bias control potential experienced with lines of great length, as will be discussed in more detail below.

When the bias control potential impressed upon the first control grid of the multiplexer gate tube 1223 is decreased in the manner explained in the preceding paragraphs, multiplexer pulses **84*b* occurring in the time position 64*b* assigned to the calling line 23 are impressed upon the multiplexer output conductor 50 to effect seizure of an idle one of the links 12, 13 and 14 in the manner generally explained above. Assuming that the link 12 is assigned to handle the call, the finder and connector pulses of the link are conditioned for operation with the result that signal pulses modulated with the dial tone signal derived from the dial tone generator are transmitted from the calling line out gate circuit 226 of the connector 12*b* through the gate circuits of the distributor 15 which individually correspond to the line 23. After traversing these gate circuits the gated pulses are detected or reconstructed and amplified in the distributor 15 and are impressed upon the primary winding 1100*b* of the hybrid coil 1100 through the coupling condenser 1101. From the secondary side of the hybrid coil 1100, the dial tone signal is transmitted through the low pass filter 1014, the coupling transformer 1011 and the rectifiers 1008 and 1009 to the line 23. The signal is then transmitted over the line 23 to the substation A where it is reproduced by the receiver 1002 to inform the calling subscriber that the dialing operation may be started. In regard to the manner in which the hybrid system comprising the hybrid coil 1100 and the balancing network 10*a* prevents the dial tone signal from being revertively applied to the gate circuit of the multiplexer 11**, reference may be had to the above identified application Serial No. 134,974 for a complete and detailed description thereof.

Upon receiving the dial tone signal, the calling subscriber may actuate the calling device 1005 in accordance with the directory number designation of the desired substation. Since it is assumed that the line 32 is being called from the substation A the digits 3 and 2, of course, will be successively dialed at the substation A. Operation of the calling device 1105 has the effect of pulsing the voltage across the resistor 1022 to correspondingly pulse the voltage across the condenser 1034. More specifically during the open circuit or break period of each dial impulse, the voltage across the resistor 1022 drops substantially to zero with the result that the condenser 1134 becomes fully charged to increase the bias on the first control grid of the gate tube 1223 in the multiplexer to its normal pulse blocking value. On the other hand, during the closed circuit or make period of each dial impulse, the voltage drop across the resistor 1022 is restored to the off-hook value, with the result that the condenser 1034 is discharged to reduce the bias on the first control grid of the gate tube 1223 to permit channel pulse transmission therethrough. Thus, the dial impulses are repeated by the line circuit 10 over the separate bias control potential control conductor **53*b* to the multiplexer 11**.

At this point, it is noted that the condenser 1025 in combination with the resistor 1026 acts as a high pass filter having a high signal rejection characteristic at frequencies of the order of 50 kilocycles and less and a low impedance at the supervisory signal frequency of 100 kilocycles. The purpose of thus discriminating on a frequency basis between low frequency signals and high frequency signals, is that of preventing transient noise and induction voltages which may appear on the line 23 and are normally of low apparent frequency from producing changes in the voltage across the condenser 1034. That portion of the output circuit of the tube 1031 which comprises the circuit elements 1028, 1030, 1032, 1033 and 1034 and the output impedance of the tube 1031 acts as a low pass filter to pass the dial impulses while at the same time rejecting the 100 kilocycle supervisory signal and voice signals. As a consequence, the latter signals are prevented from appearing across the condenser 1030. Thus, the bias control potential network is specifically arranged to prevent low frequency noise voltages, voice signals and the 100 kilocycle signal from being reproduced across the condenser 1034 and being impressed from this condenser upon the first control grid of the gate tube 1223 and the multiplexer 11. The spurious signal response of the line circuit 10 is further minimized through the operation of the condenser 1010 to by-pass such signals to ground and thus prevent the same from substantially affecting the voltage drop across the resistor 1022. It will be understood that the condenser 1010 also functions as an audio coupling condenser in coupling together the two windings **1011*a* and 1011*b* of the transformer 1011**.

As will be evident from the preceding explanation, if the called line 32 is tested in the connector **12*b* and found busy, signal pulses modulated with the busy signal are developed in the connector 12*b* and released to the line circuit 10 by the distributor 15. On the other hand, if the called line tests idle in the connector 12*b*, such that the ringing operation is initiated, signal pulses modulated with the keyed ring back tone signal voltage developed by the circuit 29*c* are detected and amplified in the distributor 15 and transmitted over the conductor 44 to the line circuit 10 and over the line 23 to excite the receiver 1002** at the calling substation in the exact manner explained above with reference to the dial tone signal.

Assuming that the call is answered at the called substation B, a two-way communication channel is established between the calling and called substations. Thus, voice signals originating at the substation A and transmitted over the line 23 to the line circuit 10 traverse the two primary windings **1011*a* and 1011*b* and the coupling condenser 1010 in series aiding relationship, causing a voltage to be developed across the series aiding secondary windings 1011*c* and 1011*d* of this transformer. A portion of the signal voltage developed across secondary winding 1011*c* and 1011*d* is impressed across the resistor 1051 through the winding 1100*a* of the hybrid coil 1100. The voltage developed across the circuit element 1051 is impressed upon the third control grid of the multiplexer tube 1223 over the conductor 53*a*. The bias voltage for the third control grid of the tube 1223 is derived from the potentiometer 1052 which is connected between the −15 volt source and ground. Specifically, bias potential for the third control grid of the tube 1223 is supplied from the arm of the potentiometer 1052 and through the element 1051** to the third control grid.

The signal voltage thus impressed upon the third control grid of the multiplexer tube 1223 serves to modulate the channel pulses gated by the multiplexer 11 in the time position **64*b* assigned to the calling line in the manner more fully explained hereinafter. In this regard, it is noted that the two parallel connected rectifiers 1042 and 1043 function as a signal amplitude limiter to prevent too great a signal voltage swing of the potential applied to the third control grid of the tube 1223. Thus, upon the appearance of excessive voltage across the winding 1011*c*, one of the rectifiers 1042 or 1043 conducts, depending upon the polarity of the voltage, to limit the amplitude thereof to an amount sufficient to maintain the signal input to the gate tube 1223 of the multiplexer within the class A operating range of the third control grid of this tube. In this connection, it will be understood that the short circuit placed upon the winding 1011*c* when either of the rectifiers 1042 and 1043 conducts is of sufficiently low impedance to reduce the voltage produced across both the series connected windings 1011***c* and 1011*d* and, accordingly, to limit the voice frequency signals supplied from the line 23 to the multiplexer 11.

As regards voice signals originating at the called substation B, it will be understood from the preceding general explanation that such signals are transmitted through the multiplexer 11 and the connector 12*b* to the distributor 15. In the distributor 15 the signals carried by these pulses are detected, or reconstructed, and are amplified and supplied over the conductor 44 to the line circuit 10. More specifically, the detected and amplified signals are developed across the resistor 1102 of the line circuit 10 which constitutes the anode load resistor for the signal amplifier associated with the line circuit 10 in the distributor 15. The amplified signal voltage thus developed across the resistor 1102 is applied to the primary 1100*b* of the hybrid coil 1100 through the coupling condenser 1101. The signal voltage developed across the winding 1100*b* of the hybrid coil 1100 causes in-phase voltages of equal magnitudes to be induced in the two windings 1100*a* and 1100*c*, and the overall voltage across the outer terminals of these two windings is impressed across the balancing network 10*a* and the windings 1011*c* and 1011*d* in series. Accordingly, the circuit element 1051 is effectively connected between two opposed terminals of a four-arm bridge circuit having like impedances in each of the four arms thereof. It will be understood, therefore, that the two terminals of the diagonally connected circuit element 1051 are maintained at the same instantaneous potential, such that no portion of the signal voltage impressed upon the circuit from the distributor 15 appears across this impedance. However, that portion of the voltage which appears across the windings 1011*c* and 1011*d* is impressed upon the line 23 to excite the receiver 1002 provided at the calling substation. It will thus be apparent that the hybrid system as embodied in the line circuit 10 is so arranged that signal voltages impressed upon the line circuit from the distributor 15 are prevented from being revertively applied to the input circuit of the gate tube 1223 in the multiplexer 11.

In the above explanation pertaining to the hybrid system of the line circuit 10 and to its mode of operation, no mention has been made of its low pass filter 1014. While a complete and detailed description of this portion of the line circuit may be obtained by reference to the above identified copending application, Serial No. 134,-974, for the purposes of the present disclosure it may be stated that the filter network 1014 is entirely symmetrical as viewed either from the secondary side of the coupling transformer 1011 in series with the balancing network 10*a* or the secondary side of the hybrid coil 1100. Due to this symmetrical arrangement of the filter network, the network has no appreciable effect upon the balance of the hybrid system described above. The constants of circuit components making up the filter network are so chosen that this network has an upper cutoff frequency of 3.5 kilcycles. Thus, signals pulsed or otherwise, having frequencies in excess of 3.5 kilocycles are highly attenuated through the action of this filter network. The primary purpose of providing the filter network 1014 is that of preventing signal pulses traversing the line switching components of the system and side bands of the pulse frequency from being transmitted through the line circuit 10 to the line 23 and thence to the substantion A for audible reproduction. The filter network 1014 also functions to suppress most of the predominant side bands of the fundamental signal sampling frequency, i. e., 10 kilocycles.

In considering the operation of the ringing control facilities of the line circuit 10 on a call routed to this line circuit and the associated line 23 from another line of the system, it is pointed out above that normally the rectifier 1116 is biased against current conduction so that the keyed ringing control signal impressed upon the common conductor 38 by the circuits 26 and 27 is prevented from reaching the grid of the gas filled tube 1108. Specifically, the positive potential impressed upon the left terminal of the rectifier 1116 through the resistor 1113 from the potentiometer 1114 is substantially greater than the voltage across the condenser 1119 during periods when the amplifier tube in the distributor 15 associated with the line circuit 10 is inactive and when this tube is operating as a voice, dial tone, busy tone or ringback tone signal amplifier tube. With the rectifier 1116 thus biased to prevent the keyed 100 kilocycle ringing control signal from reaching the grid of the tube 1108, this grid and the cathode of the tube float together at a potential which is above ground potential by an amount equal to the 90 volts of the direct current source 1179 plus or minus the alternating ringing voltage which appears across the secondary winding of the ringing current transformer 1178. This ringing voltage has an R. M. S. value of approximately 90 volts. Normally, the grid of the tube 1108 is biased a few volts negative with respect to the cathode of the tube in a local biasing circuit which includes the bias potential source 1180, the resistor 1181, the potentiometer 1182 and the inductance element 1111. More specifically, an adjustable portion of the voltage appearing across the potentiometer 1182 is negatively applied to the control grid of the tube 1108 through the inductance element 1111.

When the line circuit 10 is seized on a call incoming to the line 23 from another line of the system, such, for example, as from the line 32, pulses of large amplitude and negative polarity are impressed upon the input circuit of the amplifier tube associated with the line circuit 10 in the distributor 15. These pulses have an amplitude approximately fifty percent greater than the maximum amplitude of pulses which may be modulated with any voice, dial tone, busy tone or ringback tone signal. When start ring pulses are thus impressed upon the input circuit of the amplifier tube, anode current flow through the tube is sharply decreased to correspondingly decrease the voltage drop across the resistor 1102. As a consequence, the condenser 1119 is charged to a higher voltage through the series connected resistors 1102 and 1103. This increase in the voltage across the condenser 1119 results in a polarity reversal of the voltage across the rectifier 1116, thereby to render this rectifier conductive. In this regard, it is noted that the resistor 1117, which interconnects the right terminal of the rectifier 1116 with the upper positive terminal of the condenser 1119, acts as an isolating resistor to prevent the 100 kilocycle ringing control carrier from being impressed upon the primary winding 1100*b* of the hybrid coil 1100.

When the rectifier 1116 is rendered conductive in the manner just explained, the keyed 100 kilocycle ringing control carrier applied to the conductor 38 in the ringing keying circuit 27 is impressed upon the control grid of the tube 1108 over a path which includes this rectifier and the two coupling condensers 1112 and 1118. During alternate half cycles of the ringing control signal passed by the rectifier 1216, the tube 1108 is fired. Ringing current transmission to the called substation A is initiated immediately the tube 1108 is fired. As previously pointed out, the ringing voltage actually comprises the 20 cycle alternating voltage developed across the secondary winding of the transformer 1178 as superimposed upon the voltage of the direct current source 1179. This source has a voltage of approximately 80 volts. The circuit traversed by the ringing current extends from the upper terminal of the secondary winding of the transformer 1178 through the ionized space current path of the tube 1108, the lower conductor of the line 23, the gas filled tube 1007, the windings of the ringer 1006, the impulsing contacts of the calling device 1005, the upper conductor of the line 23, the rectifier 1008 and the winding 1011a of the transformer 1011 to the grounded terminal of the current source 1179. After the two tubes 1007 and 1108 are fired, ringing current traversal of the above-traced circuit produces a voltage drop across the tube 1108 of approximately eight volts and a voltage drop across the tube 1007 of approximately 60 volts. The balance of the available voltage, which varies from zero to 170 volts positive R. M. S., appears across the remaining components of the circuit traversed by the ringing current. It will thus be apparent that most of the available 80 volts of the direct current source 1179 is dissipated across the tubes 1007 and 1108. As a consequence, the cathode of the tube 1108 is driven positive relative to the anode of this tube during a portion of each alternate half cycle of the ringing voltage appearing across the secondary winding of the transformer 1178. Hence, but for the continued excitation of the grid of the tube 1108 by the 100 kilocycle ringing control signal in the manner explained above, this tube would be extinguished at some point during one half of each cycle of the ringing voltage. During the silent period of each ringing cycle when the 100 kilocycle ringing control signal is removed from the conductor 38, the tube 1108 is deionized during the first cycle of the ringing voltage next following interruption of the ringing control signal when the cathode of the tube 1108 is driven positive relative to the tube anode. However, ringing current transmission over the line 23 is obviously resumed at the start of each ringing interval of each ringing cycle in response to reapplication of the ringing control signal to the conductor 38.

When the call is answered at the substation A through removal of the receiver 1002 or hand set from its supporting hook or cradle, the bias control potential network functions in the manner explained above to reduce the voltage across the condenser 1134 which results in the transmission of multiplexer pulses occurring in the time position 64b assigned to the line 23 through the multiplexer 11 to the connector occupied with the call. The connector and more particularly the called line in gate circuit 223 and the called line reconstructor circuit 222 embodied therein respond to these multiplexer pulses by operating the ring trip circuit 221 of the connector to terminate the start ring signal supplied from the distributor 15. More specifically, the amplitude of the negative pulses applied to the amplifier tube in the distributor 15 is reduced to the normal operating level. As a consequence, the voltage drop across the resistor 1202 is sharply increased and the condenser 1119 is caused to discharge through the resistor 1103 and the space current path of the amplifier tube. After the condenser 1119 has discharged down to its normal charge level, the voltage thereacross becomes less than the voltage applied to the left terminal of the rectifier 1116 through the resistor 1113. Thus, the polarity of the voltage across the rectifier 1116 is reversed to bias this rectifier against transmission of the ringing control signal therethrough to the control grid of the tube 1108. When the ringing control signal is thus removed from the grid of the tube 1108, this tube is deionized to terminate the ringing operation in a manner which will be fully apparent from the preceding explanation.

The manner in which the line circuit 10 functions to transmit voice signals in both directions between the substation A and a calling substation on calls incoming to the line 23 is exactly the same as explained above with reference to the call originating at the substation A and routed to the substation B. In this connection, it is emphasized that the magnitude of the voltage changes produced at the anode of the distributor amplifier tube in response to voice signal excitation of the control grid of this tube is insufficient to cause unblocking of the rectifier 1116. In other words, the ringing response of the line circuit 10 is on a marginal basis, a much larger bias voltage being required on the control grid of the tube 1104 to initiate the ringing operation than any signal voltage which may be impressed on the grid as a consequence of supervisory or voice signal input to the tube 1104 over the conductor 44 from the distributor 15. Moreover, the resistor 1103 and condenser 1119 act as a low pass filter to prevent voice signals from being impressed upon the rectifier 1116 to any appreciable extent.

It is believed that the manner in which the line circuit 10 is released when the receiver 1002 or hand set at the substation A is replaced upon its supporting hook or cradle to terminate a call will be readily apparent from the preceding explanation. Briefly summarized, however, it is repeated that the system is arranged for calling party release of the finder-connector links embodied in the system. Accordingly, if the link 12, for example, is occupied with a call originated at the substation A, the condenser 1034 is rapidly charged in the negative direction by the 100 kilocycle supervisory signal passed by the signal gate rectifier 1029 and supplied from the amplifier tube 1031 to the rectifier 1030 when the calling subscriber at the substation A hangs up to terminate the call. When the condenser 1034 is charged negatively, the units gate tube 1223 of the multiplexer 11 is biased to interrupt the transmission of multiplexer pulses to the finder 12a of the link occupied with the call. As a consequence, the link is released in the manner previously explained so that even though the called subscriber attempts to hang on to the connection, signal pulses cannot be impressed upon the control grid of the amplifier tube 1623a in the distributor 15. In a similar manner, the bias control potential network including the tube 1031 functions to charge the condenser 1034 on a call incoming to the line 23 when the called subscriber at the substation A hangs up to terminate the call. Here also, the gate tube 1223 of the multiplexer 11 is biased against multiplexer pulse transmission over the conductor 50 to the link occupied with the call when the condenser 1134 is charged. It will thus be understood that regardless of whether a call originates at the substation A or is routed to this substation from another substation of the system, the gate circuit of the multiplexer 11 is automatically blocked against multiplexer pulse transmission over the multiplexer output conductor 50 in the time position 64b assigned to the line 23 when the subscriber at the substation A hangs up to terminate the call.

One of the important features of the improved line circuit described above is the provision of separate channels for the transmission of voice frequency signals and control potentials to the inividual gate circuits of the multiplexer 11. Thus, voice frequency signals which are produced across the circuit element 1051 of the balance bridge circuit described above, are supplied over a first channel including the conductor 53a to the third control electrode 1223c of the multiplexer gate tube 1223. The bias control potential produced across the condenser 1034 in the manner described above is supplied over a second channel including the conductor 53b and the grid resistor 1223d to the first control electrode 1223a of the multiplexer gate tube 1223. With this arrangement, the bias control potential, which controls the opening of the gate circuit 1223 when the line 23 is taken into use, and which controls the opening and closing of the gate tube 1223 in accordance with supervisory and control signals transmitted over the line 23, is not critical and the amplitude of this control potential need only be greater than the anode current cutoff potential of the control electrode 1223a in order to control the opening and closing of the gate circuit 1223. Furthermore, variations in this bias control potential, which may occur with lines of great length, due to insufficient closure of the signal gate rectifier 1029, do not cause incorrect response to signals derived from the line 23 and gated by the gate circuit 1223 to the output conductor 50 of the multiplexer 11.

A further feature of the improved line circuit facilities of the present invention resides in the provision of means included in the voice frequency signal channel and independent of the operation of the bias control potential network for varying the signal transfer characteristic of the control electrode 1223c to which the voice frequency signals are applied. Thus, the potentiometer 1052, which is included in the voice frequency signal channel, operates to supply a bias voltage through the resistor 1051 to the third control electrode 1223c. With this arrangement the correct bias conditions for class A operation of the control electrode 1223c may be established independently of the operation of the bias control potential channel so that changes in the bias control potential do not affect the signal transfer characteristic of the gate tube 1223. In this connection it will be understood that the potentiometer 1052 is supplied with a unidirectional potential from the minus 15 volt source and provides a third control grid bias voltage which may be adjusted to give the correct operating characteristic with a particular gate tube 1223.

Another important feature of the improved line circuit facilities of the present invention resides in the provision of a supervisory control circuit which is independent of the voice frequency signal channel and which provides a substantial amount of amplitude limiting to reduce the effect of line length upon the produced bias control potential network. Thus, the signal gate rectifier 1029 is rendered non-conductive by the flow of current through the resistor 1022 when the line 23 is taken into use and, due to the fact that the rectifier 1029 cannot conduct once it is cut off, a substantial degree of amplitude limiting is achieved in this signal gate circuit. It will be noted that the above-described amplitude limiting, which tends to make the system insensitive to lines of different length, is in addition to the action of the multiplexer gate tube wherein the bias control potential is superimposed upon the tens pulses supplied to the grid 1223a rather than upon the voice frequency signals supplied to the third control grid 1223c, as will be discussed in more detail in connection with the multiplexer 11.

A further feature of the line circuit facilities of the present invention resides in the provision of rectifiers 1029 and 1030 which are of the hot cathode type. If germanium crystals or other cold cathode type rectifiers are employed, in which the back resistance varies quite radically with temperature and from crystal to crystal, the stability and operation of the circuit with lines of various lengths is affected adversely. However, by employing hot cathode rectifiers as shown in Fig. 10, the stability of the bias control network is substantially increased and drift due to temperature effects, and the like, is substantially eliminated.

*Multiplexer 11*

Figure 12:
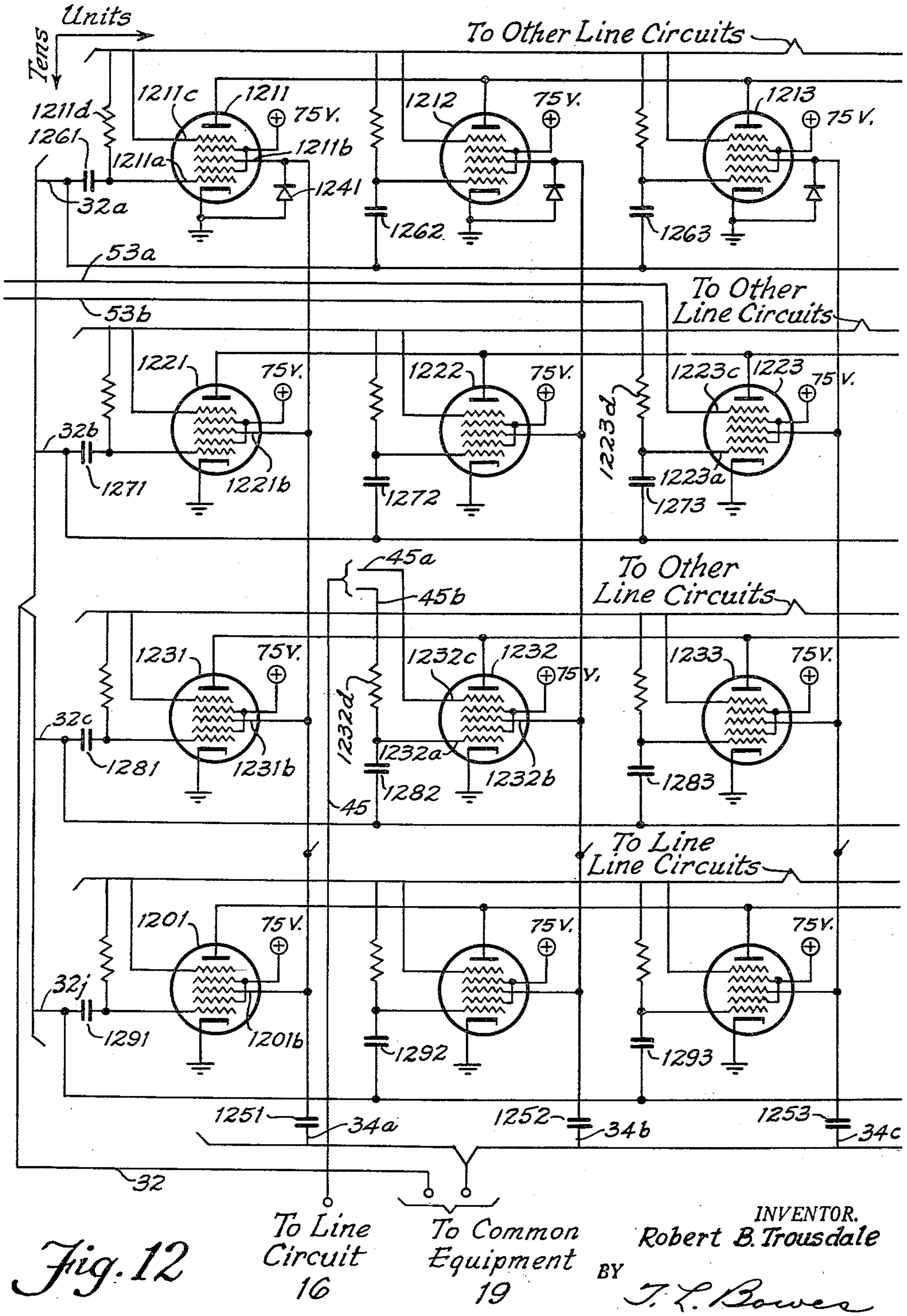
Figure 13:
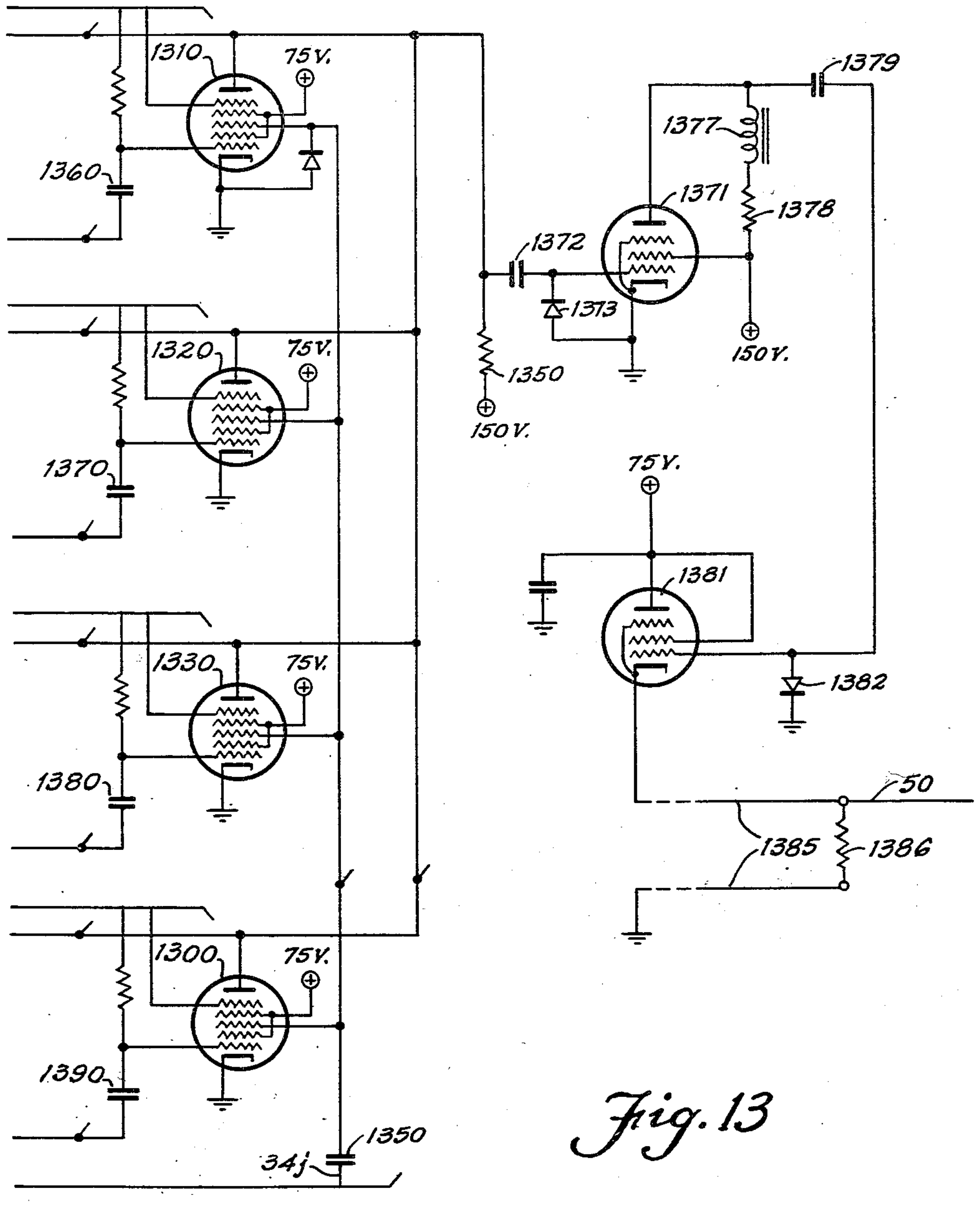

As pointed out in the general description of the system, the improved multiplexer 11, the details of which are illustrated in Figs. 12 and 13 of the drawings, is provided for the general purpose of sampling control and intelligence signals developed on calling and called lines of the system in the time positions of each pulse frame individually assigned to the lines from which the signals are respectively derived, and for transmitting multiplexer pulses modulated with the sampled control or intelligence signals over the multiplexer output conductor 50 to the finder-connector links 12, 13 and 14. The multiplexer circuit is capable of sampling signals appearing on each of the 100 lines of the system at a sampling repetition rate of ten kilocycles.

Generally considered, the multiplexer 11 comprises one hundred gate circuits which are individually associated with the lines of the system and which are connected to perform the combined functions of tens and units gating. Specifically, the gate circuits individually associated with the lines assigned the directory number designations 11, 12, 13—10 respectively comprise ten gate tubes 1211, 1212, 1213—1310 of the upper horizontal tube row. Similarly, the gate circuit respectively associated with lines of the system having the directory number designations 21, 22, 23—20 individually include the gate tube 1221, 1222, 1223—1320 of the second horizontal tube row, and the gate circuits which are individually associated with the lines having the directory number designations 31, 32, 33—30 individually comprise the gate tubes 1231, 1232, 1233—1330 from the third horizontal tube row. Finally, the gate circuit comprising the gate tubes 1201, 1202, 1203—1300 forming the tenth horizontal tube row are individually associated with the lines having the directory number designations 01, 02, 03—00. The output circuits of each of the ten horizontal strings of gate tubes are connected together and are further connected to a master inverter tube 1371, and a cathode follower tube 1381 connected in tandem in the order named. The cathode follower tube 1381 comprises the output tube of the multiplexer and is provided with a cathode load circuit to which the multiplexer output conductor 50 is connected.

In order to combine in a single tube the tens and units gating functions heretofore performed in separate gating tubes in the multiplexer disclosed by the application referred to heretofore, there is provided in accordance with the present invention a pentagrid tube having three separate and distinct control electrodes. While any suitable tube of the pentagrid type may be employed, wherein three separate control electrodes are provided, each having a substantial controlling effect upon the flow of electrons from the cathode to the anode while these electrodes are operating at potentials at or below ground, I prefer to employ a pentagrid tube of the R. C. A. experimental type Development No. A5727. In the type 5727 tube the first two controlling grids are shielded from the anode and from each other by means of a shield grid and also by physical spacing of the electrodes so as to prevent mutual coupling between these electrodes. Also, each of the control grids possesses a substantial transconductance to the anode of the tube while operating at potentials at or below the potential of the cathode. Thus, considering the gate tube 1232, the first control grid 1232a and the second control grid 1232b are shielded from the anode and from each other by the shield grid 1232e and by physical spacing of these electrodes. Also, the third control grid 1232c, as well as the control grids 1232a and 1232b, have a substantial control over the electron beam when operated at potentials at or below the cathode potential.

The master inverter tube 1371 is preferably a pentode of the 6SJ7 type, whereas the cathode follower 1380 preferably comprises a beam power tube of the 6L6 commercial type. The various circuit elements employed to interconnect the identified tubes of the multiplexer 11 are specifically referred to below in describing the functions which they respectively perform in the present improved multiplexer circuit.

Operation of the multiplexer 11 is under the joint control of the one hundred line circuits of the system, the channel pulse commutator 2022 and the tens pulse ring circuit 2021. Generally considered, the channel pulses 82, 83, and 84 of each pulse frame, as shown in the pulse chart of Figs. 6–9, inclusive, which are utilized to perform a units gating function, are applied to vertical rows of the one hundred gate tubes of the multiplexer, and the tens pulses 72a, 73a, 74a, etc., which are utilized to perform the tens gating function, are applied to horizontal rows of the gate tubes of the multiplexer. Thus, the multiplexer channel pulses 82a, 82b, 82c, etc. of each pulse frame are impressed upon the second control grids of the gate tubes 1211, 1221, 1231—1201 in parallel over a path which includes the conductor 34a and the condenser 1251. Similarly, the multiplexer channel pulses 83a, 83b, 83c, etc. of each pulse frame are impressed upon the second control grids of the gate tubes 1212, 1222, 1232—1202 in parallel over a path which includes the second multiplexer channel pulse conductor 34b and the condenser 1252. In an entirely similar manner, the multiplexer channel pulses 84a, 84b, 84c, etc., of each pulse frame are impressed upon the second control grids of the gate tubes 1213, 1223, 1233—1203 in parallel over a path which includes the third channel pulse conductor 34c and the condenser 1253. The fourth to tenth vertical rows of gate tubes are similarly excited in parallel on a numerical basis over the seven other channel pulse conductors 34d–34j; the last channel pulse conductor 34j being connected to the parallel connected second control grids of the tenth tubes of each of the ten horizontal strings through the condenser 1351.

In order to accommodate lines of varying lengths and widely different loop resistances, and to the end that the supervisory signals from the line circuits may be segregated from the voice frequency signals transmitted from the lines of the system to the multiplexer 11, the voice frequency signals from a particular line circuit are supplied over a first channel to the third control electrode of the associated gate tube of the multiplexer and the bias control potential which controls the transmission of multiplexer signal pulses through the gate tube, is supplied over a second channel to the first control electrode of the gate tube. Thus, the first control electrode 1223a is provided with a controlling bias potential from the line circuit 10 over a path which includes the grid leak resistor 1223d and the conductor 53b while the third control electrode 1223c of the gate tube 1223 is connected over the conductor 53a to the line circuit 10 in the manner explained above with reference to this line circuit. Similarly, the third control electrode 1232c of the gate tube 1232 individually associated with the line 32 is connected by way of the conductor 45a to the line circuit 16 which terminates the line 32. To provide a controlling bias potential for the gate tube 1332, the first control electrode 1232a thereof is connected to the line circuit 16 over a path which includes the grid leak resistor 1232d and the conductor 45b.

To provide a tens gating function with the above identified gate tubes, the one hundred tubes are segregated into horizontal strings of tubes and the tens pulses 72a, 73a, 74a, etc. are respectively applied to the ten horizontal tubes of each string. More specifically, positive tens pulses successively impressed upon the positive tens pulse conductors 32a, 32b, 32c–32j during each pulse frame are utilized successively to gate the ten horizontal strings of gate tubes during successive tens pulse intervals of each pulse frame. Thus, the first positive tens pulse 72a of each pulse frame is impressed upon the first control grids of the ten gate tubes 1211, 1212, 1213—1310 associated with the first group of ten lines over a path which includes the tens pulse conductor 32a and the parallel connected coupling condensers 1261, 1262, 1263—1360. Similarly, the second tens pulse 73a of each pulse frame is impressed upon the first control grids of the gate tubes 1221, 1222, 1223—1320 individually corresponding to the second group of ten lines over a path which includes the positive tens pulse conductor 32b and the parallel connected condensers 1271, 1272, 1273—1370. The first control grids of the third horizontal string of gate tubes 1231, 1232, 1233—1330 which individually correspond to the third group of ten lines are excited by the third tens pulse 74a of each pulse frame over a path which includes the positive tens pulse conductor 32c and the parallel connected coupling condensers 1281, 1282, 1283—1380. The first control grids of the fourth to ninth strings of gate tubes, not shown, are similarly excited over the positive tens pulse conductor 32d–32j during the respective fourth to tenth tens pulse periods of each pulse frame. Finally, the first control grids of the tenth string of gate tubes 1201, 1202, 1203—1300 which correspond to the tenth group of ten lines, are excited by the tenth and last positive tens pulse of each pulse frame, as transmitted thereto over a path which includes the positive tens pulse conductor 32j and the parallel connected coupling capacitors 1291, 1292, 1293—1390. It will thus be understood that positive tens pulses are successively impressed upon the first control grids of the above-mentioned ten horizontal strings of gate tubes during successive pulse periods of each pulse frame. Each of these horizontal strings of gate tubes is only operative to repeat signal modulated channel pulses therethrough during those intervals when positive tens pulses are present at the first control grid thereof.

The anodes of all of the one hundred gate tubes are connected together and receive anode operating potential through a common anode load resistor 1351. Accordingly, signal modulated channel pulses are supplied through the coupling condenser 1372 to the master inverter tube 1371. The pulses receive amplification through the inverter tube 1371 and are each inverted from a negative polarity to a positive polarity through this tube. As positively reproduced at the anode of the tube 1371, the pulses are impressed upon the control grid of the cathode follower tube 1381 through a network which includes the compensating inductance 1377, the coupling capacitor 1379 and the clamping rectifier 1382. The pulses are reproduced across the cathode load circuit of the tube 1381, which includes the cable 1385. This cable may be a flat transmission line of the open wire type, extends to each of the finders and connectors of the system, and is terminated in a load resistance 1386. More specifically, the cathode of the tube 1381 is connected to the multiplexer output conductor 50, which forms one wire of the cable 1385, the other wire of this cable being connected to ground. The cable 1385 is terminated in its characteristic impedance of approximately 300 ohms.

From the above explanation, it will be understood that channel pulses are successively impressed upon the second control grids of the first to tenth tubes of each of the ten vertical gate tube strings ten times during each pulse frame, i. e., at a one hundred kilocycle rate. However, each gate tube is normally biased against channel pulse transmission therethrough by the negative potential impressed upon the first control electrode thereof from the respective associated line circuit. The controlling bias potential from the associated line circuit is of sufficient magnitude to override the tens pulse also supplied to the first control grid of the gate tube so that even during the positive portion of the tens pulse the gate tube remains normally non-conductive and channel pulse transmission therethrough is prevented.

When the line circuit associated with one of the gate tubes is taken into use, the bias potential supplied to the first control grid thereof is reduced, as described above, so that the tens pulses, which are continuously supplied to the first control grid, swing that grid from beyond anode current cutoff to zero bias. In this connection, it will be understood that the first control grid to cathode space path of the gate tube acts as a clamping diode to prevent the first control grid from going positive with respect to the cathode so that the top of the tens pulses are effectively clamped to ground potential, i. e., the potential of the cathode. Thus, for the duration of the tens pulse supplied thereto, the gate tube is opened so as to pass that channel pulse which occurs during the time interval of the associated tens pulse. Accordingly, voice signals originating at the line circuit and supplied to the third control grid of the gate tube modulate the selected channel pulse and negative channel pulses modulated in accordance with voice frequency signals supplied to the third control electrode from the associated line circuit are developed at the anode of the gate tube and transmitted to the control grid of the master inverter tube 1371.

Referring now more particularly to the mode of operation of the multiplexer 11 to repeat signal samples derived from the line circuit 10 to the multiplexer output conductor 50 in the above described call originating at the substation A and routed to the substation B, it will be understood that when the line 10 is taken into use, the signal gate including the rectifier 1029 is closed and the bias control potential supplied from the line circuit 10 over the conductor 53b is reduced. When the bias control potential on the first control grid of the tube 1223 is reduced, tens pulses impressed upon the conductor 32b and by way of this conductor and the condenser 1273 upon the first control grid of the tube 1223 are operative to swing this first control grid from beyond the anode current cutoff point to zero bias potential. During the interval of the second tens pulse supplied to the tube 1223 in the manner described immediately above, channel pulses impressed upon the channel pulse conductor 34c and by way of this conductor and the condenser 1253 upon the second control grid of the tube 1223 are repeated through this tube and appear as negative pulses at the anode thereof. These channel pulses are modulated in amplitude in accordance with the voice frequency signals impressed upon the third control grid of the tube 1223 in the manner explained above. These negative signal modulated channel pulses are supplied to the control grid of the master inverter tube 1371 through the coupling condenser 1372. From this point, the pulses still modulated with signal samples derived from the line circuit 10, are repeated through the tubes 1371 and 1381 to the multiplexer output conductor 50 in the manner explained above. As explained in the description pertaining to the line circuit 10, the audio signal input to the third control grid of the gate tube 1223 is carefully limited in the line circuit by the rectifiers 1042 and 1043 to maintain the signal voltage swing within the Class A operating range of the third control grid of the tube 1223. This prevents distortion of the signal samples in the operation of the tube 1223 to repeat the signal to the inverter tube 1371. During dialing of the calling substation A, the bias potential level on the first control grid of the tube 1223 rises to its normal channel pulse and tens pulse blocking value during the open circuit or break period of each dial impulse, thereby to stop the transmission of channel pulses over the conductor 50 in the time position 64b. However, during the closed circuit, or make period of each dial impulse, channel pulse transmission over the conductor 50 in the time position 64b is resumed.

With the simplified multiplexer described above, the tens and units gating functions necessary to establish the one hundred individual time positions of the system may be performed with a minimum number of tubes and a substantial saving both in initial cost and continuous operation. By combining the tens and units gating functions in a single tube no separate tens gates or first inverter stages are required, a substantial reduction in the tube complement is achieved and a reduction of approximately 50% in the power consumption in the multiplexer is obtained.

A further important feature of the multiplexer facilities described above is that the combined units and tens gating circuits are made substantially independent of variations in the bias control potential supplied to the first control electrode of the gate tube from the associated line circuit. In this connection it will be recalled from the foregoing detailed description of the line circuit, that the bias control potential, which normally holds the gate tube nonconductive, may not be reduced to a minimum value with lines of great length, although lines shorter than a predetermined maximum length produce uniform reductions in the bias control potential. In the multiplexer of the present invention the bias control potential is superimposed upon the tens pulses supplied to the first control grid of the gating tube so that variations in the amplitude of the bias control potential with different lines of great length do not affect the gating operation of the tens pulses nor the modulation of the channel pulses supplied to the gate tube. In this connection it will be understood that if the bias control potential is applied to the voice frequency signal grid, variations in the bias control potential which occur with lines of varying length, would cause variations in the operating point of the signal grid and consequently, cause distortion of the signal modulated channel pulses transmitted through the gate tube. However, in the present improved multiplexer, it is only necessary to reduce the superimposed bias control potential by a minimum amount sufficient to permit the tens pulses to drive the first control grid to zero bias and further reductions in the bias control potential have no effect upon the gate tube due to the fact that the tens pulses remain clamped to the potential level of the cathode as described above. Accordingly, if the longest line is of sufficiently low loop resistance to produce a reduction in the bias control potential, when the line is taken into use, which is sufficient to permit the tens pulses to drive the first control grid of the gate tube to zero bias, the system is completely independent of variations in the length of the lines of the system.

A further feature of the present improved multiplexer resides in the provision of a steady source of bias voltage for the third control grid to which the voice frequency signals are supplied, which is independent of the bias control potential and which may be adjusted to obtain the correct transfer characteristic for the third control grid. Thus, as has been described previously in connection with the line circuit, the bias potential of the third control grid of the gate tube is controlled by the potentiometer 1052 which is supplied with a unidirectional current. With this arrangement, the modulation of channel pulses in accordance with the voice frequency signals is further isolated from the operation of the bias control potential in opening and closing the gate tube. In this connection it will be noted that the first control grid of the gate tube has sufficient grid current conduction when operated positively under the influence of tens pulses supplied thereto to be self-clamping and accordingly, is particularly suited for use as a tens pulse gating grid since an auxiliary clamping diode is not required in connection therewith. It will further be noted that the first and second control grids of the gate tube are sufficiently well shielded from the anode and from each other by the shield grid and physical spacing to prevent mutual coupling between these grids and to prevent coupling therefrom to the anode of the gate tube.

It will also be noted that cross talk between pulses occurring in different time positions of each pulse frame is prevented while maintaining the combined units and tens gating functions described above. Thus, the third control grid of each of the gating tubes is employed as the signal excited control grid of the tube. To illustrate the importance of this feature it is pointed out that if instead of this arrangement the third control grid of the tube 1223, for example, were used as the pulse gating grid, i. e. were excited by the channel pulses, it would only cut off electron flow from the anode of the tube to the tube cathode and would not cut off electron flow from the first and second control grids of the tube to the cathode during each off-pulse period. In such a case, the first or second control grid of the tube 1223 would of necessity be used as the signal excited grid of the tube. This grid would still be free to vary the electron flow between the screen grid which separates these control grids and the cathode, with the result that signal control variations in screen current flow through the tube would be produced which would manifest themselves as variations in the potential applied to the screen electrodes of the other tens and units gating tubes of the multiplexer. Thus, the signal voltage introduced into the tube 1223 could be transferred to the output circuits of the other gating tubes by means of screen control of the electron screens in the other gating tubes. However, but using the first control grid of each gate tube as the tens pulse gating electron flow to both the screen and anode electrodes of the tubes is positively cut off during each off-pulse. Thus, cross talk between the signal bearing channel pulses as a consequence of screen electrode control of the electron streams in the gating tubes is positively prevented. Further, the shield grids of the gating tubes are operated at relatively low potentials which will not cause these grids to heat up and act as electron emitters to the tube anodes. Thus the shield grid which surrounds the second control grid of each gate tube is operated at the relatively low potential of 75 voltage positive with respect to the cathode.

A further important feature of the multiplexer 11 is that of preventing distortion of the signal modulated multiplexer pulses due to variations in the amplitude of the channel pulses 82, 83, 84, etc., delivered to the second control grids of the gate tubes. If the amplitude of the channel pulses applied to the second control grid of any of the gate tubes is allowed to vary at an audio frequency rate, secondary modulation of the pulses results. This is highly undesirable since any such secondary modulation components are audibly reproduced at the substation to which the signals are ultimately transmitted. In order to prevent variations in the amplitude of the channel impulses impressed upon the second control grids of the gate tubes from effecting the amplitude of the pulses gated by these tubes, amplitude clamping circuits are provided between each of the multiplexer channel pulse conductors 34*a*, 34*b*, 34*c*–34*j* and the second control grids of the respective associated gate tubes. This clamping circuit, as provided between the channel pulse conductor 34*a* and the number one gate tube of each of the ten horizontal strings of gate tubes, comprises the condenser 1251 and a crystal rectifier 1241. Similar clamping circuits will be readily identified in association with each of the three other illustrated channel pulse conductors 34*b*, 34*c* and 34*j*. In considering the operation of the clamping circuit comprising element 1251 and 1241, it is noted that as seen by the multiplexer, the pulses appearing on the conductor 34*a* start at a negative value and rise toward ground potential. The rectifier 1241 is so poled that so long as the pulse amplitude does not exceed ground potential this rectifier is non-conductive. However, if the pulse amplitude rises above ground potential, the rectifier 1241 becomes conductive, permitting the condenser 1251 to charge and develop a voltage thereacross, which is thereafter subtracted from the channel pulse amplitude as seen by the gate tubes 1211, 1221, 1231—1201. Thus, the voltage developed across the condenser 1251 effectively reduces the amplitude of the channel pulses applied to the second control grids of the above enumerated gate tubes. The condenser 1251 holds its charge indefinitely so long as the pulse amplitude remains excessive and tends to vary up and down as the channel pulse amplitudes vary in reverse manner. In other words, the voltage developed through charging of the condenser 1251 varies inversely in accordance with variations of the pulse amplitude above ground potential, thereby to maintain substantially constant the amplitude of the pulses applied to the second control grids of the No. 1 gate tubes in the ten horizontal gate tube strings.

*Distributor 15*

Figure 14:
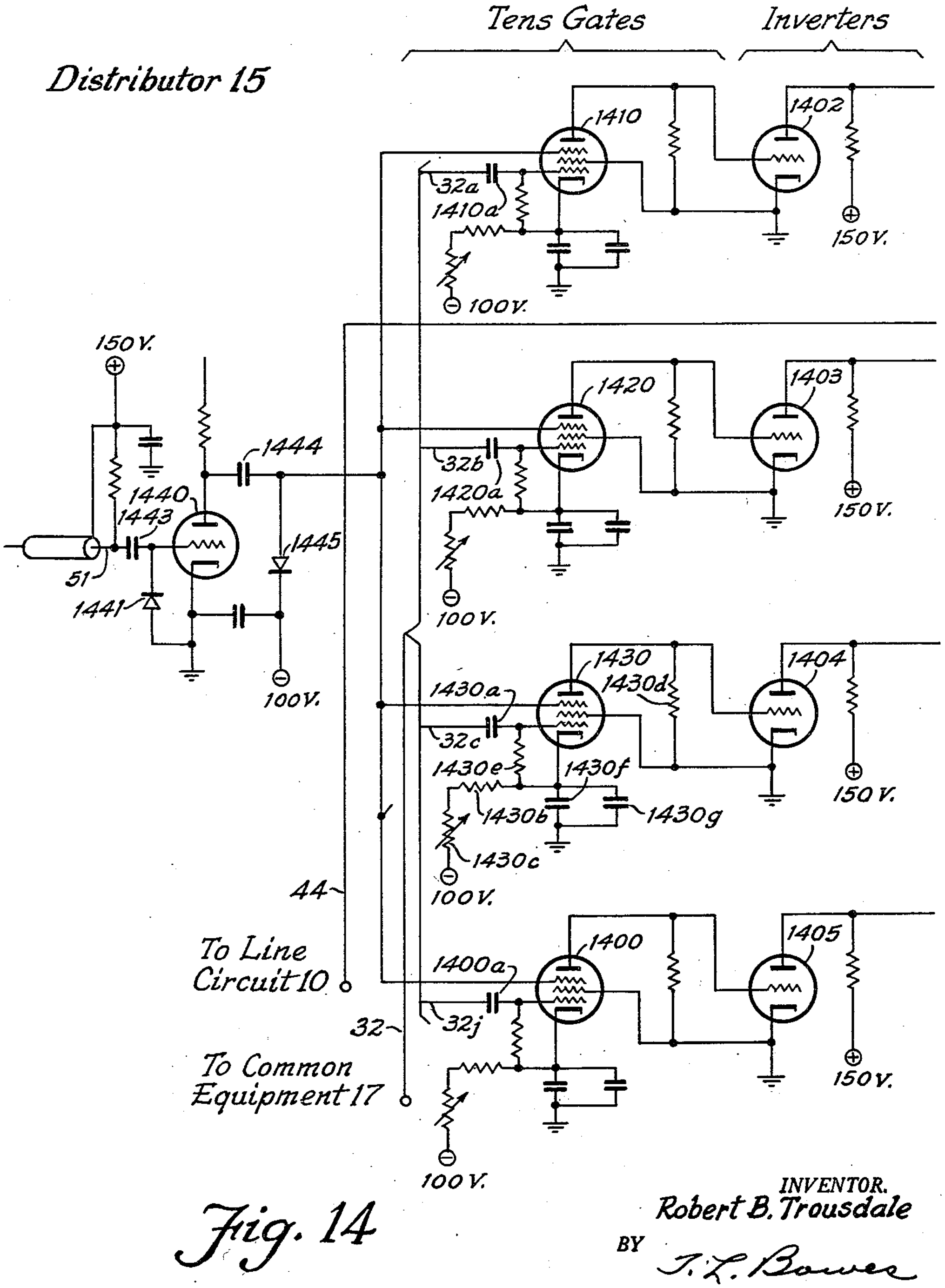
Figure 15:
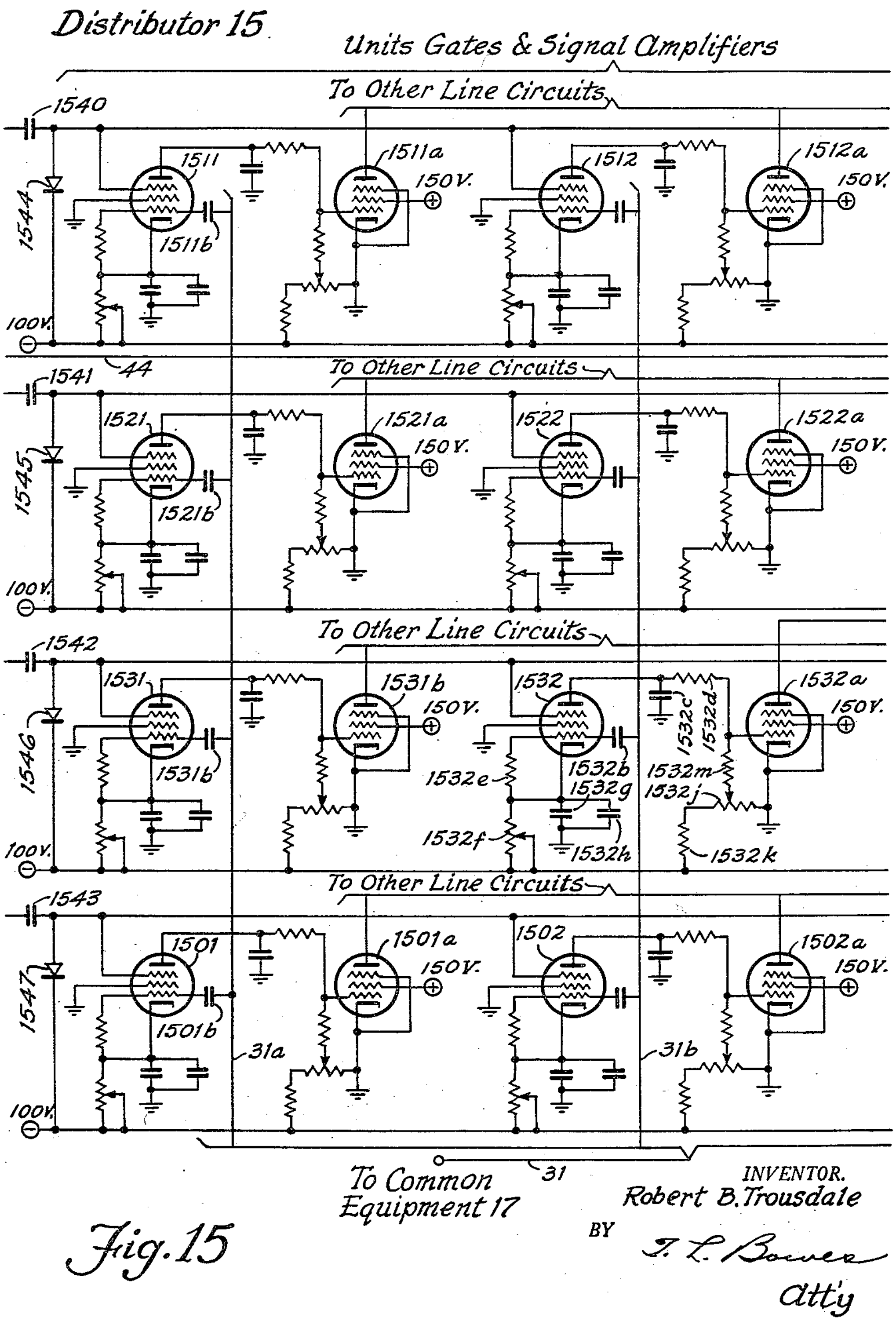
Figure 16:
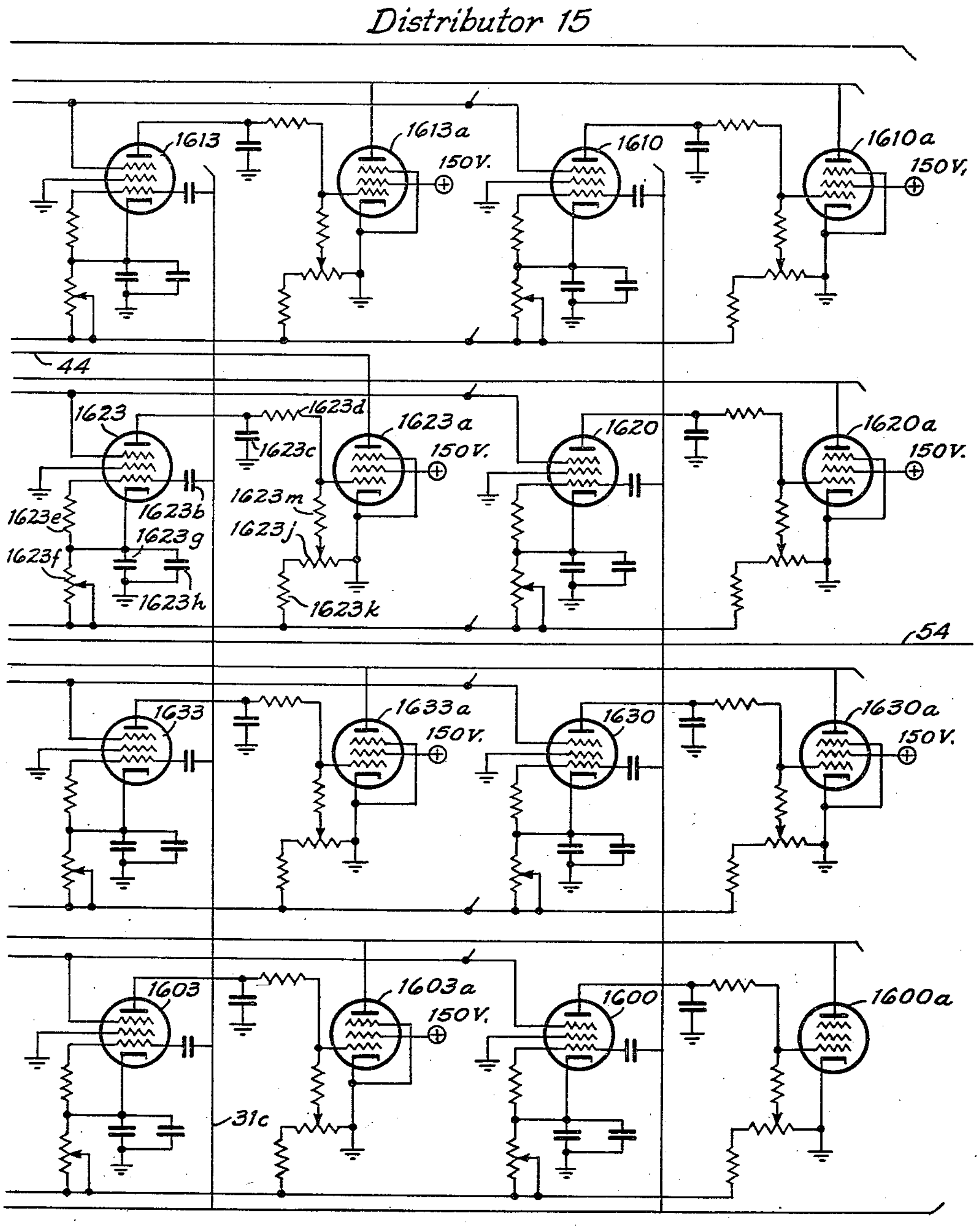

As pointed out in the general description of the system, the distributor 15, the details of which are illustrated in Figs. 14, 15 and 16 of the drawings, is provided for the general purpose of distributing to the lines of the system signals derived from signal sample modulated connector pulses developed in the connectors of the system and supplied to the distributor in the time positions of each pulse frame respectively assigned to the lines. Generally considered, the distributor 15 comprises one hundred units gate circuits, i. e., one for each line of the system, which individually include ten strings of units gate tubes. Thus, the gate circuits individually associated with the lines of the system assigned the directory number designations 11, 12, 13—10 respectively comprise the ten units gate tubes 1511, 1512, 1613—1610 forming the upper or first horizontal string of units gate tubes. Similarly, the units gate circuits respectively associated with the ten lines of the system having the directory number designations 21, 22, 23—20 individually include the units gate tubes 1521, 1522, 1623—1620 forming the second horizontal string of units gate tubes. In a similar manner, the units gate circuits of the distributor which are individually associated with those lines of the system having the directory number designations 31, 32, 33—30 respectively assigned thereto individually comprise the units gate tubes 1531, 1532, 1633—1630. Finally, the units gate circuits individually associated with the lines having the directory number designations 01, 02, 03—00 assigned thereto individually include the units gate tubes 1501, 1502, 1603—1600. Each of the ten strings of units gate tubes is preceded by a tens gate tube and a pulse inverter tube. Thus, four tens gate tubes 1410, 1420, 1430 and 1400 having inverter tubes 1402, 1403, 1404 and 1405 individually connected in tandem therewith are interconnected on an individual basis with the four illustrated strings of units gate tubes. Each of the ten strings of units gate tubes is followed by an audio reconstructor circuit and audio amplifier stage. Thus, the amplifier tubes 1511*a*, 1512*a*, 1613*a*—1610*a* are individually connected in tandem with the units gate tubes 1511, 1512, 1613—1610. In an entirely similar manner audio reconstructor and amplifier stages are individually connected in tandem with the other nine strings of units gate tubes. Signal sample modulated pulses impressed on the distributor input channel conductor 51 by the various connectors of the system are delivered to the ten tens gate tubes in parallel through a master inverter tube 1440. Each of the tens and units gate tubes embodied in the distributor 15 is preferably a pentode of the 6AS6 type. Triodes of the 6C4 type are preferably used as the inverter tubes 1440, 1402, 1403, 1404 and 1405. Each of the amplifier tubes embodied in the distributor 15 is preferably a pentode of the 6AK6 type. The various circuit elements employed in interconnecting the identified tubes of the distributor 15 are described below with reference to the functions which they respectively perform in the circuit.

Operation of the distributor 15 is under the joint control of the units pulse ring circuit 20 and the tens pulse ring circuit 21. More specifically, positive units pulses 62*a*, 62*b*, etc., as shown in the pulse chart of Figs. 6 to 9, inclusive, are delivered to the control grids of the No. 1 units gate tubes of each of the ten horizontal strings in parallel over a path which includes the positive units pulse conductor 31*a*. From this conductor, the identified positive units pulses are impressed upon the control grids of the illustrative No. 1 units gate tubes through the coupling condensers 1511*b*, 1521*b*, 1531*b* and 1501*b*, respectively. Similarly, the positive units pulses 63*a*, 63*b*, 63*c*, etc., of each pulse frame are impressed upon the inner control grids of the No. 2 tubes of each units gate tube string over a path which includes the second positive units pulse conductor 31*b* and positive units pulses 64*a*, 64*b*, 64*c*, etc., of each pulse frame are impressed upon the inner control grids of the No. 3 tubes of the ten units gate tube strings in parallel over a path which includes the third negative units pulse conductor 31*c*. The fourth to tenth units gate tubes of the ten units gate tube strings are similarly excited in parallel on a numerical basis over the seven other positive units pulse conductors 31*d*–31*j*, respectively.

The suppressor grids of the units gate tubes in each of the ten strings are adapted to be excited in parallel by signal sample bearing connector pulses repeated thereto by the respective associated inverter and tens gate tubes. Thus, the suppressor grids of the tubes 1511, 1512, 1613—1610 in the upper units gate tube string are commonly coupled to the anode of the inverter tube 1402 through the common coupling condenser 1540. In a similar manner, signal sample modulated connector pulses developed at the anode of the inverter tube 1403 are impressed upon the suppressor grids of the tubes 1521, 1522, 1623—1620 in the second units gate tube string, and the suppressor grids of the tubes 1531, 1532, 1633—1630 are commonly coupled to the anode of the third inverter tube 1404. Finally, the suppressor grids of the tubes 1501, 1502, 1603—1600 forming the tenth units gate tube string are arranged for parallel excitation by signal bearing connector pulses appearing at the anode of the inverter tube 1405.

Signal sample modulated pulses developed in amplified form at the anodes of the respective units gate tubes are detected and the reconstructed audio signal is supplied to the amplifier tubes individual associated with each of the units gate tubes. Thus, the signal bearing pulses gated by the tube 1532 are detected in the circuit including the capacitor 1532*c* and the detected audio signal is supplied to the inner control grid of the amplifier tube 1532*a* over a path which includes the resistor 1532*d*. Similarly, the signal bearing pulses gated by the units gate tube 1623 are detected in the circuit including the capacitor 1623*c* and the detected signal is supplied to the inner control grid of the amplifier tube 1623*a* over a path which includes the resistor 1623*d*. The other 98 units gate tubes of the distributor 15 are similarly coupled to the 98 other amplifier stages with which they are individually associated. In order to simplify the circuits of the distributor 15 while maintaining the D. C. component of the signal sample modulated pulses supplied to the distributor from the connectors of the system, a system of direct coupling is provided between the gating stages of the distributor and the succeeding stages associated with each gating stage. Thus, the tens gate tubes 1410, 1420, 1430—1400 are directly coupled to the succeeding inverter tubes 1402, 1403, 1404, 1405. Likewise, the ten horizontal strings of units gate tubes are each directly coupled on an individual basis with the succeeding reconstructor and audio amplifier stage associated therewith.

In general, the above described system of direct coupling is accomplished by operating the cathodes of the tens and units gating tubes at a relatively large negative potential such that the anodes of these tubes may be operated at or near ground potential and may be directly coupled to the input circuit of the next succeeding stage which is likewise operated at ground potential. Thus, considering the tens gate tube 1430, the cathode thereof is connected through the resistor 1430*b* and the potentiometer 1430*c* to the negative terminal of the −100 volt supply, the positive terminal of which is connected to ground potential. The anode of the tens gate tube 1430 is connected to ground through the anode load resistor 1430*d*. The control grid of the inverter tube 1440 is connected to the ungrounded side of the resistor 1430*d* so that a direct conductive coupling between the tens gate tube 1430 and the inverter tube 1404 is provided. It is also noted that the above described direct coupling eliminates the conventional coupling condenser which is necessary between these tubes when the anode is operated at a potential above ground. It will be understood that the other tens gate tubes are directly coupled to the succeeding inverter stages associated therewith in a manner entirely similar to that described above.

The cathode of each of the tens gate tubes is heavily bypassed for both high and low frequencies so as to maintain the cathode potential thereof substantially constant. Thus, the tens gate tube 1430 is provided with the condensers 1430*f* and 1430*g*, which are connected between the cathode thereof and ground. Preferably the condenser 1430*f* is of relatively large capacity to provide a low frequency by pass action and the condenser 1430*f* is of relatively small value and is relatively loss free to provide a high frequency by pass path. With this arrangement the cathode potential may be varied to adjust bias conditions although the cathode potential remains fixed for alternating current signals.

The units gate tubes are also directly coupled on an individual basis to the succeeding audio reconstructor and amplifier stage associated therewith. Thus, considering the units gate tube 1532, the cathode thereof is connected through the potentiometer 1532*f* to the negative terminal of the −100 volt supply. The anode of the units gate tube 1532 is connected through the resistor 1532*d* and the resistor 1532*m* to the arm of the potentiometer 1532*j*, the potentiometer 1532*j* being connected to the negative supply source through the resistor 1532*k*. The cathode of each of the units gate tubes is bypassed for both high and low frequency by the condensers 1532*g* and 1532*h* in a manner entirely similar to the tens gate tubes discussed above.

Signal modulated connector pulses developed on the distributor input conductor 51 in the time positions assigned to the calling and called lines of the system are of negative polarity and are impressed upon the inner control grid of the master inverter tube 1440 through the coupling condenser 1443. These pulses are amplified and inverted in polarity through the tube 1440 and impressed upon the suppressor grids of the tens gate tubes 1410, 1420, 1430—1400 in parallel through the common coupling condenser 1444. In order to clamp the pulse base line potential level to a value which is correlated to the cathode potential of the respective tens gate tubes, a master gating rectifier 1445 is provided, which is connected with the polarity shown between the paralleled suppressor grids of the tens gate tube and the minus 100 volt supply source. With this arrangement, the amplified signal sample modulated pulses, which are derived from the anode of the master inverter tube 1440 and are of positive polarity, are clamped to the minus 100 volt potential level by means of the master clamping circuit including the condenser 1444 and the rectifier 1445. These modulated pulses are then impressed directly upon the suppressor grids of all of the tens gate tubes in parallel without providing separate clamping rectifiers for each gating tube. Positive tens pulses 72*a*, 73*a*, 74*a*, etc., are successively impressed upon the inner control grids of the tens gate tubes 1401, 1420, 1430—1400, over the positive tens pulse conductors 32*a*, 32*b*, 32*c*—32*j*, and through the coupling condensers 1410*a*, 1420*a*, 1430*a*—1400*a*, respectively, during each pulse frame.

In order to adjust the bias potential of the suppressor grids of each of the tens gate tubes while maintaining the above described parallel connection of these suppressor grids to the master inverter stage, it is necessary to vary on an individual basis the cathode potential of each of the tens gate tubes. This is accomplished by adjustment of the potentiometer included in the cathode circuit of each of the tens gate tubes which varies the total circuit resistance and hence the cathode potential. Thus, the cathode potential of the tens gate tube 1430 is varied by varying the potentiometer 1430*c*, which is included in the circuit between the cathode of the tube 1430 and the minus 100 volt supply source. In this connection, it will be noted that the above-described variation of the potentiometer 1430*c* produces no change in the control grid to cathode bias potential, due to the fact that the control grid is directly connected to the cathode through the resistor 1430*e*. It will also be understood that the suppressor grids of the tens gate tubes are clamped to the minus 100 volt level by means of the rectifier 1445 so that the above-described variation of the cathode potential of each of the tens gate tubes produces the desired adjustment of the suppressor grid bias voltage. With reference to the above-described biasing circuits for the suppressor grids of the tens gate tubes, it is further noted that individual biasing potentiometers are required, since variations in the operating characteristics of the individual tubes may require that different grid bias potentials be supplied to certain of these tubes.

It is pointed out that the voltage built up across the coupling condensers 1410*a*, 1420*a*, 1430*a*—1400*a* as a result of the positive pulses impressed upon the tens pulse conductors 32*a*, 32*b*, 32*c*–32*j*, serve to bias the respective tens gate tubes beyond cutoff during off-pulse periods irrespective of the above-described suppressor grid biasing arrangement. Thus, considering the tens gate tube 1430, by way of example, each positive pulse appearing on the tens pulse conductor 32*c* charges the coupling condenser 1430*a* through the resistor 1430*e* to a relatively high voltage level. After the pulse ends, the voltage across this condenser is negatively applied to the control grid of the tube 2130 to bias this tube against cutoff. Moreover, the pulse periodicity and the time constant of the condenser discharge circuit are such that the condenser 1430*a* cannot discharge sufficiently to render the tube 1430 conductive during an off-pulse period. It will be understood, therefore, that the tube 1430 is only rendered conductive during each interval when a positive pulse is impressed upon the conductor 32*c*, to overcome the bias voltage built up across the condenser 1430*a*. In a similar manner, the voltages built up across the coupling condensers through which positive units pulses are respectively impressed upon the inner control grids of the units gate tubes serve to bias these tubes beyond cutoff during off-pulse periods. Thus, the coupling condenser 1532*b* is charged through the grid resistor 1532*e* during each units pulse period in the correct sense to bias the control grid of the tube 1532 negative relative to the tube cathode to a point beyond the cutoff value of the tube during each off-pulse interval. As a result the tube 1532 is only rendered conductive during those intervals when positive units pulses are impressed on the units pulse conductor 31*b*.

In order further to simplify the units gate tube circuits and to eliminate the use of a separate clamping rectifier for each of the units gate tubes, each of the units gate tubes is operated below ground potential in a manner similar to that described in connection with the tens gate tubes. Likewise, the ten horizontal strings of units gate tubes are coupled to their respective inverter stages by means of a common clamping circuit. Thus, the cathodes of the first horizontal string of units gate tubes 1511, 1512, 1613—1610 are energized from the minus 100 volt supply source, and the suppressor grids of these tubes are connected in parallel and are supplied with signal bearing connector pulses repeated through the inverter tube 1420 and the common coupling condenser 1540. The pulse base line potential level is clamped to the minus 100 volt point by means of the common clamping rectifier 1544. In a manner entirely similar to that described above, the other nine horizontal strings of units gate tubes are supplied with signal bearing connector pulses from their respective inverter tubes and the base lines of all of these connector pulses are clamped to a fixed potential by means of common clamping circuits.

The suppressor grid bias potential of each of the units gate tubes is adjusted by varying the cathode potential of these tubes in a manner similar to that discussed in connection with the tens gate tubes. Thus, the suppressor grid bias potential of the units gate tube 1532 is adjusted by varying the potentiometer 1532*f* which operates to vary the anode-cathode circuit resistance and accordingly, the potential of the tube cathode. The suppressor grid potential is clamped to the minus 100 volt level by means of the common clamping rectifier 1546 so that variation of the cathode potential produces a change in the bias of the suppressor grid of the tube 1532.

From the above explanation, it will be understood that each units gate tube is only operative to gate a signal bearing connector pulse during a predetermined units pulse of each pulse frame. Thus, considering the tube 1623 by way of example, it will be understood that since the tens gate tube 1420 is only rendered operative to repeat signal bearing connector pulses during the positive tens pulse interval 73*a* of each pulse frame, all signal bearing pulses occurring within the frame except those which coincide with the tens pulse period 73*a* are blocked from the suppressor grid of the tube 1623. As many as ten signal bearing connector pulses may be gated through the tube 1420 to the suppressor grid of the units gate tube 1623 during each tens pulse interval 73*a*. However, this units gate tube is biased beyond cutoff by the voltage impressed upon the control grid from the condenser 1623*b* except when a positive units pulse is present on the conductor 31*c*. From an examination of Figs. 6–9, inclusive, it will be noted that only one positive units pulse, i. e., the pulse occurring in the time position 64*b*, is impressed upon the control grid of the tube 1623 during the tens pulse interval 73*a* when the signal bearing connector pulses are gated to the suppressor grid of this tube by the tens gate tube 1420. It will thus be apparent that coincidence between the positive tens pulses respectively impressed upon the control grids of the ten tens gate tubes and the units pulses respectively impressed upon the control grids of the units gate tubes is required to effect gating of signal bearing connector pulses through the units gate tubes to the line circuits individually associated therewith.

Referring now more particularly to the mode of operation of the distributor 15 to repeat signal bearing connector pulses from the connector 12*b* to the line circuit 16 in the above-described call originating at the substation A and routed to the substation B, it will be understood that those connector pulses developed in the connector 12*b* which carry signal samples derived from the line 23 and are intended for the line 32 occur on the distributor input conductor 51 in the time position 63*c* assigned to the line 32. These pulses are negatively applied to the control grid of the master inverter tube 1440 and are amplified and inverted through this tube to appear as positive pulses at the tube anode. In order to prevent cross or spurious modulation of these pulses, the pulse base line or reference voltage is clamped to the ground potential level through the action of the crystal rectifier 1441. Thus, if the reference voltage level on the conductor 51 tends to rise above ground potential, the rectifier 1441 conducts to charge the condenser 1443. The voltage thus developed across the condenser 1443 is subtracted from the actual pulse base line value so that the effective pulse base line potential is held at the ground potential level.

As explained above, the positive signal modulated connector pulses appearing at the anode of the master inverter tube 1440 are impressed upon the suppressor grids of the ten tens gate tubes in parallel. Those connector pulses appearing in the time position 63*c* assigned to the called line 32 are gated by the tens gate tube 1430 to the suppressor grids of the ten units gate tubes in the third horizontal string during the third tens pulse period 74*a* of each pulse frame. At this stage, the common crystal rectifier 1445 coacts with the condenser 1444 to clamp the pulse base line potential level to the level of the negative potential of the minus 100 volt supply. The connector pulses gated by the tube 1430 appear as negative pulses at the anode of this tube and are directly impressed upon the control grid of the inverter tube 1404. Due to the fact that the tube 1430 is directly connected to the inverter tube 1404, the direct current level, established in the input circuit of the tube 1430 by the master rectifier 1445, is maintained in the inverter tube without the use of auxiliary clamping rectifiers associated with each of the inverter tubes. The connector pulses thus impressed upon the control grid of the tube 1404 are amplified and inverted through this tube to appear as positive pulses at the anode thereof. These pulses are impressed upon the suppressor grids of the ten associated units gate tubes through the common clamping circuit 1542 and 1546 as previously explained.

As explained above, the units gate tube 1432 is only rendered operative to gate amplified signal bearing connector pulses impressed upon the suppressor grid thereof through the common coupling condenser 1542 during that interval of each pulse frame when a positive units pulse is impressed upon the control grid of the tube in coincidence with the positive tens pulse impressed upon the control grid of the tens gate tube 1430. This means that only connector pulses modulated with signal samples derived from the connector **12*b* or more particularly from the calling line 23 and occurring in the time position 63*c* are gated by the tube 1532 to appear at the anode thereof. At the units gate tube 1532, the common clamping rectifier 1546 coacts with the coupling condenser 1542 to clamp the connector pulse base line potential to the negative potential of the minus 100 volt supply source, thereby to prevent spurious modulation of the pulses gated by this tube. The signal modulated connector pulses thus developed at the anode of the tube 1532** are of negative polarity and are impressed upon the succeeding reconstruction and audio amplifier stage.

For reasons which will be apparent from the preceding explanation, the signal bearing connector pulses occurring in the time position **63*c* are gated to the input circuit of the amplifier 1532*a* at the rate of one pulse for each pulse frame, i. e., at a pulse repetition rate of ten kilocycles. In considering the manner in which the original signals are reconstructed from the samples modulated on the connector pulses gated by the tube 1532, it is pointed out that each pulse charges the condenser 1532*c* to the amplitude level of that particular pulse. During the succeeding off pulse period, the condenser 1532*c* discharges through the resistors 1532*d* and 1532*m* and the right hand portion of the potentiometer 1532*j*. In this regard, it is noted that the size of the condenser 1532*c* is of considerable importance in that the condenser should not be so small as to discharge completely during each off pulse period or so large as not to discharge at all during each off pulse period. Thus, if the condenser 1532*c* is made so small as to fully discharge during each period separating the arrival of successive connector pulses, the rise or fall of voltage across this condenser has the effect of swinging the grid of the amplifier tube 1532*a* at the basic carrier frequency of ten kilocycles, such that an excess of carrier energy is delivered to the line circuit 16. Conversely, if the condenser 1532*c* has too great a capacitance value, such that it does not discharge to any appreciable extent during an off-pulse period, the voltage thereacross is built up to a relatively high steady state value with the result that the modulation components of the connector pulses become ineffective to vary the voltage across this condenser in accordance with the amplitude of the signal samples modulated thereon. However, by making the condenser 1532*c* of the correct size, the voltage across this condenser is varied in accordance with variations in the amplitudes of the connector pulses, thereby to reconstruct the original signals from the signal samples modulated thereon. The reconstructed signal appearing across the condenser 1532*c* is amplified in the tube 1532*a* and is supplied over the conductor 54 to the line circuit 16, where it is repeated across the anode resistor 1702 of the tube 1532*a*. The signal thus produced across the resistor 1702 in the line circuit 16 is supplied to the called substation B in the manner previously explained in connection with the line circuit 10**.

The manner in which connector pulses modulated with signals intended for the calling line 23 and impressed upon the distributor input conductor 51 by the connector **12*b* in the time position 64*b* are amplified and inverted through the tube 1440, gated by the tens gate tube 1420, amplified and inverted by the tube 1430, gated through the units gate tube 1632, demodulated in the reconstructor circuit including the condenser 1632*c*, and amplified in the tube 1632*a* will be readily apparent from the preceding explanation with reference to the operation of the distributor 15. In an entirely similar manner, the distributor 15** is operative to supply reconstructed signals to the other 98 line circuits of the system in accordance with the time positions individually assigned to the lines terminated by these line circuits.

An important feature of the present improved distributor is the described arrangement whereby each units gate tube is operated below ground potential and each gate tube is directly connected to its associated reconstructor circuit and signal amplifier stage. Thus, the signal reconstructed in the anode circuit of the units gate tube 1532 across the condenser **1532*c* is directly connected to the control grid of the amplifier tube 1532 through the resistor 1532*d***. With this arrangement, the signals may be reconstructed and amplified in the succeeding amplifier tube without providing a clamping rectifier for each units gate tube to maintain the direct current level constant. Also, supervisory signals as well as modulation signals may be reconstructed and amplified by each of the units gating circuits.

Another important feature of this distributor is the prevention of distortion of the signal modulated connector pulses and the prevention of cross-talk between the pulses occurring in different time positions, which would result in cross-talk between the different signal transmission paths through the distributor. Furthermore, the above-mentioned distortion and cross talk is minimized while maintaining the simplified circuit arrangement described above in which common clamping circuits are employed to reduce the number of clamping rectifiers. In regard to the prevention of distortion of the signal modulated connector pulses it will be seen that spurious modulation of the connector pulses entering the distributor 15 over the input conductor 51 is in part prevented by the described clamping circuits associated with the input and output circuits of the master inverter tube 1440. These clamping circuits maintain the pulse base line potential level constant, and hence, effectively prevent spurious modulation of the connector pulses supplied to the tens gate tubes. Likewise, the common clamping circuits associated with each of the ten horizontal strings of unit gate tubes effectively maintain the pulse base line potential level constant so that spurious modulation in the units gate circuits is substantially prevented. Additionally, variations in the amplitude of the tens and units gate pulses supplied to the tens and units gate tubes over the conductors **31*a*–31*j* and 32*a*–32*j***, are minimized by the above-described resistance capacitance coupling circuits through which these pulses are impressed upon the inner control grids of the respective tens and units gate tubes. Furthermore, cross talk between the signal bearing connector pulses is reduced by employing the inner control grids of the tens and units gating tubes as the pulse gating grids and employing the suppressor grids of these tubes as the signal excited control grids of the tubes.

While one embodiment of the invention has been described, it will be understood that various modifications may be made therein which are within the true spirit and scope of the invention as defined in the appended claims.

What is claimed as new and desired to be secured by Letters Patent of the United States is:

1. In a telephone system, a plurality of lines having individually assigned thereto different time positions in repetitive time position frames, a multiplexer including gate circuits individually corresponding to said lines, said multiplexer having a signal sample output channel common to all of said gate circuits, means for sequentially supplying high speed signal sample gating pulses to first groups of said gate circuits, means for sequentially supplying relatively low speed group gating pulses to second groups of said gate circuits, said low speed gating pulses being sub-multiples of said high speed gating pulses, means for energizing said gate circuits to gate signal samples to said output channel during coincidence of the high speed and low speed gating pulses supplied thereto, and means at least in part controlled by the signal samples gated to said output channel for transmitting signals between different pairs of calling and called lines of the system.

2. In a signalling system, a plurality of lines having individually assigned thereto different time positions in repetitive time position frames, a multiplexer including gate circuits individually corresponding to said lines, said multiplexer having a signal sample output channel common to all of said gate circuits, means for supplying high speed signal sample gating pulses to first groups of said gate circuits, means for supplying relatively low speed group gating pulses to second groups of said gate circuits, said low speed gating pulses being submultiples of said high speed gating pulses, each of said second groups comprising one tube from each of said first groups, means for energizing said gate circuits to gate signal samples to said output channel during the coincidence of the high speed and low speed gating pulses supplied thereto, and means at least in part controlled by the signal samples gated to said output channel for transmitting signals between different pairs of lines of the system.

3. In a signalling system, a plurality of lines having individually assigned thereto different time positions in repetitive time position frames, a multiplexer provided with a signal sample output channel and including a plurality of gate circuits individually corresponding to said lines, group pulse generating means for energizing those gate circuits corresponding to different groups of said lines successively during each time position frame, units pulse generating means for concurrently energizing the gate circuits corresponding to each of said line groups in succession during each group pulse interval, whereby said gate circuits gate signal samples derived from said lines to said output channel during coincidence of the group and units pulses supplied thereto, and means at least in part controlled by the signal samples gated to said output channel for transmitting signals between different pairs of lines of the system.

4. A signal sampling multiplexer for sampling signals on any one of a plurality of lines having individually assigned thereto different time positions in repetitive time position frames, comprising a common signal sample output channel, a plurality of gate tubes each having a plurality of control electrodes and individually corresponding to said lines, group pulse generating means for energizing a corresponding control electrode of those gate tubes corresponding to a different group of said lines successively during each time position frame, units pulse generating means for concurrently energizing a corresponding and different control electrode of the gate tubes corresponding to each of said line groups in succession during each group pulse interval, whereby said gate tubes gate signal samples derived from said lines to said output channel during coincidence of the group and units pulses supplied thereto.

5. A signal sampling multiplexer for sampling signals on any one of a plurality of lines having individually assigned thereto different time positions in repetitive time position frames, comprising a plurality of gate tubes each having an anode and a plurality of control electrodes, said gate tubes individually corresponding to said lines, a common signal sample output channel, said common output channel including a common load impedance connected to the anodes of all of said gate tubes, group pulse generating means for energizing a corresponding control grid of those gate tubes corresponding to different groups of said lines successively during each time position frame, units pulse generating means for concurrently energizing a corresponding and different control grid of the gate tubes corresponding to each of said line groups in succession during each group pulse interval, whereby said gate tubes gate signal samples derived from said lines to said output channel during coincidence of the group and units pulses supplied thereto.

6. A signal sampling multiplexer for sampling signals on any one of a plurality of lines having individually assigned thereto different time positions in repetitive time position frames, comprising a common signal sample output channel, a plurality of gate tubes individually corresponding to said lines, each of said gate tubes having an anode, a cathode, and first, second and third control grids spaced in the order named from said cathode, each of said control grids having a substantial transconductance to said anode when operated at potentials below the cathode potential of said tube, means for transmitting signals from each of said lines to the third control grid of the gate tube corresponding thereto, group pulse generating means for energizing the first control grid of those gate tubes corresponding to different groups of said lines successively during each time position frame, units pulse generating means for concurrently energizing the second control grid of the gate tubes corresponding to each of said line groups in succession during each group pulse interval, whereby said gate tubes gate signal samples derived from said lines to said output channel during coincidence of the group and units pulses supplied thereto.

7. In a telephone system, a line, a multiplexer provided with a gate circuit including means for periodically modulating signal samples derived from said line on continuously produced signal sampling pulses when said gate circuit is open, means normally biasing said gate circuit closed when said line circuit is not in use, a channel for transmitting voice signals from said line to said gate circuit, and means operable independently of said channel and controllable over said line for opening said gate circuit a given amount when said line is taken into use and for thereafter closing said gate circuit and opening the same said given amount in response to the transmission of supervisory and control signals over said line.

8. In a telephone system, a line, a multiplexer provided with a gate circuit, means for supplying low speed group gating pulses to said gate circuit, means for supplying relatively high speed units gating pulses to said gate circuit, said low speed pulses being submultiples of said high speed pulses, a channel for transmitting voice signals from said line to said gate circuit, means for deriving from said gate circuit signal samples derived from said line and modulated on signal sample pulses produced during coincidence of a group gating pulse and a units gating pulse when said gate circuit is open, a circuit for feeding energizing current to said line when said line is taken into use, and means operable independently of said channel and responsive to energization of said last-named circuit for opening said gate circuit.

9. In a telephone system, a line, a multiplexer provided with a gate circuit including means for modulating signal samples derived from said line on signal sampling pulses when said gate circuit is open, a channel for transmitting voice frequency signals from said line circuit to said gate circuit, a circuit for feeding energizing current to said line when said line is taken into use, a high frequency signal source, means for normally amplifying and rectifying signals from said source to provide a unidirectional bias control voltage, means for supplying said bias control voltage to said gate circuit independently of said channel, thereby normally to maintain said gate circuit closed, and means responsive to energization of said line for removing said high frequency source from said amplifier, thereby to reduce said bias control voltage and open said gate circuit.

10. In a telephone system, a line, a multiplexer provided with a gate circuit including means for modulating signal samples derived from said line on signal sampling pulses when said gate circuit is open, a channel for transmitting voice frequency signals from said line circuit to said gate circuit, a circuit for feeding energizing current to said line when said line is taken into use, a high frequency signal source, a normally open signal gate operative to pass signals from said source, means operable independently of said channel for supplying a control potential to said gate circuit in response to signals passed by said signal gate, thereby normally to maintain said gate circuit closed, and means responsive to energization of said line for closing said signal gate, thereby to reduce said bias potential and open said gate circuit.

11. In a telephone system, a line, a multiplexer provided with a gate circuit, means for supplying low speed group gating pulses to said gate circuit, means for supplying relatively high speed units gating pulses to said gate circuit, said low speed pulses being submultiples of said high speed pulses, a channel for transmitting voice signals from said line to said gate circuit, means for deriving from said gate circuit signal samples derived from said line and modulated on signal sample pulses produced during coincidence of a group gating pulse and a units gating pulse when said gate circuit is open, a circuit for feeding energizing current to said line when said line is taken into use, a high frequency signal source, a normally open signal gate operative to pass signals from said source, means operable independently of said channel for superimposing a bias potential on said group gating pulses in response to signals passed by said signal gate, thereby normally to maintain said gate circuit closed, and means responsive to energization of said line for closing said signal gate, thereby to remove said bias potential and open said gate circuit.

12. In a signalling system, a line, a multiplexer provided with a gate tube having a plurality of control electrodes, a channel for transmitting signals from said line to a first control electrode of said gate tube, means for supplying relatively high speed units gating pulses to a second control electrode of said tube, means for supplying group gating pulses which are submultiples of said units pulses to a third control electrode, means for deriving from the anode of said tube signal samples derived from said line during coincidence of said units and group gating pulses when said gate tube is conductive, and means operable independently of said channel and controllable over said line for superimposing a bias control potential on said group gating pulses when said line is not in use, thereby to render said tube non-conductive.

13. In a telephone system, a line, a multiplexer provided with a gate tube having a plurality of control electrodes, a channel for transmitting voice frequency signals from said line to a first control electrode of said gate tube, means for supplying gating pulses to a second control electrode of said tube, means for deriving from the anode of said tube signal samples derived from said line during the occurrence of said gating pulses when said gate tube is conducting, a high frequency signal source, a normally open signal gate operative to pass signals from said source, means operable independently of said channel for superimposing a bias control potential on said gating pulses in response to signals passed by said signal gate, thereby normally to maintain said tube non-conductive, a circuit for feeding energizing current to said line when said line is taken into use, and means responsive to energization of said last-named circuit for closing said signal gate, thereby to reduce said bias potential and permit said gating pulses periodically to render said tube conductive.

14. In a telephone system, a line, a multiplexer provided with a gate tube having a plurality of control electrodes, a channel for transmitting voice frequency signals from said line to a first control electrode of said tube, means for supplying gating pulses to a second control electrode of said tube, a circuit for feeding energizing current to said line when said line is taken into use, means operative when said line is not in use for superimposing a control potential on said gating pulses of sufficient magnitude to maintain said tube non-conductive, means operable independently of said channel and responsive to energization of said circuit for decreasing said control potential, thereby to render said tube conductive during said gating pulses, means for deriving from the anode of said tube signal samples derived from said line when said tube is conducting, and means included in said channel for adjustably changing the bias of said first control electrode independently of said control potential.

15. In a telephone system, a line, a multiplexer provided with a gate tube having a plurality of control electrodes, a channel for transmitting voice frequency signals from said line to a first control electrode of said tube, means for supplying gating pulses to a second control electrode of said tube, said gating pulses having sufficient amplitude to drive said tube from zero bias to anode current cutoff, a circuit for feeding energizing current to said line when said line is taken into use, means operative when said line is not in use for superimposing a control potential on said gating pulses of sufficient magnitude to maintain said tube non-conductive, means operable independently of said channel and responsive to energization of said circuit for decreasing said control potential thereby to render said tube conductive during said gating pulse, means for deriving from the anode of said tube signal samples derived from said line when said tube is conducting, and means included in said channel for adjustably changing the bias of said first control electrode independently of said control potential.

16. In a telephone system, a line, a multiplexer provided with a gate tube having a plurality of control electrodes, a channel for transmitting voice frequency signals from said line to a first control electrode of said tube, means for supplying gating pulses to a second control electrode of said tube, a circuit for feeding energizing current to said line when said line is taken into use, means operative when said line is not in use for superimposing a control potential on said gating pulses of sufficient magnitude to maintain said tube non-conductive, means operable independently of said channel and responsive to energization of said circuit for decreasing said control potential, thereby to render said tube conductive during said gating pulses, a high frequency source, a normally open signal gate including a hot cathode rectifier tube and operative to pass signals from said source, means for amplifying signals passed by said signal gate, means including a hot cathode rectifier tube for deriving a control potential from said amplified high frequency signals having an amplitude at least as large as the anode current cutoff potential of said second control electrode, means for superimposing said control potential on said gating pulses to maintain said tube non-conductive, means responsive to energization of said circuit for closing said signal gate, thereby to decrease said control potential and render said tube conductive during said gating pulses, and means for deriving from the anode of said tube signal samples derived from said lines when said tube is conducting.

17. In a telephone system, a line, a multiplexer provided with a gate tube having a plurality of control electrodes, a channel for transmitting voice frequency signals from said line to a first control electrode of said tube, means for supplying gating pulses to a second control electrode of said tube, means operable independently of said channel for superimposing a control potential on said gating pulses of sufficient magnitude to maintain said tube non-conductive when said line is not in use, and means controllable over said line for removing said control potential from said gating pulses when said line is taken into use and for thereafter reapplying said control potential and removing the same in response to the transmission of supervisory and control signals over said line.

18. In a telephone system, a line, a multiplexer provided with a gate tube having a plurality of control electrodes, a channel for transmitting voice frequency signals from said line to a first control electrode of said tube, means for supplying gating pulses to a second control electrode of said tube, means operable independently of said channel for superimposing a control potential on said gating pulses of sufficient magnitude to maintain said tube non-conductive when said line is not in use, means controllable over said line for removing said control potential from said gating pulses when said line is taken into use and for thereafter reapplying said control potential and removing the same in response to the transmission of supervisory and control signals over said line, and means included in said channel for adjustably changing the bias potential of said first control electrode independently of said control potential.

19. In a telephone system, a line, a multiplexer provided with a gate tube having an anode and a plurality of control electrodes each having a substantial transconductance to said anode when operated at potentials below the cathode potential of said tube, a channel for transmitting voice frequency signals from said line to a first control electrode of said tube, means for supplying gating pulses to a second control electrode of said tube, means for deriving from the anode of said tube signal samples derived from said line during the occurrence of said gating pulses when said gate tube is conducting, and means operative when said line is not in use for biasing said tube beyond cutoff.

20. In a telephone system, a line, a multiplexer provided with a gate tube having an anode and a plurality of control electrodes each having a substantial transconductance to said anode when operated at potentials below the cathode potential of said tube, a channel for transmitting signals from said line to one control electrode of said tube, means for supplying signal sampling pulses to a second control electrode of said tube, means for deriving from the anode of said tube signal samples derived from said line and modulated upon said signal sampling pulses, and means operative when said line is not in use for supplying a bias potential to a third control electrode of said tube, thereby to disable said tube.

21. In a telephone system, a line, a multiplexer provided with a gate tube having an anode and a plurality of control electrodes each having a substantial transconductance to the anode of said tube when operated at potentials below the cathode potential of said tube, a channel for transmitting signals from said line to one control electrode of said tube, units pulse generating means for supplying relatively high speed units gating pulses to a second control electrode of said tube, group pulse generating means for supplying low speed group gating pulses to a third control electrode of said tube, means for deriving from the anode of said tube signal samples derived from said line and modulated upon said units gating pulses, and means operative when said line is not in use for supplying a disabling bias potential to said third electrode.

22. In a telephone system, the combination with a signal sampling multiplexer and a signal distributor, a line circuit for terminating a line and provided with a first channel for feeding voice frequency signals from said line to said multiplexer, a second channel for feeding signals from said distributor to said line and a third channel for controlling the signal sampling action of said multiplexer, and means included in said line circuit for substantially preventing cross-feed between any two of said channels.

23. In a signalling system, a plurality of lines having individually assigned thereto different time positions in repetitive time position frames, a distributor provided with a common signal sample input channel and including a plurality of group gate circuits individually corresponding to different groups of said lines and units gate circuits individually corresponding to said lines, means for feeding signal samples to said input channel in the time positions corresponding to the lines to which signals are to be dstributed, means for energizing each of said gate circuits to pass signal samples occurring in the time position assigned to the line associated therewith, and means conductively connected to each of said gate circuits for reconstructing the signals corresponding to the signal samples passed by that gate circuit.

24. In a signalling system, a plurality of lines having individually assigned thereto different time positions in repetitive time position frames, a distributor provided with a common signal sample input channel and including group gate circuits individually corresponding to different groups of said lines and units gate circuits individually corresponding to said lines, means for feeding signal samples to said input channel in the time positions corresponding to the lines to which the signals are to be distributed, means including a common clamping circuit for supplying signal samples in parallel to all of said group gate circuits from said input channel, and means for energizing said gate circuits to pass signals to the lines to which the signals are to be distributed through different combinations of said group and units gate circuits.

25. In a signalling system, a plurality of lines having individually assigned thereto different time positions in repetitive time position frames, a distributor provided with a common signal sample input channel and including group gate circuits individually corresponding to different groups of said lines and units gate circuits individually corresponding to said lines, means for feeding signal samples to said input channel in the time positions corresponding to the lines to which the signals are to be distributed, means including a common clamping circuit for supplying signal samples in parallel to all of said group gate circuits from said input channel, means for varying on an individual basis the transfer characteristic of each of said group gate circuits independently of the application of signal samples thereto, and means for energizing said gate circuits to pass signals to the lines to which the signals are to be distributed through different combinations of said group and units gate circuits.

26. In a telephone system, a plurality of lines having individually assigned thereto different time positions in repetitive time position frames, a distributor provided with a common signal sample input channel and including a plurality of group gate circuits individually corresponding to different groups of said lines, and units gate circuits individually corresponding to said lines, means for feeding signal samples to said input channel in the time positions corresponding to the lines to which signals derived from the signal samples are to be distributed, means including a clamping circuit common to all of said group gate circuits for supplying signal samples from said input channel to said group gate circuits, means including clamping circuits common to all of the units gate circuits corresponding to the lines of each of said groups for supplying signal samples from said group gate circuits to said units gate circuits, and means for energizing said gate circuits to gate said signal samples in the time positions assigned to said lines through different combinations of said group and units gate circuits.

27. In a telephone system, a plurality of lines having individually assigned thereto different time positions in repetitive time position frames, a distributor provided with a common signal sample input channel and including a plurality of group gate circuits individually corresponding to different groups of said lines, and units gate circuits individually corresponding to said lines, means for feeding signal samples to said input channel in the time positions corresponding to the lines to which signals derived from the signal samples are to be distributed, means including a clamping circuit common to all of said group gate circuits for supplying signal samples from said input channel to said group gate circuits, means including clamping circuits common to all of the units gate circuits corresponding to the lines of each of said groups for supplying signal samples from said group gate circuits to said units gate circuits, means for varying on an individual basis the signal sample transfer characteristic of each of said group and units gate circuits, and means for energizing said gate circuits to gate said signal samples in the time positions assigned to said lines through different combinations of said group and units gate circuits.

28. In a telephone system, a plurality of lines having individually assigned thereto different time positions in repetitive time position frames, a distributor provided with a common signal sample input channel and including group gate circuits and individually corresponding to different groups of said lines and units gate circuits individually corresponding to said lines, means for feeding signal samples to said input channel in the time positions corresponding to the lines to which signals derived from said samples are to be distributed, means including a clamping circuit common to all of said group gate circuits for supplying signal samples from said input channel to said group gate circuits, phase inverter tubes for each of said group gate circuits, a direct conductive connection between each of said group gate circuits and the phase inverter tube associated therewith, means for supplying signal samples from each of said inverter tubes to those units gate circuits corresponding to the lines of each of said groups, and means for energizing said gate circuits to pass said signal samples in the time positions assigned to said lines through different combinations of said group and units gate circuits.

29. In a telephone system, a plurality of lines having individually assigned thereto different time positions in repetitive time position frames, a distributor provided with a common signal sample input channel and including group gate circuits and individually corresponding to different groups of said lines and unit gate circuits individually corresponding to said lines, means for feeding signal samples to said input channel in the time positions corresponding to the lines to which signals derived from said samples are to be distributed, means including a clamping circuit common to all of said group gate circuits for supplying signal samples from said input channel to said group gate circuits, phase inverter tubes for each of said group gate circuits, a direct conductive connection between each of said group gate circuits and the phase inverter tube associated therewith, means including clamping circuits individually common to the units gate circuits corresponding to each of said different groups of lines for supplying signal samples from said phase inverter tubes to said units gate circuits, means for varying on an individual basis and independently of said common clamping circuits the signal sample transfer characteristic of each of said group and unit gate circuits, and means for energizing said gate circuits to pass said signal samples in the time positions assigned to said lines through different combinations of said group and units gate circuits.

30. In a telephone system, a plurality of lines having individually assigned thereto different time positions in repetitive time position frames, a distributor provided with a common signal sample input channel and including group gate circuits and individually corresponding to different groups of said lines and units gate circuits individually corresponding to said lines, means for feeding signal samples to said input channel in the time positions corresponding to the lines to which signals derived from said samples are to be distributed, means including a clamping circuit common to all of said group gate circuits for supplying signal samples from said input channel to said group gate circuits, phase inverter tubes for each of said group gate circuits, a direct conductive connection between each of said group gate circuits and the phase inverter tube associated therewith, means for supplying signal samples from each of said inverter tubes to those units gate circuits corresponding to the lines of each of said groups, signal amplifiers for each of said units gate circuits, signal reconstructor means including a direct conductive connection between each of said units gate circuits and the signal amplifier associated therewith for reconstructing signals from the signal samples passed by said units gate circuits.

31. In a telephone system, a plurality of lines having individually assigned thereto different time positions in repetitive time position frames, a distributor provided with a common signal sample input channel and including group gate circuits individually corresponding to different groups of said lines and units gate circuits individually corresponding to said lines, means for feeding signal samples to said input channel in the time positions corresponding to the lines to which signals derived from said samples are to be distributed, means including a clamping circuit common to all of said group gate circuits for supplying signal samples from said input channel to said group gate circuits, group pulse generating means for energizing said group gate circuits successively during each time position frame to gate said signal samples to said units gate circuits, said last-named means including clamping circuits individually common to those units gate circuits corresponding to each of said line groups, units pulse generating means for concurrently energizing those units gate circuits corresponding to the same lines of each of said line groups in succession during the period when each of said group gate circuits is energized, means for varying on an individual basis and independently of said common clamping circuits the signal sample transfer characteristic of each of said group and units gate circuits, and means for deriving signals from the signal samples gated by said units gate circuits and for distributing them to the proper lines.

References Cited in the file of this patent

UNITED STATES PATENTS

| | | |
|---|---|---|
| 2,486,491 | Meacham | Nov. 1, 1949 |
| 2,490,833 | Ransom | Dec. 13, 1949 |
| 2,506,612 | Ransom | May 9, 1950 |
| 2,551,024 | Levy | May 1, 1951 |
| 2,553,605 | Ransom | May 22, 1951 |
| 2,570,274 | Ransom | Oct. 9, 1951 |
| 2,619,548 | Lesti | Nov. 25, 1952 |